(12) United States Patent
Ahmadian

(10) Patent No.: US 9,975,392 B2
(45) Date of Patent: May 22, 2018

(54) DUAL-ACTION ROTARY DYNAMIC LOAD STABILIZATION PNEUMATIC VALVE SYSTEM

(71) Applicant: System Integrators International, LLC, Blacksburg, VA (US)

(72) Inventor: Mehdi Ahmadian, Blacksburg, VA (US)

(73) Assignee: SYSTEM INTEGRATORS INTERNATIONAL, LLC, Blacksburg, VA (US)

(*) Notice: Subject to any disclaimer, the term of this patent is extended or adjusted under 35 U.S.C. 154(b) by 0 days. days.

(21) Appl. No.: 15/626,638

(22) Filed: Jun. 19, 2017

(65) Prior Publication Data

US 2017/0361673 A1 Dec. 21, 2017

Related U.S. Application Data

(60) Provisional application No. 62/423,298, filed on Nov. 17, 2016, provisional application No. 62/352,224, filed on Jun. 20, 2016.

(51) Int. Cl.
*B60G 17/04* (2006.01)
*B60G 11/27* (2006.01)
(Continued)

(52) U.S. Cl.
CPC .......... *B60G 17/0416* (2013.01); *B60G 11/27* (2013.01); *B60G 17/056* (2013.01); *F16K 11/074* (2013.01); *B60G 2800/01* (2013.01)

(58) Field of Classification Search
CPC .. B60G 11/27; B60G 17/0416; B60G 17/056; F16K 11/074
See application file for complete search history.

(56) References Cited

U.S. PATENT DOCUMENTS 2,111,169 A * 3/1938 Clark .................... F16K 11/072
137/625.29
2,787,474 A 4/1957 Brueder
(Continued)

FOREIGN PATENT DOCUMENTS

EP 0324035 B1 2/1993
EP 0325200 B1 4/1994
(Continued)

OTHER PUBLICATIONS

Notification of Transmittal of the International Search Report and The Written Opinion of the International Searching Authority cited in PCT/US2017/038140 dated Sep. 14, 2017, 21 pages.

*Primary Examiner* — Craig Schneider
*Assistant Examiner* — Kevin Barss
(74) *Attorney, Agent, or Firm* — Rothwell, Figg, Ernst & Manbeck, P.C.

(57) ABSTRACT

A pneumatic suspension system for a vehicle, in which the pneumatic suspension system includes a supply tank, a first set of air springs positioned on a first side of the vehicle; a second set of air springs positioned on a second side of the vehicle, and a dual-action dynamic valve positioned between the first set of air springs and the second set of air springs. The dual-action dynamic valve is connected to the supply tank, the first set of air springs, and the second set of air springs by a series of air hoses. The dual-action dynamic valve is adapted to supply air to either one of the first set of air springs or the second set of air springs while simultaneously exhausting air from the other one of the first set of air springs or the second set of air springs.

23 Claims, 31 Drawing Sheets

(51) Int. Cl.
*B60G 17/056* (2006.01)
*F16K 11/074* (2006.01)

(56) References Cited

U.S. PATENT DOCUMENTS

| | | | |
|---|---|---|---|
| 3,014,499 A | 12/1961 | Barksdale | |
| 3,104,114 A | 9/1963 | Vogel | |
| 5,560,591 A | 10/1996 | Trudeau et al. | |
| 5,651,555 A | 7/1997 | O'Reilly et al. | |
| 5,934,320 A | 8/1999 | O'Reilly et al. | |
| 6,089,551 A | 7/2000 | Haviland et al. | |
| 6,202,992 B1 | 3/2001 | O'Reilly et al. | |
| 6,412,790 B2 | 7/2002 | McKenzie et al. | |
| 6,669,216 B1 | 12/2003 | Elser et al. | |
| 6,799,768 B2 | 10/2004 | Jin | |
| 6,945,275 B2 | 9/2005 | Krechmery et al. | |
| 7,472,914 B2 | 1/2009 | Anderson et al. | |
| 7,810,827 B2 | 10/2010 | Sheehan et al. | |
| 7,866,344 B2 | 1/2011 | Webster et al. | |
| 7,921,876 B2 | 4/2011 | Wright et al. | |
| 7,946,603 B2 | 5/2011 | Hammond | |
| 8,047,551 B2 | 11/2011 | Morris et al. | |
| 8,191,578 B2 | 6/2012 | Weiss | |
| 8,360,451 B2 | 1/2013 | Hammond | |
| 8,720,938 B2 | 5/2014 | Ehrlich | |
| 8,936,043 B2 | 1/2015 | Costin et al. | |
| 8,973,922 B2 | 3/2015 | Koelzer | |
| 9,272,599 B1 | 3/2016 | Cook, Jr. et al. | |
| 9,616,726 B2 | 4/2017 | Harla et al. | |
| 2003/0075883 A1 | 4/2003 | Jin | |
| 2003/0111807 A1 | 6/2003 | Lee | |

FOREIGN PATENT DOCUMENTS

| | | |
|---|---|---|
| EP | 1362196 B1 | 12/2010 |
| EP | 2393679 B1 | 11/2012 |
| EP | 2393680 B1 | 11/2012 |
| EP | 2806194 A1 | 11/2014 |

\* cited by examiner

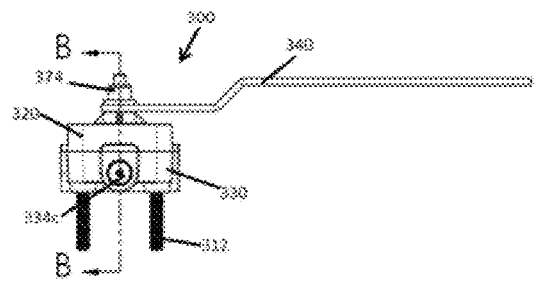
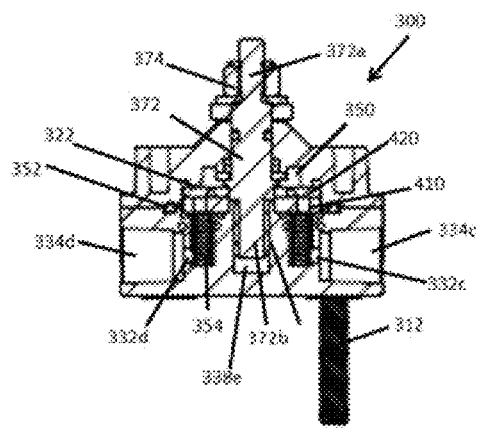
FIG. 21a FIG. 21b
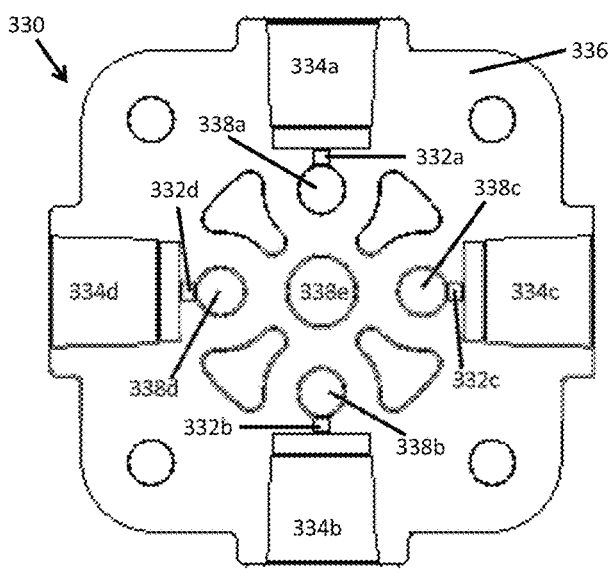
FIG. 22

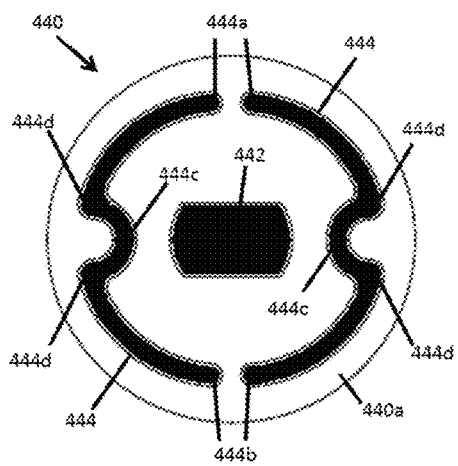
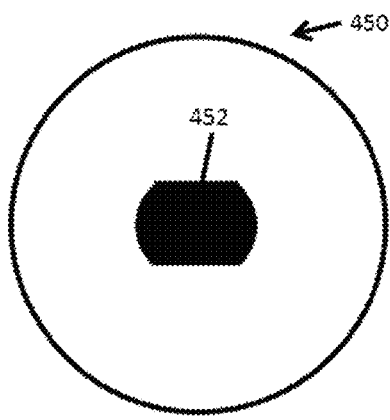
FIG. 26a  FIG. 26b
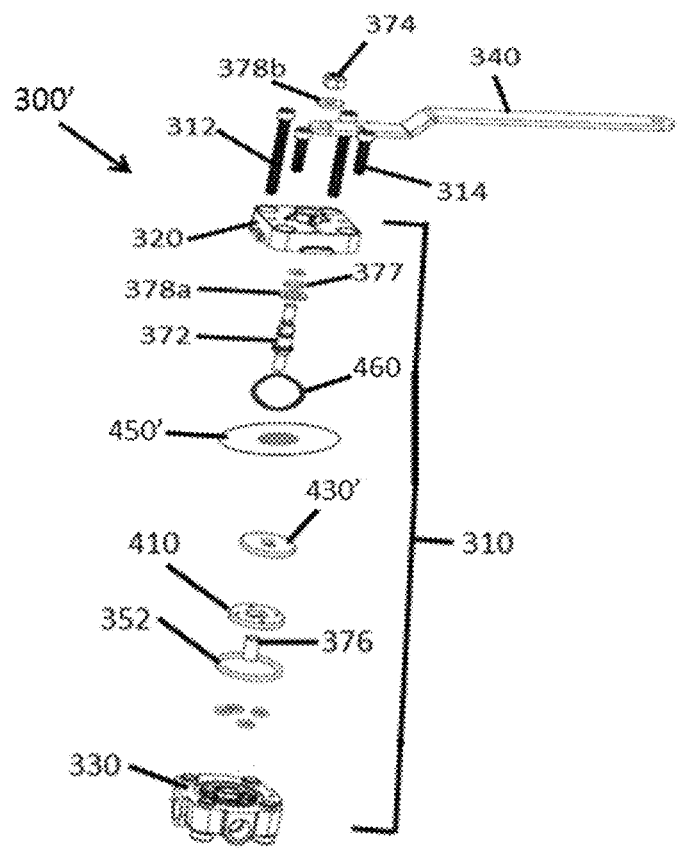
FIG. 27

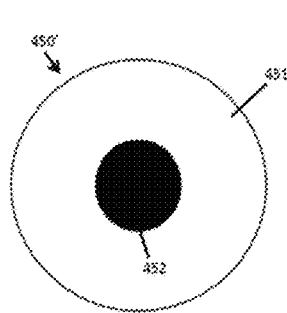 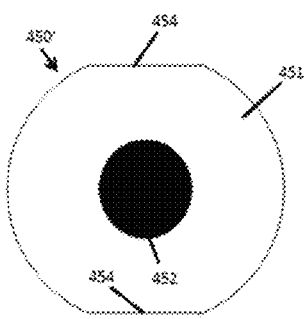 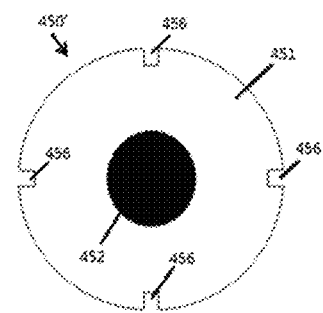
FIG. 28a  FIG. 28b  FIG. 28c
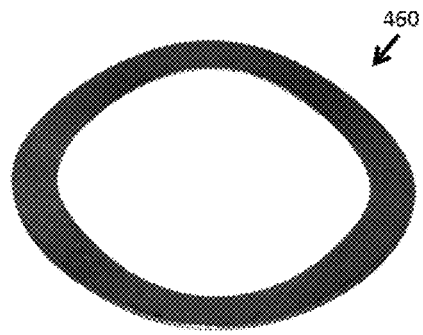
FIG. 29

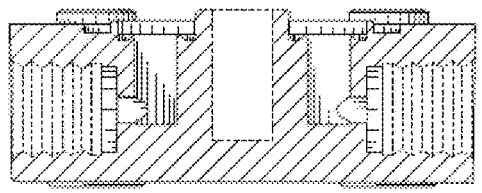
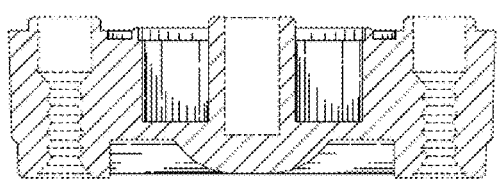
FIG. 39　　　　　　　　　　　　FIG. 40
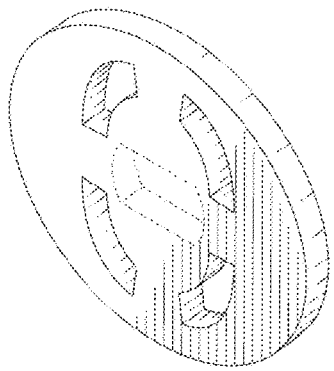
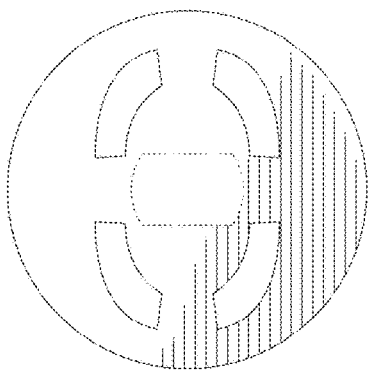
FIG. 41a　　　　　　　FIG. 41b　　　　　　FIG. 41c
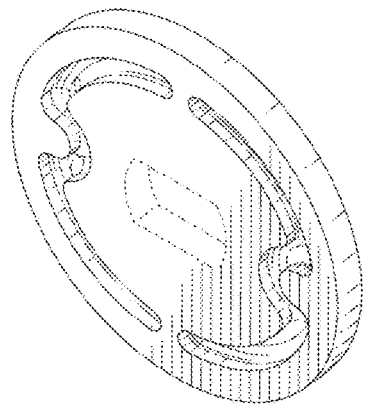
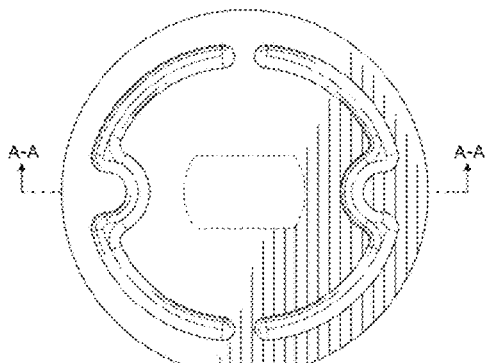
FIG. 42a　　　　　　　　　　　FIG. 42b

DUAL-ACTION ROTARY DYNAMIC LOAD STABILIZATION PNEUMATIC VALVE SYSTEM

CROSS REFERENCE OF RELATED APPLICATION

This application claims the benefit under 35 U.S.C. § 119(e) of the filing date of provisional patent application Ser. No. 62/352,224 filed Jun. 20, 2016 and provisional patent application Ser. No. 62/423,298 filed Nov. 17, 2016, the disclosures of which are incorporated herein by reference in their entirety.

FIELD OF THE DISCLOSURE

This disclosure relates to a pneumatic air suspension system for a vehicle, and in particular, to a dual-action dynamic valve that can simultaneously supply air to one side of the suspension system while removing air from the other side of the suspension system.

BACKGROUND OF THE INVENTION

Pneumatic air suspension systems commonly consist of an air tank that supplies air to air springs installed at the axles in between the vehicle frame or body. The air tank is connected to the air springs through a series of hoses and connectors that transfer air from the tank to the air springs. In some cases, check valves and regulators are incorporated in line with air hoses, in order to provide the necessary protection to prevent over-inflating the air springs or depleting the air tank in case of air spring failure. The pneumatic suspension commonly incorporates a load-leveling valve that can adjust the pressure in the air spring based on the wheel load or the vehicle load.

Most common air suspensions in vehicles including, but not limited to, heavy trucks use a mechanical load leveling valve that adjusts the air pressure within the air suspension in response to the load placed on the suspension. When the vehicle is loaded, the air pressure is increased for higher suspension stiffness and better support of the added weight (load) placed on top of the suspension. Conversely, when load is removed, air pressure is decreased to provide a softer suspension and prevent the frame from jacking up. The end result is a truck that rides "level," meaning it rides at the same ride height independent of its loading condition.

The load leveling is accomplished through the aforementioned mechanical leveling valve, commonly referred to as a "load leveling valve," or a "ride-height control valve." Some truck configurations employ two leveling valves, one on each side, for the main purpose of better responding to any uneven roads or forces at the suspension on each side, independently. In such systems, the leveling valves attempt to keep each side level, therefore achieving a side-to-side leveled truck. In either a single valve suspension system or a double valve suspension system, leveling valves of the prior art were designed only to supply or exhaust air in an alternating sequence. As a result, the air springs attached to a conventional leveling valve may all uniformly receive air from the leveling valve or may all uniformly discharge air to the leveling valve. In other words, conventional leveling valves are not capable of simultaneously supplying air to a first set of attached air springs while discharging air from a second set of attached air springs.

FIG. 1 illustrates one conventional suspension system of the prior art comprising a single leveling valve connected to a plurality of springs, in which each spring is formed by an air bag. Because conventional leveling valves may only supply or remove air in an alternating sequence, all the air bags in the suspension system of FIG. 1 are either supplied air from the single leveling valve or exhausted air from the single leveling valve. Consequently, the suspension system of FIG. 1 is not able to alter the height of one side of the vehicle without making the same change to the other side of the vehicle, thereby lacking the capability to account for unbalanced loading of the vehicle and/or weight shifts. Thus, for suspension systems with one leveling valve, once the truck body is leveled to the set height, the valve remains predominantly closed, in that the level valve does not remove or add any air to the suspension air springs even in the event of a weight shift.

One attempt in the prior art to account for unbalanced loading and weight shifting of a vehicle was to provide a suspension system utilizing two load level valves with one valve placed on each side of the vehicle, as shown in FIG. 2. For suspensions with two load leveling valves, the air in each side can be adjusted such that the truck remains statically, and in some cases dynamically, leveled. For instance, when the truck is unleveled side-to-side, one side is raised while the other side is lowered. In such a case the leveling valve on the lower side adds air to the suspension, whereas the valve on the other side does the opposite by removing air from the suspension to lower the raised side. Thereby, the leveling valves on the two sides perform diametrically opposite actions: one releases air while the other one adds more air. One leveling valve increases the suspension stiffness on one side while the other reduces it on the opposite side. However, incorporating a second leveling valve into the suspension system requires more air hoses and couplings, thereby adding cost to the suspension system and increasing the likelihood of maintenance. Moreover, irrespective of whether a suspension system uses one or two conventional valves, the design of these conventional valves results in application of the same or similar action on the air springs, i.e., either adding or retracting air from the air springs.

Furthermore, conventional valves are designed to reduce the possibility of overcompensating or undercompensating air pressure within the air springs by hindering the air flow rate of the valve as the valve is initially actuated. Accordingly, more time is needed after actuating the leveling valve to set the air springs to a desired air pressure. Although hindering air flow at the initial actuation stage of the valve may prevent the air springs from losing or receiving too much air, conventional valves are slow to respond to dynamic, side-to-side or front-to-back weight shifts that often take place as the vehicle is moving. Such weight shifts occur as a result of the vehicle traveling on a curved roadway, or during acceleration and deceleration. Thus, conventional valves tend to respond too late to an impulsive weight shift of a moving vehicle, ultimately increasing the likelihood of the vehicle overturning at a sudden change of movement, such as a sharp turn. Such rollovers are often disastrous.

Accordingly, there is need for a dual action leveling valve that can simultaneously supply air to a first set of springs and exhaust air from a second set of springs so that a one leveling valve suspension system can account for unbalanced loading of a vehicle. Furthermore, there is need for a leveling valve that responds quickly to a dynamic weight shift in a moving vehicle to reduce the risk of the vehicle overturning at a sudden change of movement, such as a sharp turn.

BRIEF SUMMARY OF THE INVENTION

The present invention provides a pneumatic suspension system for a vehicle, in which the pneumatic system includes a supply tank, a first set of air springs positioned on a first side of the vehicle; a second set of air springs positioned on a second side of the vehicle, and a dual-action dynamic valve positioned between the first set of air springs and the second set of air springs. The dual-action dynamic valve is connected to the supply tank, the first set of air springs, and the second set of air springs by a series of air hoses. The dual-action dynamic valve is adapted to supply air to either one of the first set of air springs or the second set of air springs while simultaneously exhaust air from the other one of the first set of air springs or the second set of air springs in response to opposing movements by the first and second air springs. The dual-action dynamic valve is further adapted to equalize air pressure between the first and second set of air springs in response to similar movements by the first and second sets of air springs.

The dual-action dynamic valve according to the present invention includes an upper housing mounted on a lower housing to form a valve body in which the valve body defines a chamber extending between the upper housing and the lower housing. The lower housing comprises a plurality of ports communicating with the chamber including: a supply port positioned on a first side of the lower housing; an exhaust port positioned on a second side of the lower housing opposite to the first side of the lower housing; a first spring port positioned on a third side of the lower housing; and a second spring port positioned on a fourth side of the lower housing opposite to the third side of the lower housing. The dual-action dynamic valve further includes a control arm having a first end attached to an upper surface of the upper housing, wherein the control arm is configured to rotate about the valve body in response to an extension or compression of the pneumatic suspension system. A shuttle mechanism is received in the chamber of the valve body and connected to the control arm by a supporting element, in which the shuttle mechanism is configured to rotate about the supporting element within the chamber of the valve body to establish communication between the respective ports. In operation, rotation of the control arm induces the shuttle mechanism to rotate between a plurality of angular positions to alter the communication between the supply port, the exhaust port, the first spring port, and the second spring port. The plurality of angular positions includes: (i) a first angular position in which the supply port communicates directly with the first spring port and the exhaust port communicates directly with the second spring port, (ii) a second angular position, in which the supply port communicates directly with the second spring port and the exhaust port communicates directly with the first spring port, and (iii) a base position, in which the first spring port and the second spring port communicate neither with the supply port nor the exhaust port. The rotary disk also controls the rate of airflow through each port of the lower housing as the rotary disk is rotated to different angular positions, while maintaining an air tight communication among the ports in the sense that the air is directed between the communicating ports only.

According to one embodiment of the present invention, the lower housing further includes a first surface mating with a lower surface of the upper housing in which the first surface defines a plurality of cavities, including: a supply cavity directly communicating with the supply port; an exhaust cavity directly communicating with the exhaust port; a first spring cavity directly communicating with the first spring port; and a second spring cavity directly communicating with the second spring port. Furthermore, the shuttle mechanism comprises a rotary disk having a central aperture that receives the supporting element and four oblong-shaped slots spaced around the central aperture with dead band defined there between and along the periphery of the rotary disk. Each oblong-shaped slot is configured to overlie a respective cavity of the lower housing when the rotary disk is rotated to the first angular position or the second angular position. Consequently, once the rotary disk is rotated to either the first angular position or the second angular position, the dual-action dynamic valve simultaneously supplies air to one of the first set or the second set of air springs while purging air from the other one of the first set or the second set of air springs.

Each oblong-shaped slot of the rotary disk comprises a first end positioned adjacent to or overlying a respective supply cavity or exhaust cavity of the lower housing and a second end overlying a respective first spring cavity or second spring cavity of the lower housing. The width of the first end of the slot is not equal to the width of the second end of the slot. As a result, the shape of the slot promotes a change in the flow rate of air through the dual-action dynamic valve when the rotary disk is rotated. In one embodiment, the slots are arranged such that the width of the first end is greater than the width of the second end, thereby promoting a rapid change in the mass flow rate of air when the rotary disk is rotated at lower rotation angle. In that embodiment, as the rotary disk continues to rotate to a higher rotation angle, the shape of the slots reduces the change in the mass flow rate of air through the dual-action dynamic valve, thereby maintaining the mass flow rate of air in a steady state. Therefore, the shape profile of the slot in the rotary disk mitigates the risk of over-pressuring or under-pressuring the air springs in response to a weight shift upon the suspension system. Because the rotary disk permits a greater flow rate at slight rotations, the dual-action dynamic valve responds very quickly to dynamic weight shifts in the vehicle compared to conventional valves of the prior art. This rapid response time of the suspension system of the present invention significantly reduces the likelihood of the vehicle overturning at a sharp turn or other dynamic maneuvers and rapidly changing driving conditions.

In another embodiment, the shuttle mechanism comprises an auxiliary disk and a rotary disk, in which the auxiliary disk and the rotary disk are stacked in an aligned manner in the chamber of the valve body. The auxiliary disk includes a central hole that receives the support element and a plurality of holes spaced around the central hole, wherein each hole overlies a respective cavity of the lower housing. The auxiliary disk is pressed against the first surface of the lower housing in a stationary state, and the rotary disk is configured to rotate with respect to the auxiliary disk. The rotary disk includes a central aperture that receives the support element and a plurality of grooves or through holes spaced around the central aperture.

In one embodiment, the plurality of grooves or through holes of the rotary disk includes a pair of arcuate-shaped grooves, in which each arcuate-shaped groove is configured to overlie two respective cavities of the lower housing and two respective holes of the auxiliary disk when the rotary disk is rotated to the first angular position or the second angular position. Furthermore, each arcuate-shaped groove is configured to overlie the first and second holes of the auxiliary disk and the first and second cavities of the lower housing when the rotary disk is set in the base position. Accordingly, the first spring port is in communication with the second spring port, while the supply port and the exhaust port are neither in communication with the first port nor in communication with the second spring port. Thus, the air pressure between the first set of air springs and the second set of air springs becomes equalized when the rotary disk is set to the base position.

In another embodiment, the plurality of grooves or through holes of the rotary disk includes four blind grooves spaced around the central aperture and extending along the periphery of the rotary disk. Each blind groove is configured to over a respective hole of the auxiliary disk when the rotary disk is rotated to the first and second angular positions. Accordingly, once the rotary disk is rotated to either the first angular position or the second angular position, the dual-action dynamic valve simultaneously supplies air to one of the first set of air springs or second set of air springs while purging air from the other one of the first set of air springs or the second set of air springs. In addition, the rotary disk may include a pair of connecting grooves or connecting through holes, wherein each connecting groove or connecting through hole extends between a pair of blind grooves or through holes to establish cross-flow between the first and second sets of air springs. Accordingly, when the rotary disk is set to a base position, the first spring port and the second spring port communicate neither with the supply port nor the exhaust port, and the first port communicates with the second spring port so that air pressure is equalized between the first set of air springs and the second set of air springs of the suspension system.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this disclosure, wherein like reference numerals designate corresponding parts in the various figures.

BRIEF DESCRIPTION OF THE DRAWINGS

The accompanying drawings, which are incorporated herein and form part of the specification illustrate various embodiments of the subject matter of this disclosure. In the drawings, like reference numbers indicate identical or functionally similar elements.

FIGS. 21a and 21b are side and side cross-sectional views, respectively, of the dual-action dynamic valve according to an embodiment of the present invention.

FIG. 22 is a top cross-sectional view of a lower housing according to an embodiment of the present invention.

FIGS. 23c-e are top views of an auxiliary disk according to exemplary embodiments of the present invention.

FIG. 26a is a top view of a rotary disk according to an embodiment of the present invention. FIG. 26b is a top view of a secondary disk according to an embodiment of the present invention.

FIG. 27 is an exploded view of a dual-action dynamic valve according to an embodiment of the present invention.

FIGS. 28a, 28b, and 28c are schematic top views of a secondary disk according to an embodiment of the present invention.

FIG. 29 is a schematic view of a disk spring according to an embodiment of the present invention.

FIG. 39 is a side cross-sectional view of a lower housing taken along lines A-A of FIG. 36 according to an embodiment of the present invention.

FIG. 40 is a side cross-sectional view of a lower housing taken along lines B-B of FIG. 36 according to an embodiment of the present invention.

FIGS. 41a-c are schematic drawings of a rotary disk according to an embodiment of the present invention.

FIG. 42a is a perspective view of a rotary disk according to an embodiment of the present invention.

FIG. 42b is a bottom view of a rotary disk according to an embodiment of the present invention.

DETAILED DESCRIPTION OF THE INVENTION

It is to be understood that the various invention elements, features and steps provided in the following paragraphs may be combined without limitation with any other invention elements, features and steps disclosed in any part of this application including the abstract, summary of the invention, claims and drawings. It is to be understood that this disclosure is not limited to the particular process and materials detailed below and may vary to some degree as understood by a person skilled in the art.

The disclosure relates to a pneumatic air suspension system for a vehicle that simultaneously supplies air to one side of the suspension system while removing air from the other side of the suspension system.

Figure 1:
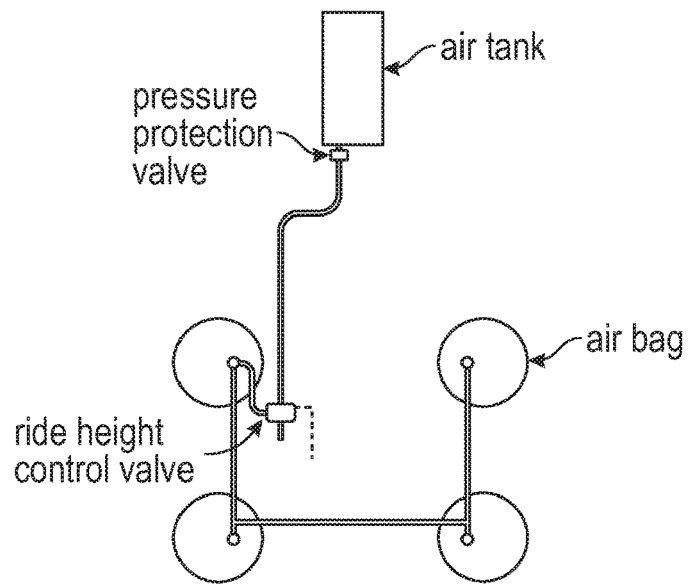
FIG. 1 is a top view of a one-valve pneumatic suspension system of the prior art.
Figure 2:
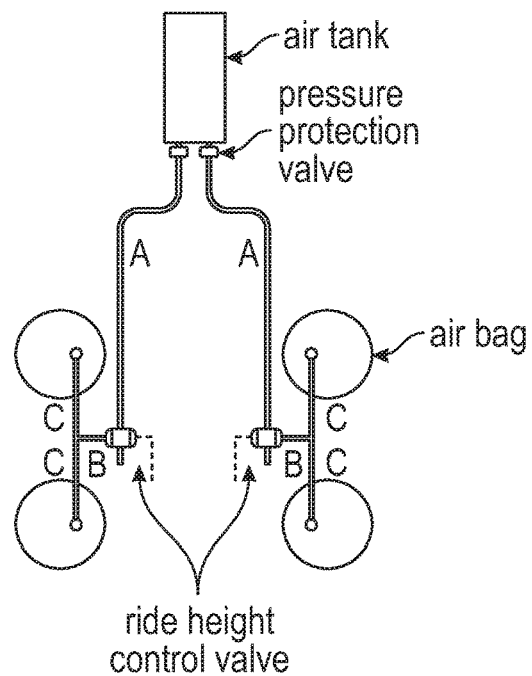
FIG. 2 is a top view of a two-valve pneumatic suspension system of the prior art.
Figure 3:
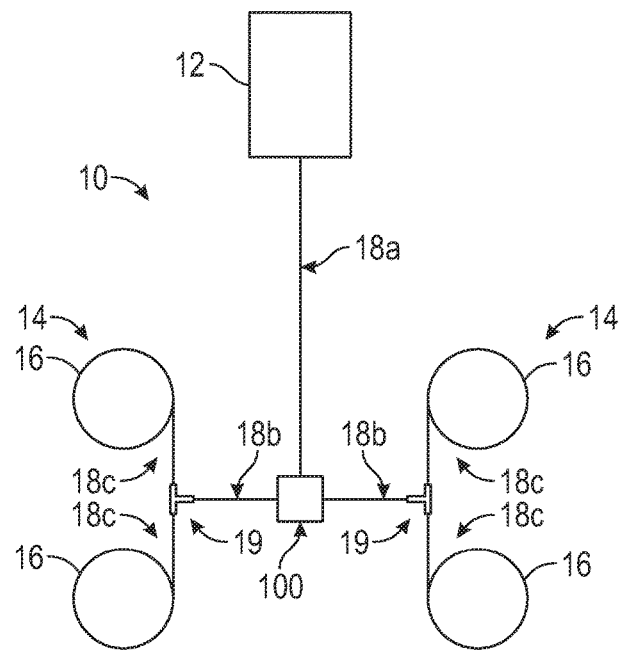
FIG. 3 is a top view of a pneumatic suspension system incorporating a dual-action dynamic valve according to the present invention.

FIG. 3 illustrates a pneumatic suspension system 10 incorporating a dual-action dynamic valve 100 according. The pneumatic suspension system 10 includes an air tank 12 supplying air to two pneumatic circuits 14. Each pneumatic circuit 14 includes a set of air springs 16 positioned on a respective side of a vehicle (not shown). A dual-action dynamic valve 100 is positioned between the two pneumatic circuits 14 and connects the air tank 12 with the two pneumatic circuits 14 connected by a series of air hoses 18a-c. In one embodiment, the air hoses 18a-c are large capacity air lines having a bore (inside) diameter of about 10 mm to 25 mm. In another embodiment, the air hoses 18a-c are smaller having a bore diameter about 12 mm (½ inch). In other embodiments, air hoses with different diameter sizes may be incorporated in the pneumatic suspension system without departing form the spirit and scope of the invention.

In the illustrated embodiment, the series of air hoses 18a-c include a supply hose 18a connecting the supply tank 12 to the dual-action dynamic valve 100. A pair of valve hoses 18b extend between the dual-action dynamic valve 100 and a respective manifold 19. Furthermore, the series of air hoses 18a-c include two pairs of spring hoses 18c, in which each spring hose 18c extends between a respective manifold 19 and a respective air bag or air spring 16. In the illustrated embodiment, each valve hose 18b are of equal size and length, and each spring hose 18c are of equal size and length. However, in other embodiments, the air hoses 18a-c may have different sizes and dimensions to equalize, as much as possible, airflow among the air springs on each side, and from side to side. A dual-action dynamic valve 100 according to the present invention is adapted to adjust the air pressure (or suspension stiffness) on the opposite sides of the suspension system 10 appropriately, both statically and dynamically. The dual-action dynamic valve 100 operates so that air pressure increases on one side of the suspension system 10 while air pressure decreases on the opposite side of the suspension system 10 simultaneously by a given (or set) ratio, nominally 1:1. The pneumatic suspension system may be used in heavy trucks, such as a tow truck, pickup trucks, passenger vehicles, recreation vehicles and any other type of vehicle that will benefit from the system. The pneumatic suspension system may be installed in newly manufactured vehicles or retrofitted into vehicles that were manufactured with other suspension systems.

A method to retrofit a vehicle with a dual-action dynamic valve according to the present invention includes the steps of providing an air tank, a compressor, a plurality of air hoses, a dual-action dynamic valve, and at least two sets of air springs. Each set of air springs may be mounted between the frame and axle of the vehicle by providing a set of brackets, such as an upper spring bracket and a lower spring bracket. The lower spring bracket secures a respective air spring to the axle, and an upper spring bracket secures the respective air spring to the vehicle frame. After mounting a set of air springs to each vehicle side, the method further includes the steps of determining the initial ride height of the vehicle and determining a location where the dual-action dynamic valve should be mounted with respect to the vehicle frame. The initial ride height may be calculated by measuring the difference between the top of the axle tube and the bottom of the vehicle frame. After securing the dual action dynamic valve to the vehicle frame, the method further includes the step of linking the control arm of the dual-action dynamic valve to a respective air spring bracket on both sides of the vehicle so that the control arm moves in response to movement of the air springs on both sides of the vehicle. To link the control the arm to the air spring brackets, holes may be drilled at selected locations along the lower spring bracket, whereby a linkage may extend from the lower spring bracket to the control arm of the dual-action dynamic valve. The method further includes the steps of installing spring hose lines that connect the dual-action dynamic valve to the air springs and installing a supply hose to link the dual-action dynamic valve to the air tank and compressor. The spring hose lines may be equal length and/or equal diameter lines.

The dual-action dynamic valve 100 incorporates air passages to both sides of the suspension system 10. In operation, the dual-action dynamic valve 100 supplies air to a set of air springs on one side of the suspension system by connecting the air springs to the air tank. Simultaneously, the dual-action dynamic valve 100 purges (or removes) air from another set of air springs on the opposite side of the suspension system by connecting the set of air springs to the ambient pressure (outside air). Because the air spring's internal pressure is higher than the outside pressure, air escapes to the outside, lowering the internal air spring pressure. This is in contrast to conventional leveling valves of the prior art that are configured to either increase or decrease air pressure uniformly in all of the attached air springs in separate leveling actions. The dual-action dynamic valve 100 according to the present invention lowers air pressure in one set of the air springs (on one side of the truck) while increasing pressure in another set of air springs (on the opposite side to side one), simultaneously, in a single leveling action.

Figure 4:
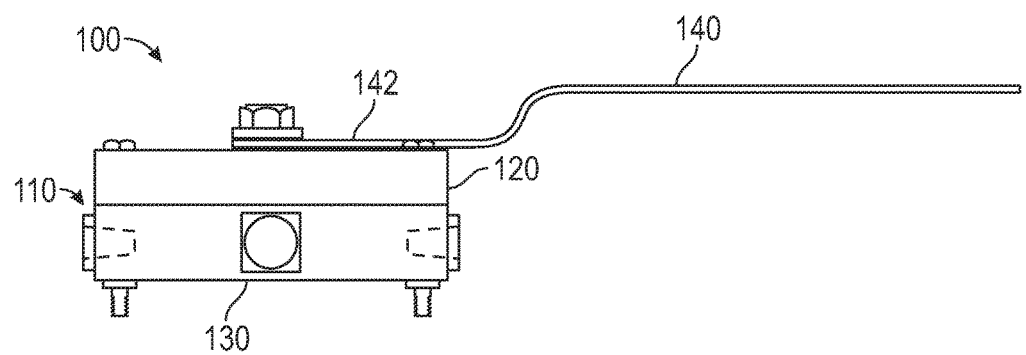
FIG. 4 is a side view of a dual-action dynamic valve according to an embodiment of the present invention.
Figure 5A:
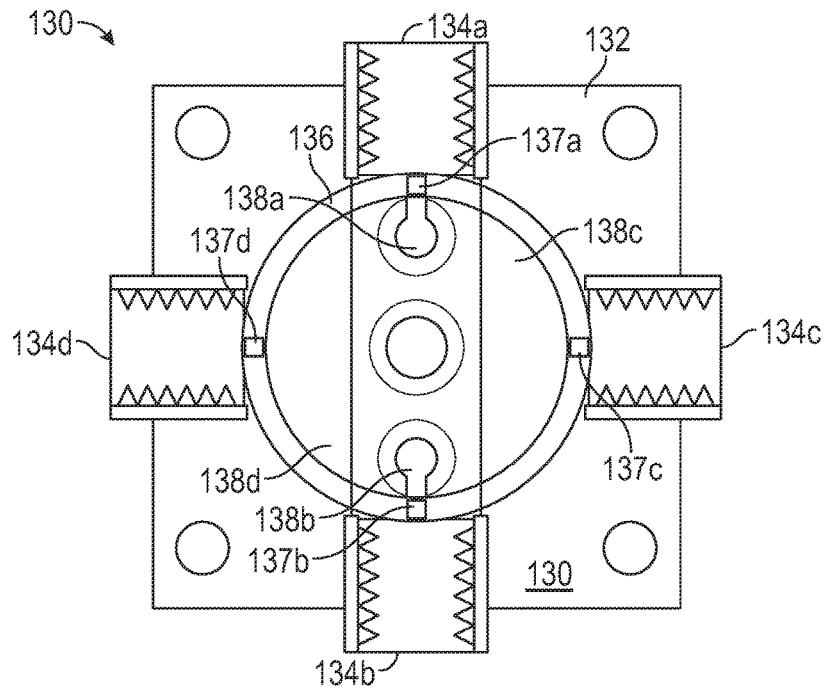
FIG. 5a is a top section view of a lower housing according to an embodiment of the present invention.

FIG. 4 illustrates a side view of the dual-action dynamic valve 100 according to one embodiment of the present invention. The dual-action dynamic valve 100 includes a valve body 110 comprising an upper housing 120 mounted on a lower housing 130. According to one embodiment shown in FIGS. 5a-c, the lower housing 130 comprises a square-shaped manifold casing 132 having a central bore 132a and at least four ports 134a-d, including a supply port 134a, which connects to an air tank (not shown), an exhaust port 134b for purging air from the air springs (not shown), a first port 134c which connects to a first set of air springs (not shown), and a second port 134d which connects to a second set of air springs (not shown). As shown in FIG. 5a, the first and second ports 134c and 134d are arranged so that the dual-action dynamic valve 100 is connected to both the air springs on a right side of a vehicle and the air springs on a left side of the vehicle. In other words, if the first port 134c of the lower housing 130 is connected to the first set of air springs on one side (i.e. right side), the second port 134d of the lower housing 130 is connected to the second set of air springs on the opposite side (i.e. left side). The ports are further arranged so that the supply port 134a on one side of the lower housing 130 coincides with the exhaust port 134b on an opposite side of the lower housing 130. All the ports 134a-d of the manifold casing 132 are airtight. Consequently, when a respective port is open, the air passes only through the open port, and when a respective port is closed, no air is able to pass through the closed port.

Figure 5B:
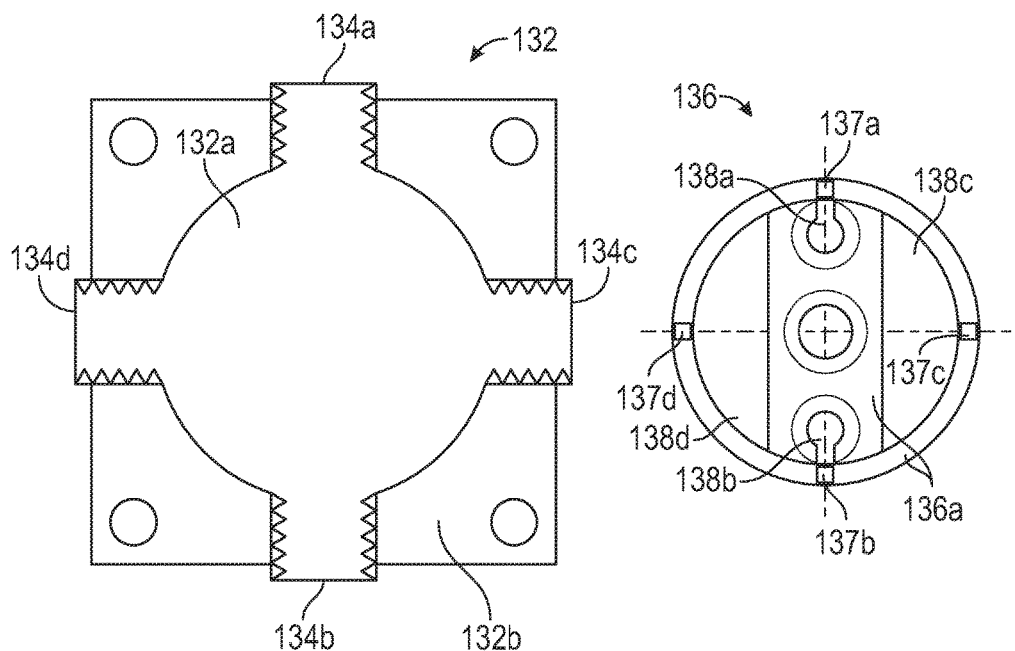
FIG. 5b is a top section view of a manifold casing and inner body according to an embodiment of the present invention.
Figure 5C:
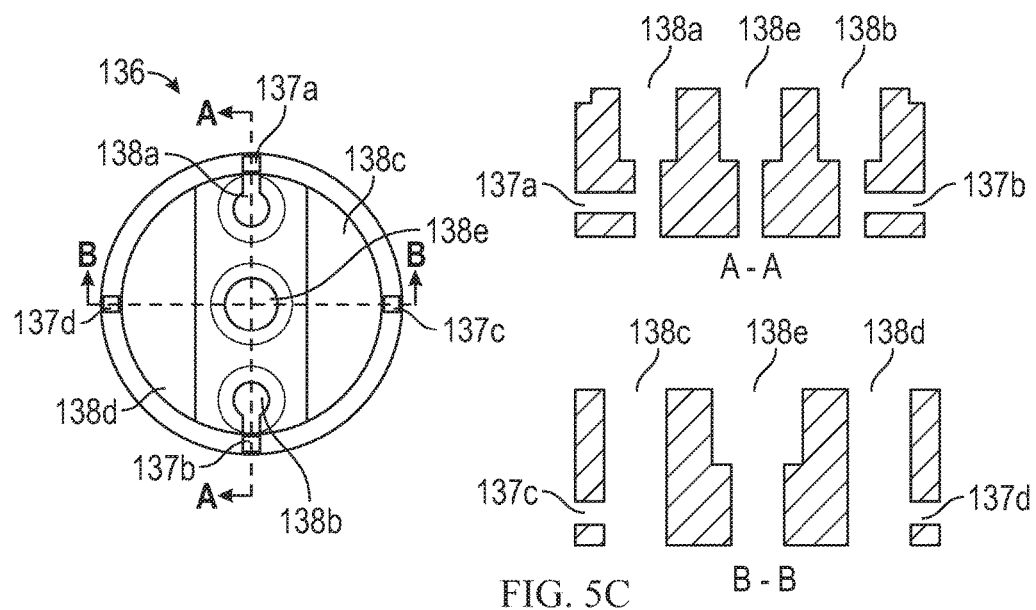
FIG. 5c is a cross-section view of an inner body according to an embodiment of the present invention.

As shown in FIGS. 5a-c, the lower housing 130 further comprises an inner body 136 received in the central bore 132a of the manifold casing 132, in which a first surface 136a of the inner body 136 is flush with an upper surface 132b of the manifold casing 132. The upper surface 131b of the manifold casing 131 is configured to mate with a lower surface of the upper housing 120. The inner body 136 includes a plurality of blind holes 137a-d, wherein a respective blind hole is connected to a respective port of the manifold casing 132 to establish a separate airflow passage to each port of the manifold casing 131. Consequently, air supplied and purged for the first set of springs occurs independently to the air supplied and purged for the second set of springs. The first surface 136a of inner body 136 defines a plurality of cavities 138a-d connecting with blind holes 137a-d of the inner body 136. The supply port 134a is linked to a supply cavity 138a by blind hole 137a of inner body 136, and exhaust port 134b is linked to an exhaust cavity 138b by blind hole 137b of the inner body 136. Furthermore, first port 134c is linked to a first cavity 138c by blind hole 137c of inner body 136, and second port 134d is linked to a second cavity 138d by blind hole 137d of the inner body 136. The inner body 136 further includes a central cavity 138e configured to receive a support element that extends through upper housing 120 of the valve body 110.

Figure 6A:
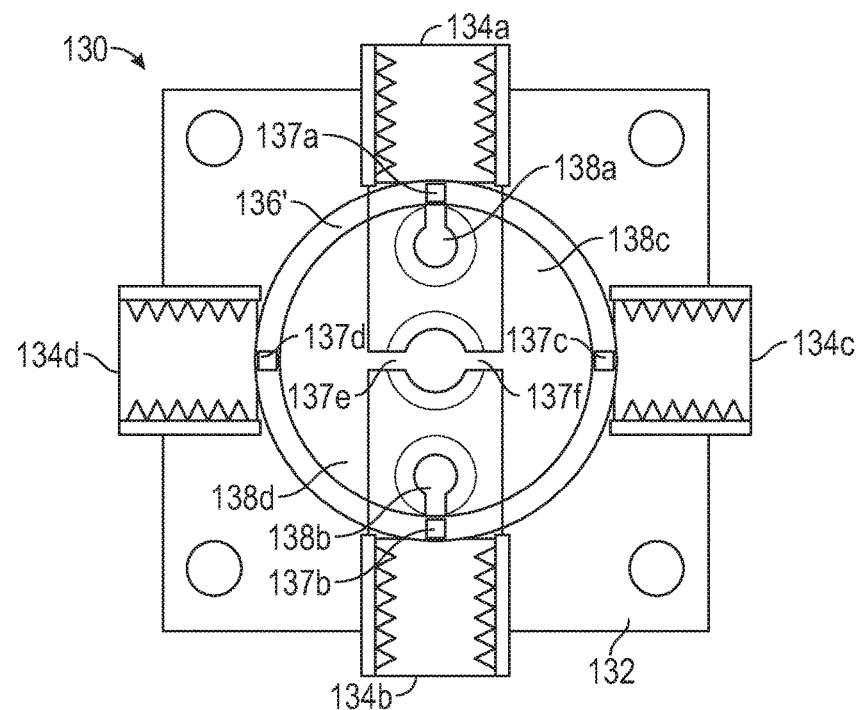
FIG. 6a is a top section view of a lower housing according to an alternative embodiment of the present invention.
Figure 6B:
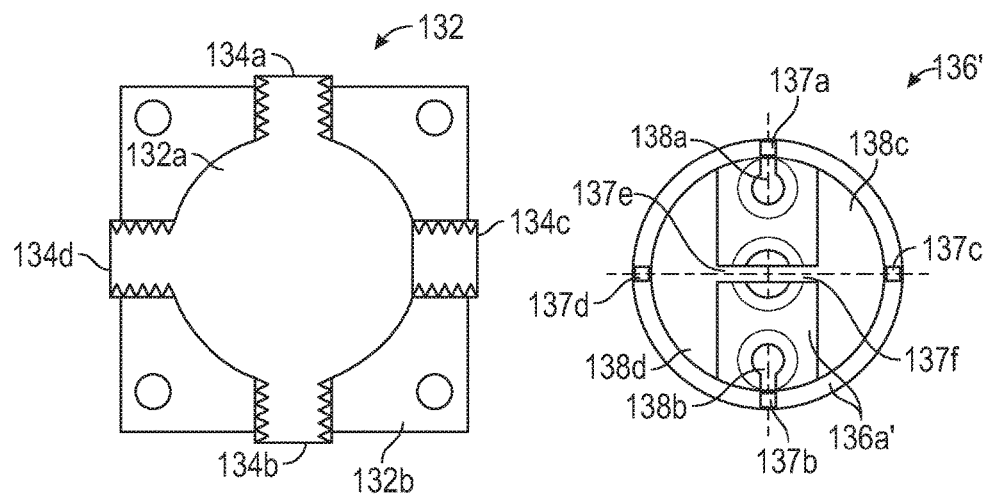
FIG. 6b is a top section view of a manifold casing and inner body according to an embodiment of the the present invention.
Figure 6C:
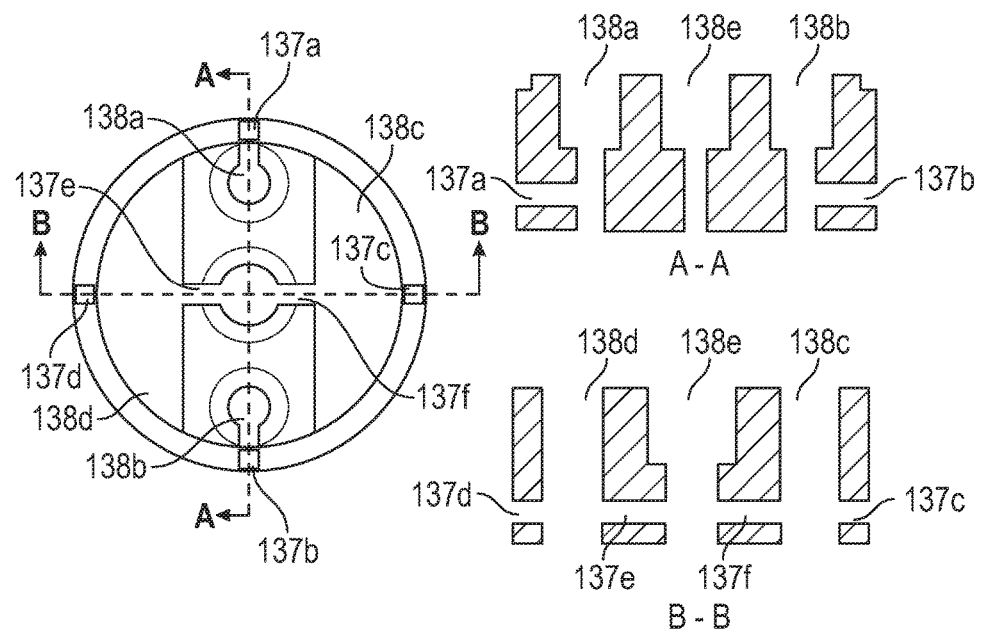
FIG. 6c is a cross-sectional view of an inner body according to an embodiment of the present invention.

FIGS. 6a-c illustrate an alternative embodiment of the inner body 136'. Similar to embodiment shown in FIGS. 5a-c, the inner body 136' shown in FIGS. 6a-c comprises a plurality of cavities 138a-d linked to the ports 134a-d of the manifold casing 132 by a respective blind hole 137a-d. However, as shown in FIGS. 6a-c, the inner body 136' includes a pair of cross-holes 137f and 137g aligned with the blind holes 137c and 137d that are connected to the first and second ports 134c and 134d of the manifold casing 132. Accordingly, when the dual-action dynamic valve 100 is set to a base position, in which neither set of the springs are in communication with the supply or purge ports 134a and 134b, the first port 134c is linked with the second port 134d by the pair of cross-holes 137e and 137f. As a result, the first set of air springs are in communication with the second set of air springs, thereby equalizing air pressure between the first and second set of air springs. By providing equal air pressure on both sides of the suspension system, dynamic valve 100 is ultimately able to ensure that the vehicle rides level even when set to the base position.

Figure 7:
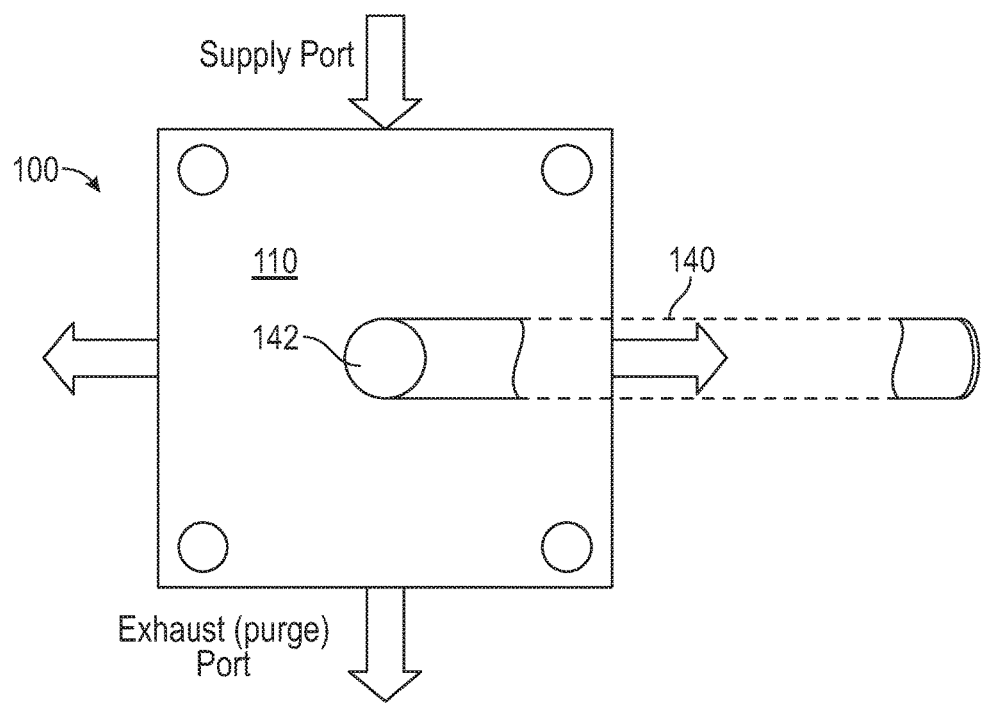
FIG. 7 is a top cross-sectional view of a dual-action dynamic valve according to an embodiment of the present invention.
Figure 8:
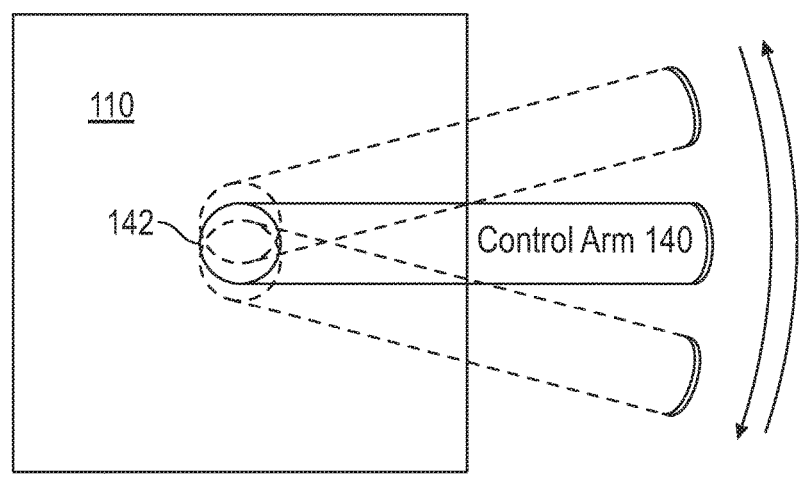
FIG. 8 is a top view of a dual-action dynamic valve according to an embodiment of the present invention.

As shown in FIGS. 4 and 7, the dual-action dynamic valve 100 also comprises a control arm 140 that is placed outside of the valve body 110 and includes a first end 142 attached to upper surface of the upper housing 120. Referring to FIG. 8, control arm 140 is configured to pivot about valve body 110, at about the nominal center of upper housing 120 in a rotational motion that is caused by the up and down motion of the suspension's air springs relative to a vehicle body or chassis, which is commonly referred to as suspension extension (rebound) and compression (jounce). In the illustrated embodiment, valve body 110 is connected to only one control arm 140.

Figure 9A:
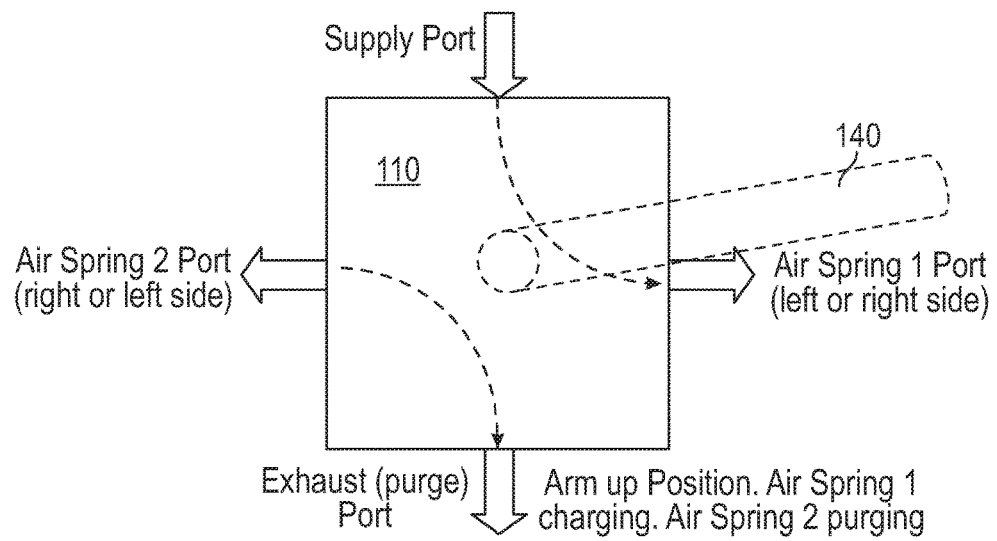
FIGS. 9a and 9b schematically show different positions of a control arm according to an embodiment of the present invention.
Figure 9B:
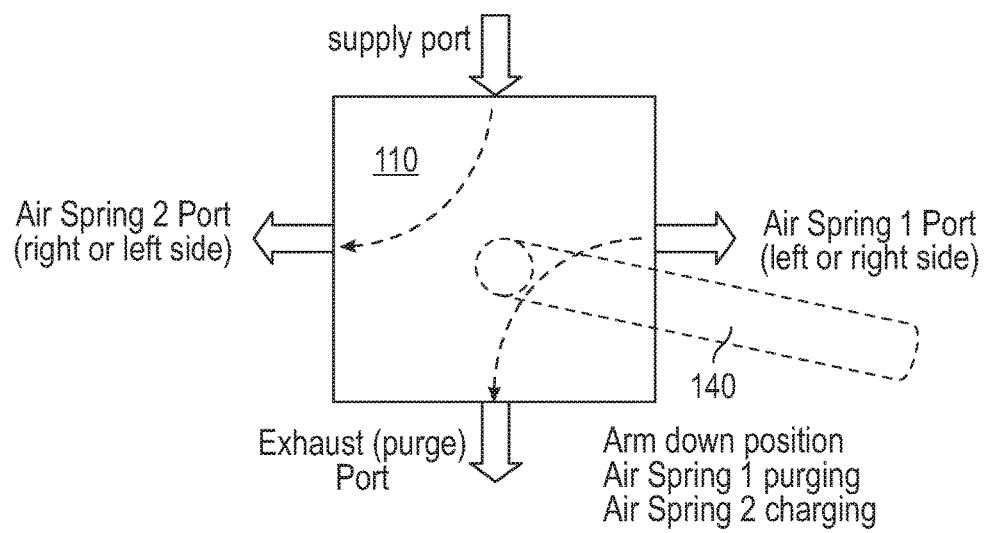

FIGS. 9a and 9b illustrate the operation of the control arm 140 pivoting between different positions. As shown in FIG. 9a, the control arm 140 moves up as the suspension compresses. As shown in FIG. 9b, the control arm 140 moves down as the suspension extends. The rotational motion of the control arm 140 aligns the air passages between the supply and purge ports with the first and second sets of the air springs, respectively, in a diametrically opposite manner from side to side. In other words, as one set of the air springs communicates with the supply port 131, the other set of the air springs communicates with the exhaust port 132. As shown in FIG. 9a, the movement of the control arm 140 to the upside causes the first port 133 to communicate with the supply port 131 and causes the second port 134 to communicate with the exhaust port 132. Consequently, air is supplied to the first set of air springs, while air is removed from the second set of air springs. Conversely, as shown in FIG. 9b, the movement of the control arm 140 to the down side causes the supply port 131 to communicate with the second port 134 and causes the exhaust port 132 to communicate with the first port 133. When control arm 140 is in horizontal orientation, all ports are closed, and the air springs are connected to neither the supply nor the purge port. Accordingly, the dual-action dynamic valve 100 requires the use of only one control arm 140 to alter communication between the airflow passages and the different ports of the lower housing 130.

Figure 10:
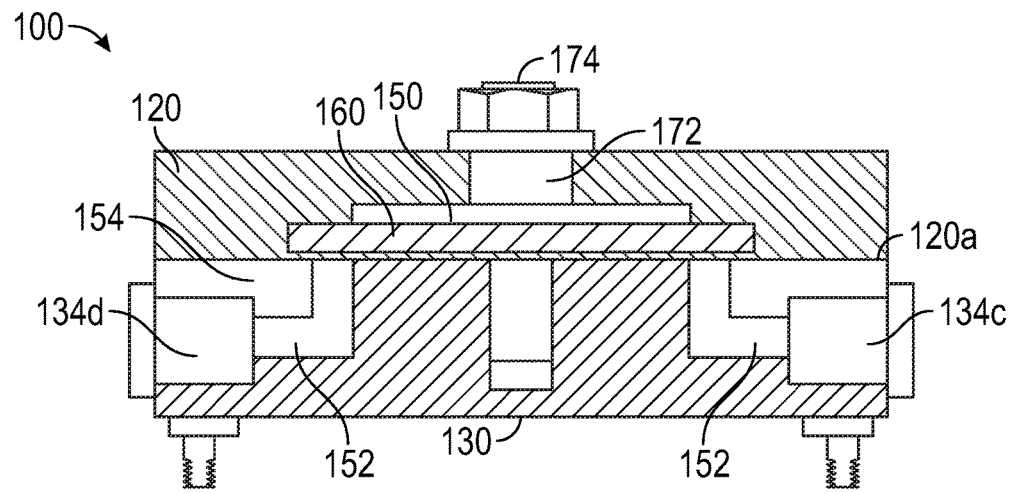
FIG. 10 is a side cross-sectional view of a dual-action dynamic valve according to an embodiment of the present invention.

FIG. 10 illustrates a side cross-sectional view of the dual-action dynamic valve 100 according to one embodiment of the present invention. As shown in FIG. 10, the upper housing 120 is mounted on the lower housing 130 to define a chamber 150 and separate airflow passages 152 to each port of the dual-action dynamic valve 100. An O-ring 154 is placed between the upper housing 120 and the lower 130 to ensure an air tight seal for the chamber 150. The chamber 150 receives one or more shuttle mechanisms 160 and one or more supporting elements that are connected to the control arm 140. In the illustrated embodiment, the supporting elements include a post 172 that extends through the chamber 150 with one end of the post 172 projecting from the upper surface of the upper housing 120 and another end of the post 172 received in the lower housing 130. The first end 142 of the control arm 140 is received on the end of the post 172 projecting from the upper surface of the upper housing 120. The supporting elements further include a nut 174 resting on the first end 142 of the control arm 140 and received on the end of the post 172 projecting from the upper surface of the upper housing 120, thereby securing the control arm 140 to the valve body 110. The post 172 also extends through the shuttle mechanism 160 within chamber 150 so that the control arm 140 is connected to the shuttle mechanism 160 by the supporting elements. The connection between the control arm 140 and the shuttle mechanism 160 is configured such that the shuttle mechanism 160 can freely rotate within the chamber 150 relative to the valve body 110.

In operation, the rotation of the control arm 140 relative to the valve body 110 induces the rotation of the shuttle mechanism 160. The shuttle mechanism 160 consists of any design arrangements that enable the airflow passages of the lower housing 130 to be aligned or misaligned with the first and second cavities 138c and 138d, thereby connecting the air springs on each side of the lower housing 130 to the supply and exhaust ports 134a and 134b, respectively. The valve body 110 of dual-action dynamic valve 100 houses shuttle mechanism 160, the supporting elements, and the airflow passages 152 so that air received from the supply tank (not shown) is distributed properly to one set of the air springs, while air is removed from the other set of air springs.

Figure 11:
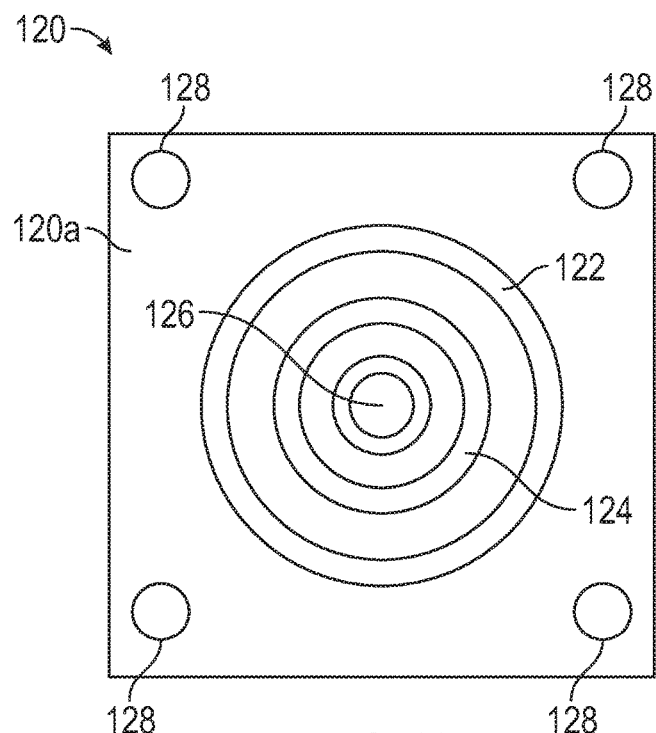
FIG. 11 is a bottom cross-sectional view of an upper housing according to an embodiment of the present invention.

FIG. 11 shows a bottom section view of the upper housing 120 according to an embodiment of the present invention. The upper housing 120 includes a circular-shaped outer ridge 122 defining a contour of the chamber formed in the valve body 110 of the dual-action dynamic valve 100. The upper ridge 122 receives the O-ring 154 to form an air tight seal for the chamber 150. The upper housing 120 also includes a circular-shaped inner ridge 124 concentric to the outer ridge 122. The inner ridge 124 aligns with the perimeter of the shuttle mechanism 160 in which the shuttle mechanism 160 is spring-loaded against the upper housing 120. The upper housing 120 further defines a central hole 126 that receives the post 172 extending through the upper housing 120. The upper housing 120 includes mounting holes 128. In one embodiment, a mounting hole 128 is positioned at each corner of the upper housing 120. Each mounting hole 128 of the upper housing 120 is aligned with a respective mounting hole of the lower housing 130 so that a fastener may be received within each pair of aligned mounting holes, thereby ensuring that the lower housing 130 and upper housing 120 are secured together.

Figure 12:
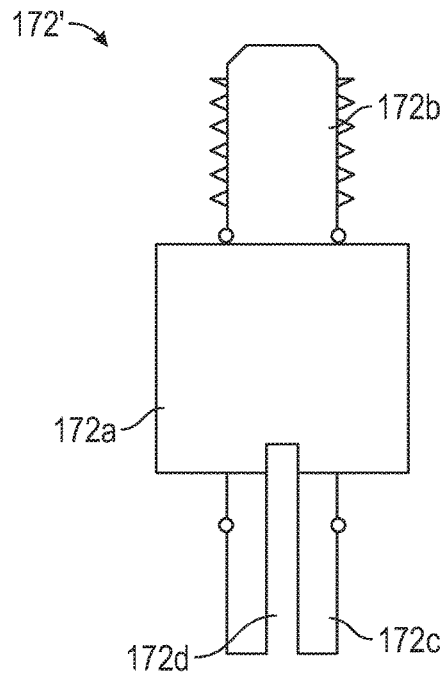
FIG. 12 is a side view of a post according to an embodiment of the present invention.

FIG. 12 illustrates an alternative embodiment of the post 172' according to the present invention, wherein post 172' is configured to be received in the central cavity 137e of the inner body 136' shown in FIGS. 6a-c. As shown in FIG. 12, the post 172' includes a spindle 172a and a head 172b projecting from an upper surface of the spindle 172a. The head 172b of post 172' is configured to extend outside the valve body 110 and receive the first end 142 of the control arm 140 and the nut 174 to secure the control arm 140 to the valve body 110. The post 172' further includes a leg 172c projecting from a lower surface of the spindle 172a. The leg 172c defines a slot 172d that is configured to be aligned with the pair of cross-holes 137f and 137g of the inner body 136'. Accordingly, slot 172d of post 172' allows the first port 134c to be linked with the second port 134d when the dual-action dynamic valve 100 is set to a base position. As a result, the first set of air springs communicate with the second set of air springs, thereby equalizing air pressure between the first and second set of air springs. When the control arm 140 is rotated clockwise or counter-clockwise, the slot 172d of the post 172' is set to a different angular position, wherein the slot 172d of the post 172' is not aligned with cross-holes 137f and 137g. Consequently, the first set of air springs do not communicate with the second set of air springs as the control arm is rotated clockwise or counterclockwise from its horizontal position.

Figure 13A:
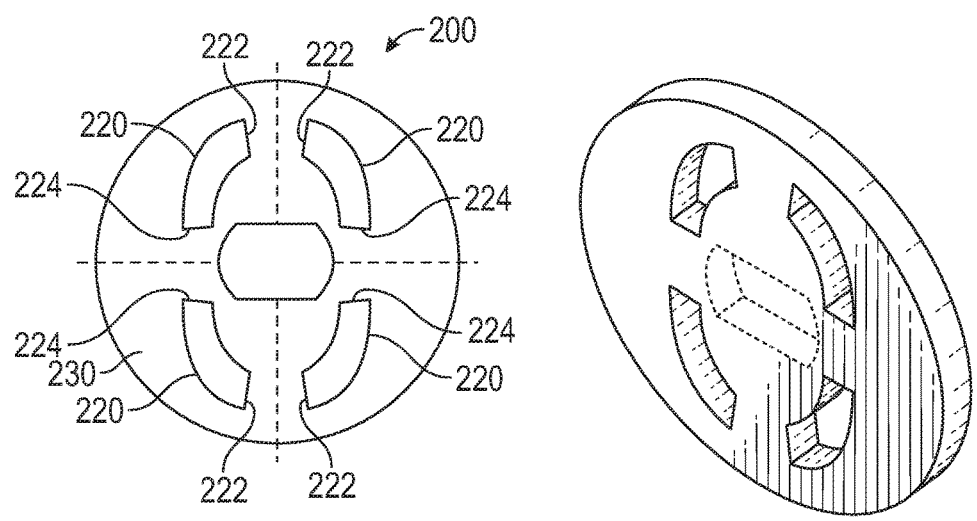
FIGS. 13a and 13b are schematic drawings of a rotary disk according to an embodiment of the present invention.
Figure 13B:
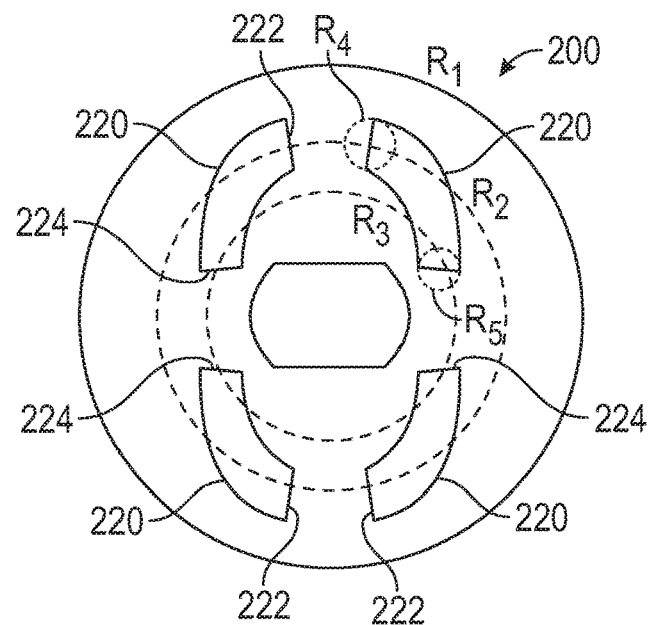

FIGS. 13a and 13b illustrate an exemplary embodiment of the shuttle mechanism 160 according to the present invention, in which the shuttle mechanism 160 comprises a rotary disk 200. As shown in FIGS. 13a and 13b, the rotary disk 200 defines a central aperture 210 that is configured to receive a supporting element, such as a post, to secure the rotary disk 200 within the chamber 150 of the valve body 110. The rotary disk 200 is configured to rotate about the supporting element, thereby defining the central aperture 210 as a pivot point. The rotary disk 200 includes four oblong-shaped slots 220 spaced around the central aperture 210 with dead band 230 defined therebetween and along the periphery of the rotary disk 200. Referring to FIG. 13b, the four slots 220 are not concentrically arranged around the central aperture 210. Each slot 220 includes a first end 222 positioned adjacent to or overlying one of the respective supply or exhaust cavities. Each slot 220 includes a second end 224 overlying one of the respective first or second cavities of the lower housing 130. The first end 222 of each slot 220 overlies a circle defined radius $R_2$, and the second end 224 of each slot 220 overlies a circle defined radius $R_3$, in which radius $R_2$ is different than radius $R_3$. Furthermore, as shown in FIGS. 13a and 13b, the width of the first end 222 of the slot 220 is different than the width of the second end 224 of the slot 220. FIG. 13a shows the design embodiment in which the width of each slot 220 narrows from the first end 222 to the second end 224. Accordingly, the first end 222 of the slot 220 is configured to overlie a larger portion of a respective cavity, as indicated by radius $R_4$ in FIG. 13b, when the rotary disk 200 is slightly rotated to a lower rotation angle. The second 224 of the slot 220 is configured to overlie a small portion of a respective cavity, as indicated by radius $R_5$ in FIG. 13b, when the rotary disk 200 is further rotated to a higher rotation angle. Due to the number and the shape of the slots 220, the rotary disk 200 possesses less surface area of dead band 230 compared to the surface area of dead band in rotary disks of conventional valves of the prior art. Rotary disk 200 may be provided in combination with a secondary disk 450 as shown in FIG. 26b and described below. The rotary disk 200 may be stacked in an aligned manner with a secondary disk 450 in the valve body 110.

In the illustrated embodiment, the placement of the four slots 220 along the rotary disk 200 is designed so that the four slots 220 can overlie each cavity of the lower housing 130, including the supply cavity 138a, exhaust cavity 138b, the first cavity 138c, and the second cavity 138d, depending on the angular position of the rotary disk 200. However, when the rotary disk 200 is set to a base position, the dead band 230 of the disk 200 covers both the supply cavity 138a and the exhaust cavity 138b of the lower housing 130. As a result, when the rotary disk 200 is set to the base position, none of the slots 220 in the rotary disk 200 overlie the supply cavity 136 or the exhaust cavity 137 of the lower housing 130.

Figure 14A:
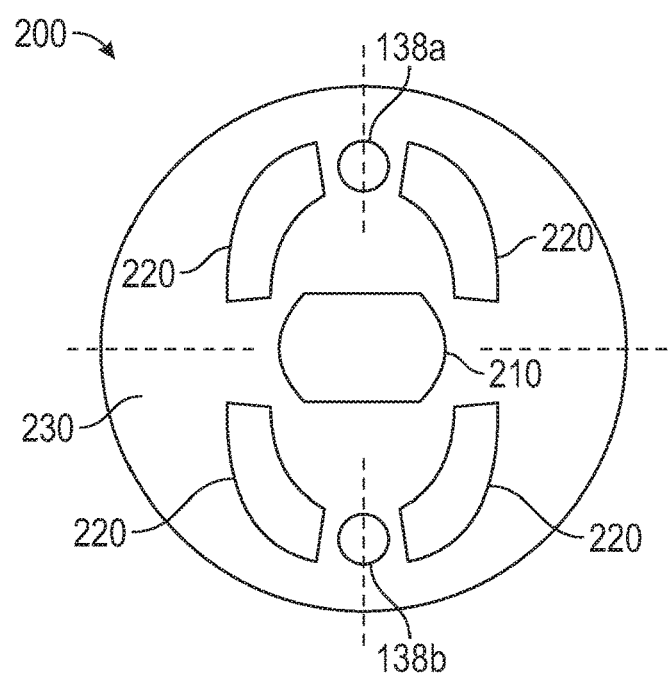
FIGS. 14a-c are schematic drawings of a rotary disk at different angular positions according to one embodiment of the present invention.
Figure 14B:
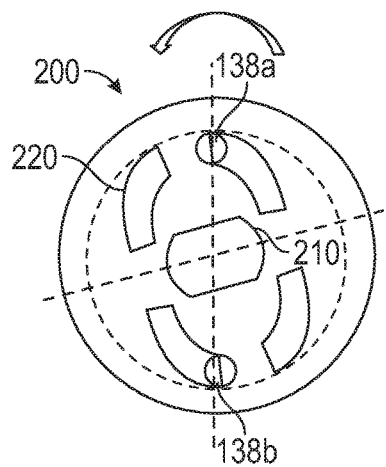
Figure 14C:
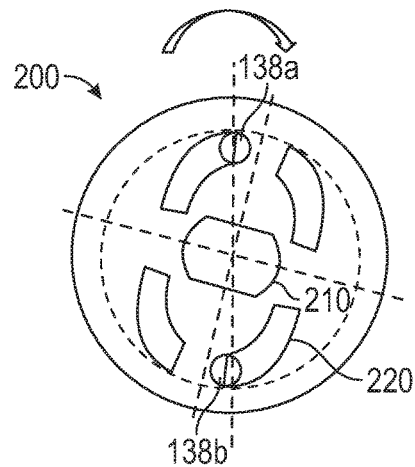
Figure 15A:
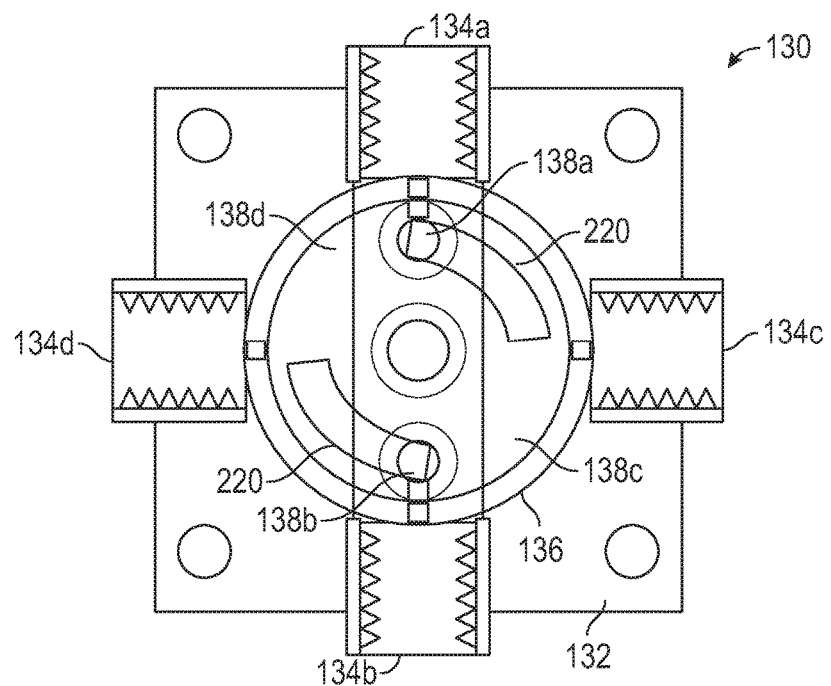
FIGS. 15a and 15b are top section views of a lower housing showing the contour of a pair of respective slots of a rotary disk according to an embodiment of the present invention.
Figure 15B:
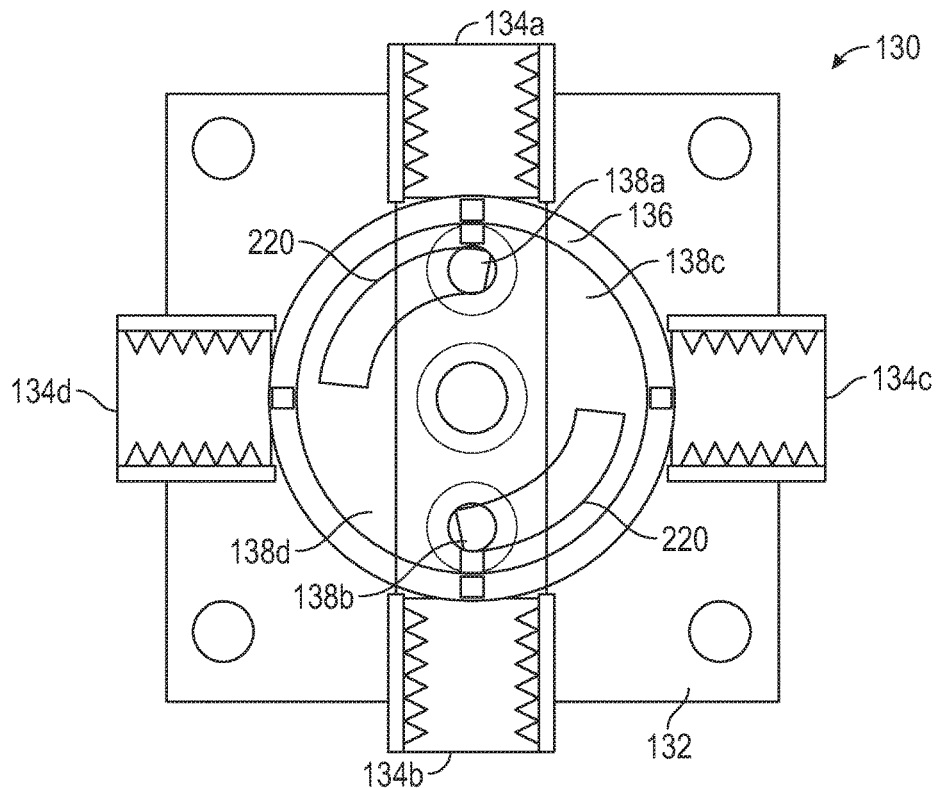

FIGS. 14a-c and 15a-b illustrate the operation of the rotary disk 200 in response to the clockwise and counter-clockwise rotation of the control arm 140. The alignment between the slots 220 of the rotary disk 200 and the cavities of the lower housing 130 is determined by the angular position of the rotary disk 200. The angular position of the rotary disk 200 changes as the control arm 140 pivots about the valve body 110 of the dual-action dynamic valve 100. As shown in FIG. 14a, when the control arm 140 is set to a horizontal position, the rotary disk 200 is set to a base position, in which the dead band 230 of the rotary disk 200 overlies both the supply cavity 138a and the exhaust cavity 138b of the lower housing 130. Consequently, when the rotary disk 200 is set at the base position, all ports are closed, and the air springs are connected to neither the supply port 131 nor the exhaust port 132. As shown in FIGS. 14b and 15a, due to counterclockwise rotation of the control arm 140, the rotary disk 200 rotates to an angular position in which the arrangement of slots 220 connects the supply cavity 138a with the first cavity 138c and the exhaust cavity 138b with the second cavity 138d. Consequently, air is supplied to the first set of air springs, and air is simultaneously purged from the second set of air springs. As shown in FIGS. 14c and 15b, due to clockwise rotation of the control arm 140, the rotary disk 200 rotates to an angular position in which the arrangement of slots 220 connects the supply cavity 138a with the second cavity 138d and the exhaust cavity 138b with the first cavity 138c. Accordingly, air is supplied to the second set of air springs, and air is simultaneously purged from the first set of air springs. As a result, dual-action dynamic valve 100 is capable of simultaneously supplying air to one set of air springs of the vehicle while exhausting air from of the other set of air springs of the vehicle. The dual-action dynamic valve 100 accomplishes the simultaneous action of supplying and exhausting air by only using one rotating disk, thereby simplifying the installation process and reducing costs.

Figure 16:
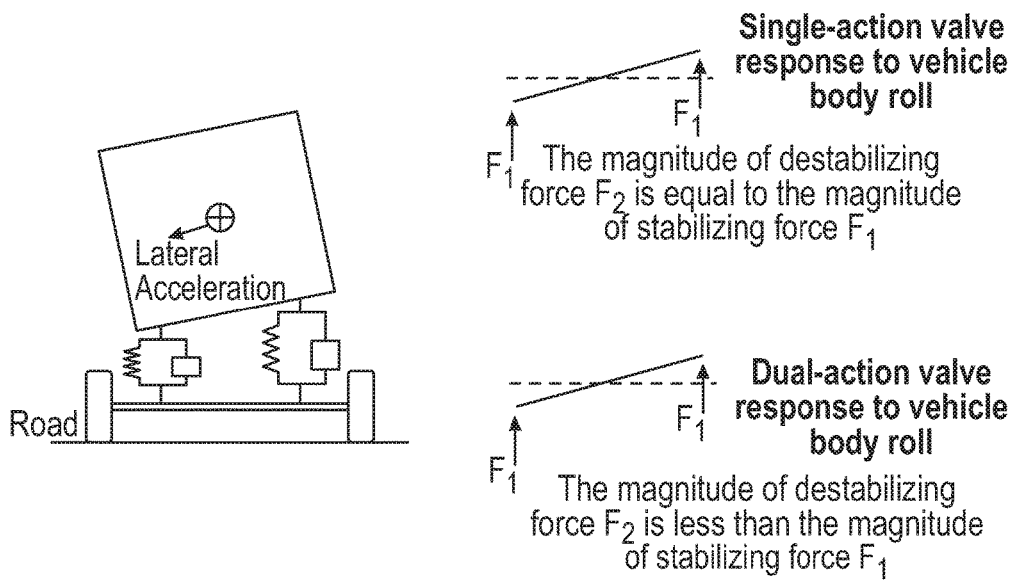
FIG. 16 is a schematic force body diagram of a vehicle having a pneumatic suspension system.

Furthermore, because the dual-action dynamic valve 100 is capable of simultaneously supplying air to a first set of air springs and purging air from a second set of air springs, a suspension system incorporating the dual-action dynamic valve 100 according to the present invention is able to increase desirable stabilizing forces on one side of the vehicle while reducing undesirable destabilizing forces on the other side of vehicle. In contrast, single action valves of the prior art are only capable of applying an equal force to each side of the vehicle. For example, as shown in FIG. 16, if the vehicle is negotiating a turn, the body of the vehicle tends to lean to one side, nominally to its side facing outside the turn, resulting in more weight distributed to that side of the vehicle. In response, the dual-action dynamic valve 100 is capable of supplying air to the air springs positioned on the side of the vehicle facing the turn, while simultaneously removing air from the air springs positioned on the opposite side of the vehicle, thereby quickly increasing the stability of the moving vehicle by concerted action. Prior art valves were incapable of providing stabilizing force while minimizing destabilizing force. Consequently, vehicles that include a suspension system incorporating a dual-action dynamic valve 100 according to the present invention are capable of maneuvering sharp turns at faster speeds with less likelihood of overturning.

Figure 17:
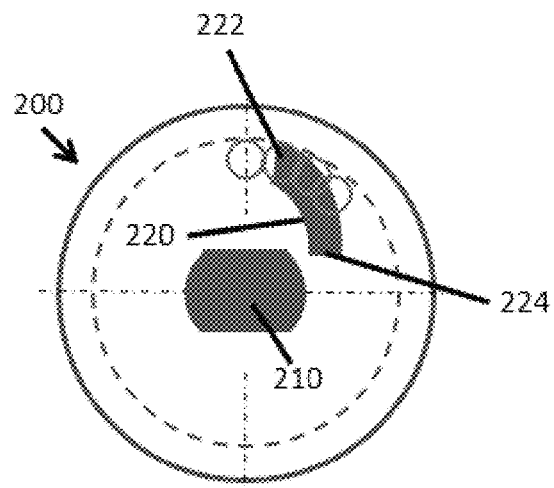
FIG. 17 is a schematic drawing of the rotary disk according to an embodiment of the present invention.

Along with simultaneously providing air to a first set of air springs while purging air from a second set of air springs, the rotary disk 200 also controls the rate of airflow through each port of the lower housing 130 as the rotary disk 200 is rotated to different angular positions. As shown in FIG. 17, the first end 222 of a respective slot 220 is different in width than the second end 224 of the respective slot 220. The exemplary embodiment in FIG. 17 shows the rotary disk 200 in which first end 222 of a respective slot 220 is wider than second end 224 of respective slot 220. Furthermore, the size of the supply cavity 138a and the exhaust cavity 138b are enlarged compared to cavities in conventional valves by having a diameter ranging from 3.0 mm to 10.0 mm.

According to the arrangement in FIG. 17, when the rotary disk 200 is rotated at a lower rotation angle and one of the slots 220 starts to overlap the supply or exhaust cavity of the lower housing, a greater portion of the supply or exhaust cavity is exposed by the respective slot 220 due to the substantial width of the first end 222 and the enlarged diameters of the supply and exhaust cavities. However, when the rotary disk 200 is rotated at a higher rotation angle, a smaller portion of the supply or exhaust cavity is exposed by the respective slot 220 because the slot narrows toward its second end 224. Thus, in situations when the rotary disk 200 is slightly rotated by the control arm 140, there is less restriction of air flow between the connected ports, thereby providing a rapid increase in the mass flow rate of air flowing through the airflow passages in the lower housing 130.

Figure 31A:
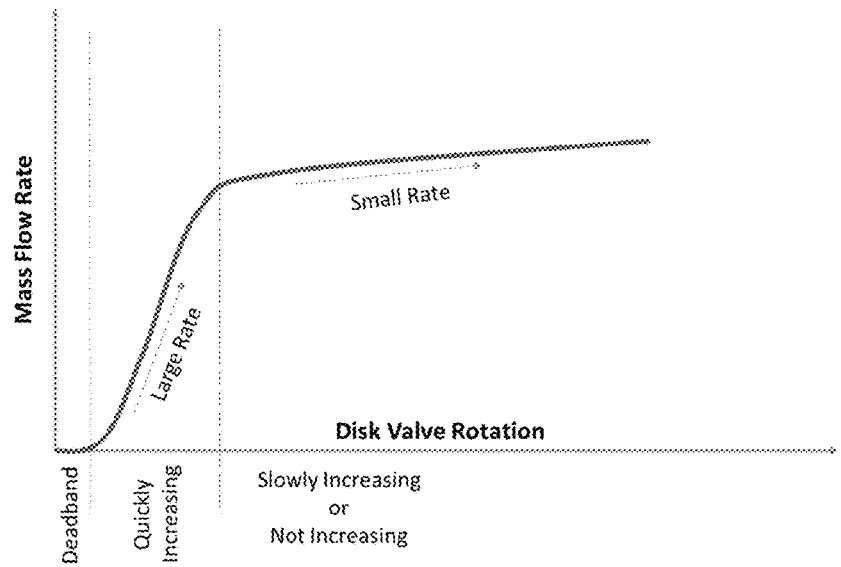
FIGS. 31a and 31b are schematic illustrations of the relationship between the degree of disk rotation and the flow rate of air according to the present invention.

FIG. 31a illustrates the relationship between the degree of disk rotation and the flow rate of air according to the present invention. As shown in FIG. 31a, the x-axis reflects the degree of disk rotation, and the y-axis indicates the mass flow rate of air flowing through the dynamic dual-action valve. Accordingly, the change of the mass flow rate may be determined by taking the slope (i.e. derivative) of the line indicating the mass flow rate with respect to the degree of rotation. The base position of the rotary disk according to the present invention corresponds to the intersection between the x-axis and the y-axis. As shown in FIG. 31a, dual-action dynamic valve 100 is configured such that the flow rate changes at a rapid rate as the rotary disk is rotated by a small degree. On the other hand, as rotary disk 200 is rotated even more by the control arm 140, there is more restriction of air flow between the connected ports, thereby providing a steady state mass flow rate of air flowing through the air passages in the lower housing 130. As shown by the graph in FIG. 31a, the mass flow rate of air approaches a steady state as the rotary disk is rotated by a greater degree. The graph in FIG. 31a also shows that the mass flow rate of air is approximately zero when dead band of the rotary disk overlies the supply and exhaust cavities of the lower housing.

Because the flow rate of air passing through the dual-action dynamic valve 100 is greater when the rotary disk 200 is slightly rotated, the dual-action dynamic valve 100 is more responsive to the initial movement of the control arm 140. Consequently, the dual-action dynamic valve 100 may alter the air pressure of the air springs at a faster rate in response to a dynamic weight shift upon the suspension system of the vehicle. However, because altering the air pressure of the air springs too dramatically can leave the vehicle more at risk of overturning by overcompensating or undercompensating the pressure of the air springs, the dual-action valve is adapted as described above to limit the flow rate of air passing through the ports of the lower housing 130 as the rotary disk 200 is further rotated to a greater rotation angle. Thus, compared to the initial response by the dual-action dynamic valve 100, farther pivoting of the control arm 140 in response to the weight shift of the moving vehicle results in slower alteration of the pressures of the air springs. As a result, the shape profile of the slots 220 in the rotary disk 200 mitigate the risk of over-pressuring or under-pressuring the air springs while still allowing the dual-action dynamic valve 100 to be responsive to a dynamic load placed upon the suspension system of the vehicle.

FIGS. 18, 19, 20a and 21a illustrate different views of a dual-action dynamic valve 300 according to an alternative embodiment of the present invention. The dual-action dynamic valve 300 shown in FIGS. 18, 19, 20a and 21a includes a valve body 310 comprising an upper housing 320 mounted to a lower housing 330, wherein a control arm 340 is attached to the upper housing 320. The upper housing 320 is mounted to the lower housing 330 by two sets of screws 312 and 314 that are received in mounting holes that extend through corners of the upper housing 330 and the lower housing 330.

Figure 18:
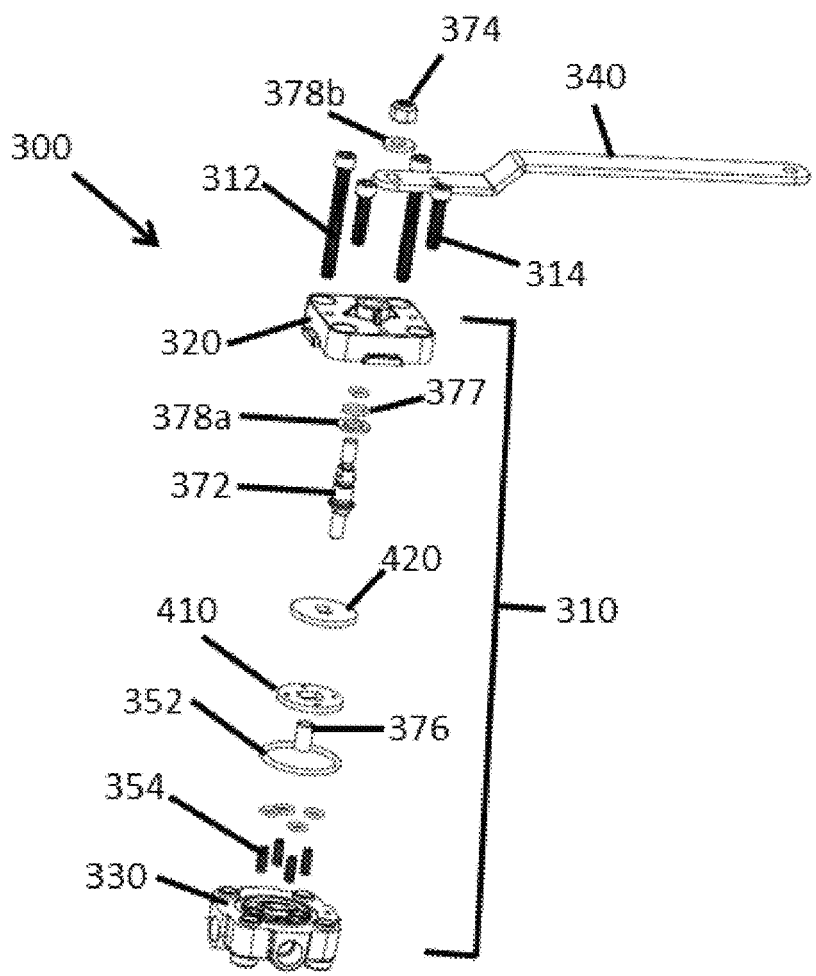
FIG. 18 is an exploded view of a dual-action dynamic valve according to an embodiment of the present invention.
Figure 19:
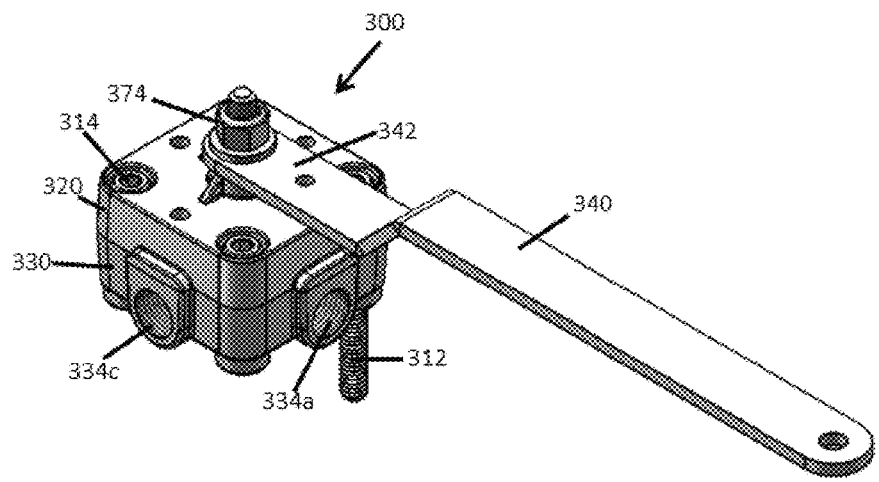
FIG. 19 is a perspective view of the dual-action dynamic valve according to an embodiment of the present invention.
Figure 20A:
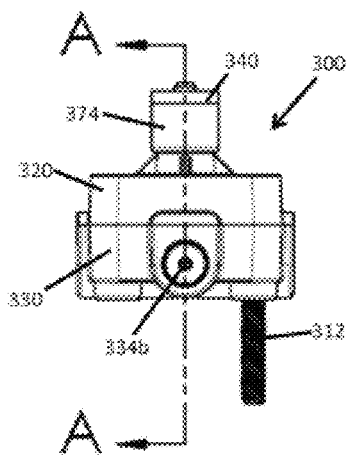
FIGS. 20a and 20b are side and side cross-sectional views, respectively, of the dual-action dynamic valve according to an embodiment of the present invention.
Figure 20B:
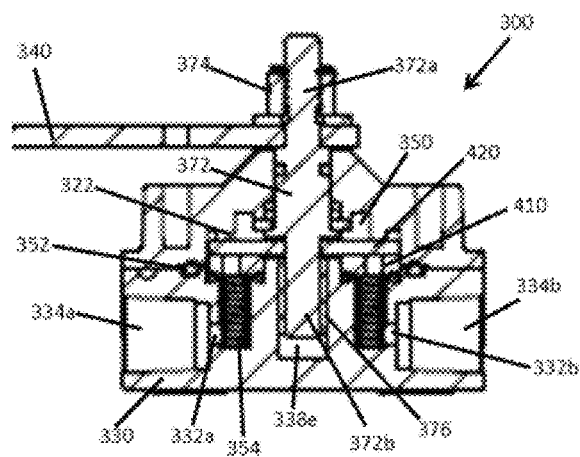

As shown in FIGS. 20b and 21b, the valve body 310 defines a chamber 350 between the upper housing 320 and the lower housing 330. Referring to FIGS. 18, 20b and 21b, the valve body 310 includes a first O-ring 352 positioned between the upper housing 320 and the lower housing 330 to ensure an airtight seal for chamber 350. The chamber 350 receives one or more shuttle mechanisms and one or more supporting elements that are connected to the control arm 340. In the illustrated embodiment shown in FIGS. 18, 20a-b and 21a-b, the shuttle mechanisms include an auxiliary disk 410 and a rotary disk 420, in which the auxiliary disk 410 and the rotary disk 420 are stacked in an aligned manner and spring loaded against a first surface 322 of the upper housing 320 by a plurality of compression springs 354.

Furthermore, in the illustrated embodiment shown in FIGS. 18, 20a-b and 21a-b, the supporting elements include a post 372 that extends through the chamber 150 with a first end 372a of the post 372 projecting from the upper surface of the upper housing 320 and a second end 372b of the post 372 received in the lower housing 330. In certain embodiments, post 372 does not have a slot at its second end 372b as shown in FIG. 20b. The first end 342 of the control arm 340 is received on the first end 372a of the post 372 projecting from an upper surface of the upper housing 320. The supporting elements further include a nut 374 received on the first end 372a of the post 372 to secure the control arm 340 to the upper housing 320. Accordingly, the control arm 340 is connected to both the auxiliary disk 410 and the rotary disk 420 by the post 372, wherein pivoting of the control arm 340 induces rotation of the rotary disk 420. The support elements further include a bushing 376 surrounding the second end 372b of the post 372. The bushing 376 is configured to hold the auxiliary disk 410 in a stationary state while the rotary disk 420 is rotating. Thus, as the leveling arm 340 is pivoting, the rotary disk 420 rotates to a different angular position, and the auxiliary disk 410 is held in a stationary state, remaining in the same angular position. The support elements further include an O-ring 377 secured around the post 372 in chamber 350 to ensure an airtight seal between the post 372 and the upper housing 320. The support elements also include a set of washers 378a and 378b secured around the post 372 to ensure that the rotary disk 420 and control arm 340 may rotate about the post 372. Similar to the embodiment of the dual-action dynamic valve 100 shown in FIGS. 4-17, the dual action dynamic valve 300 requires the use of only one control arm 340 to alter communication between the airflow passages and the different ports of the lower housing 330.

Referring to FIG. 22, the lower housing 330 comprises at least four ports 334a-d, including a supply port 334a, which connects to an air tank (not shown), an exhaust port 334b for purging air from the air springs (not shown), a first port 334c which connects to a first set of air springs (not shown), and a second port 334d which connects to a second set of air springs (not shown). The first and second ports 334c and 334d are arranged so that the dual-action dynamic valve 300 is connected to both the air springs on a right side of a vehicle and air springs on a left side of the vehicle. The ports 334a-d are further arranged so that supply port 334a on one side of the lower housing 330 coincides with the exhaust port 334b on an opposite side of lower housing 130.

As shown in FIGS. 20b and 21b, the lower housing 330 includes separate airflow passages 332a-d to each port 334a-d of the lower housing, so that air supplied and purged for the first set of springs occurs independently to the air supplied and purged for the second set of springs. Referring to FIG. 22, the lower housing 330 includes a first surface 336 defining a plurality of circular-shaped cavities 338a-d. The supply port 334a is linked to a supply cavity 338a by airflow passage 332a of the lower housing 330, and the exhaust port 334b is linked to an exhaust cavity 338b by airflow passage 332b of the lower housing 330. Furthermore, the first port 334c is linked to a first cavity 338c by airflow passage 332c of the lower housing 330, and the second port 334d is linked to a second cavity 338d by airflow passage 332d of the lower housing 330. Each cavity 338a-d receives one of the compression springs 354 so that the auxiliary disk 410 and the rotary disk 420 of the shuttle mechanism are spring loaded against the first surface 322 of the upper housing 320, thereby ensuring an air tight seal between the cavities 338a-d of the lower housing 330 and the stacked auxiliary disk 410 and rotary disk 420. The lower housing 330 further includes a central cavity 338e configured to receive the second end 372b of the post 372. The plurality of cavities 338a-d are spaced symmetrically around the central cavity 338e along the first surface 336 of the lower housing 330.

Figure 32:
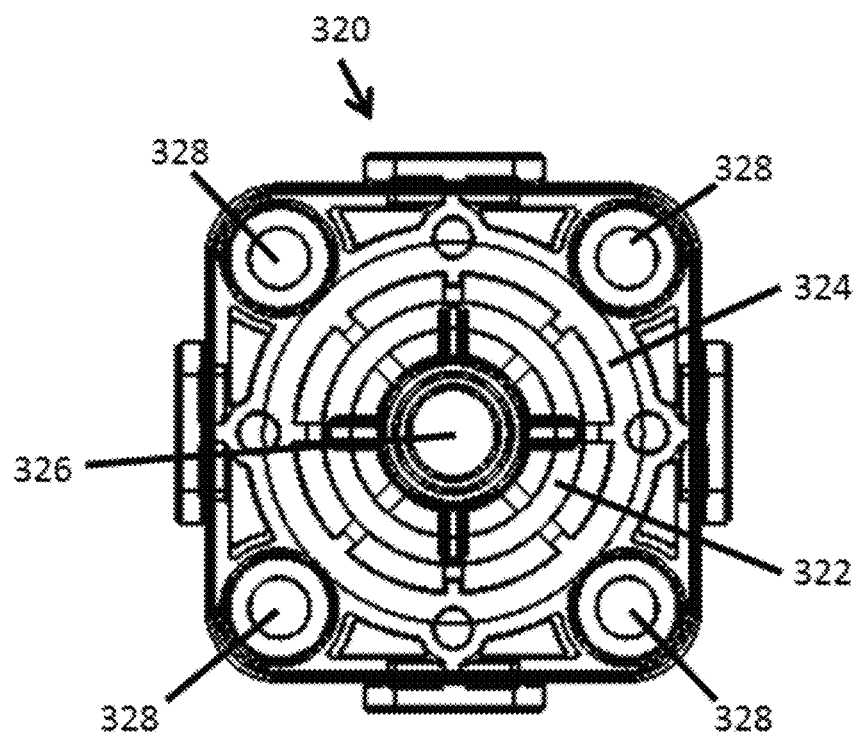
FIG. 32 is a bottom section view of the upper housing according to an embodiment of the present invention.
Figure 33:
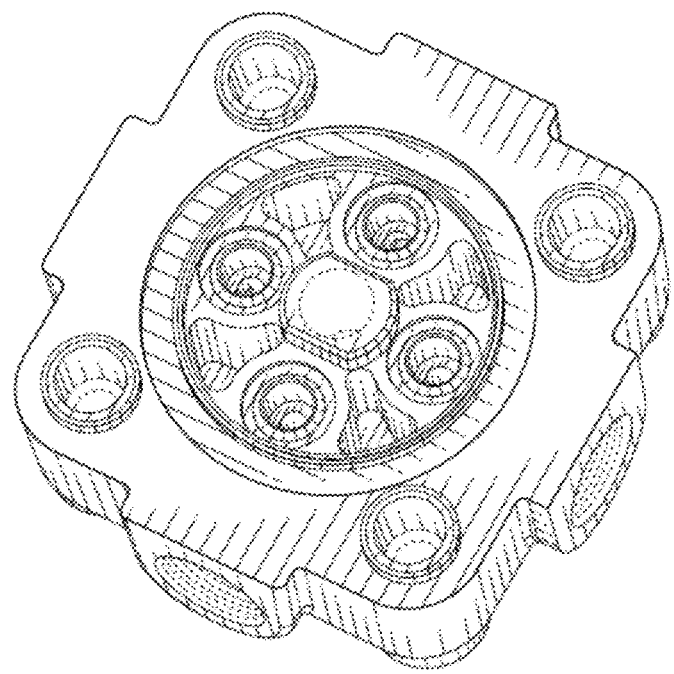
FIG. 33 is a perspective of a lower housing according to an embodiment of the present invention.
Figure 34:
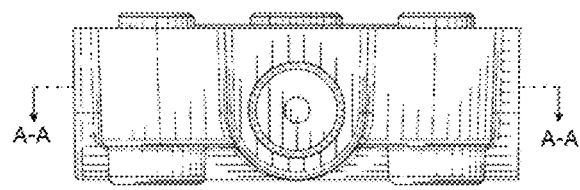
FIG. 34 is a side view of a lower housing according to an embodiment of the present invention.
Figure 35A:
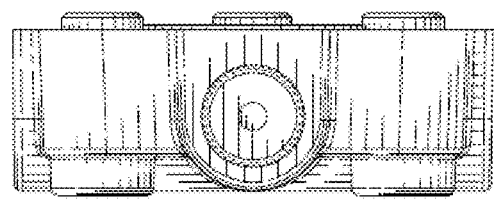
FIGS. 35a and 35b are, respectively, opposite side views of a lower housing according to an embodiment of the present invention.
Figure 35B:
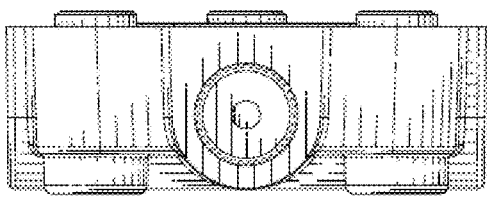
Figure 36:
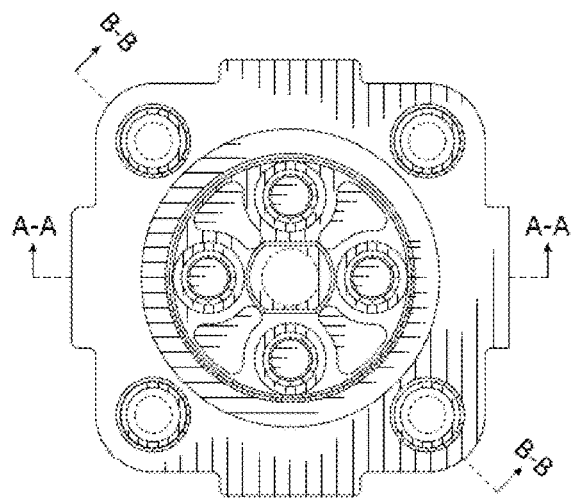
FIG. 36 is a top view of a lower housing according to an embodiment of the present invention.
Figure 37:
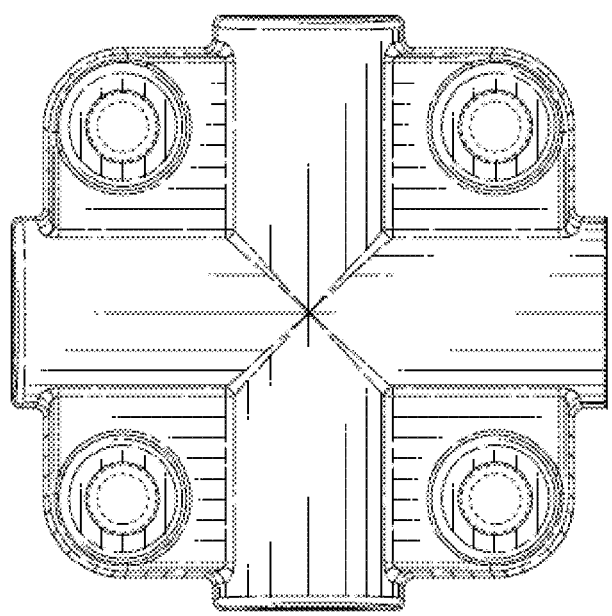
FIG. 37 is a bottom view of a lower housing according to an embodiment of the present invention.
Figure 38:
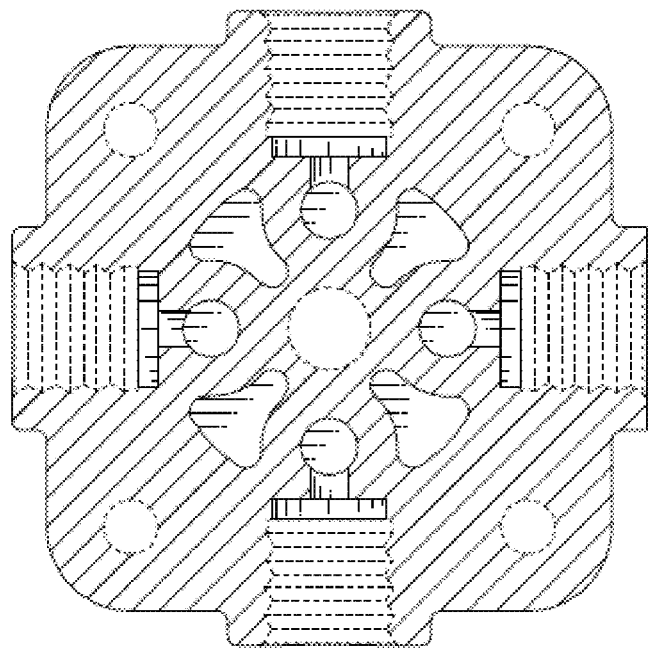
FIG. 38 is a top cross-sectional view of a lower housing taken along the lines A-A of FIG. 34 according to an embodiment of the present invention.
Figure 42C:
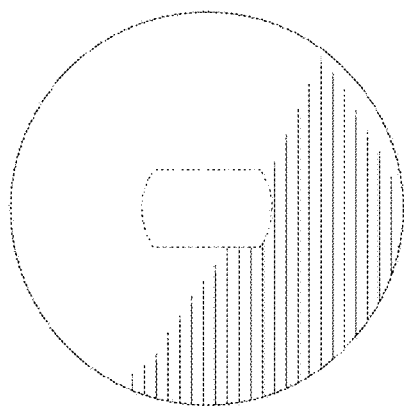
FIG. 42c is a top view of a rotary disk according to an embodiment of the present invention.
Figure 42D:
FIG. 42d is a side view of a rotary disk according to an embodiment of the present invention.
Figure 42E:
FIG. 42e is a cross-sectional view of a rotary disk taken along lines A-A of FIG. 39b according to an embodiment of the present invention.
Figure 43A:
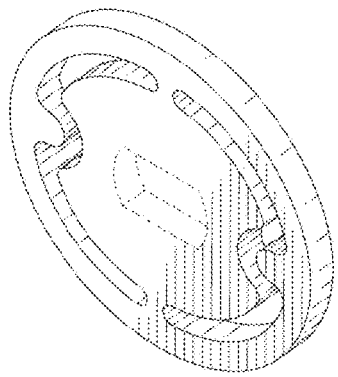
FIG. 43a is a perspective view of a rotary disk according to an embodiment of the present invention.
Figure 43B:
FIG. 43b is a side view of a rotary disk according to an embodiment of the present invention.
Figure 43C:
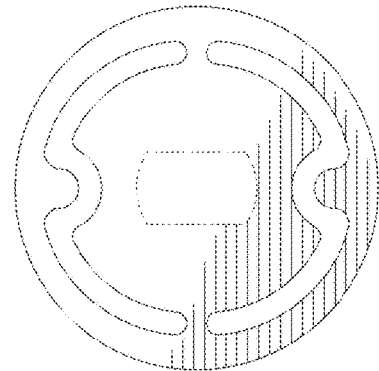
FIG. 43c is a bottom view of a rotary disk according to an embodiment of the present invention.

FIG. 32 shows a bottom cross-sectional view of the upper housing 320 according to an embodiment of the present invention. The upper housing 320 includes a circular-shaped outer ridge 324 defining a contour of the chamber 350 formed in the valve body 320. The upper ridge 324 receives the O-ring 352 to form an air tight seal for the chamber 350. The first surface 322 of the upper housing 320 extends within the outer ridge 324, whereby the rotary disk 420 is spring loaded against the first surface 322 of the upper housing 320. The upper housing 320 further defines a central hole 326 that receives the first end 372a of the post 372. The upper housing 320 includes a plurality of mounting holes 328. In one embodiment, a respective mounting hole 328 is positioned at each corner of the upper housing 320. Each mounting hole 328 of the upper housing 320 is aligned with a respective mounting hole of the lower housing 330 so that one of the screws 312 and 314 may be received through the aligned mounting holes, thereby ensuring that the lower housing 330 and upper housing 320 are secured together.

Figure 23A:
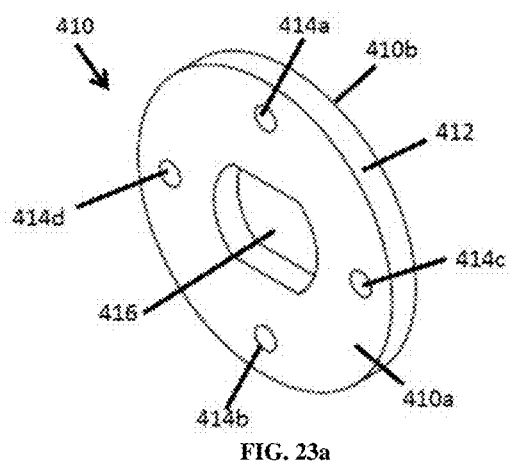
FIGS. 23a and 23b are perspective and top views of an auxiliary disk according to an embodiment of the present invention.
Figure 23B:
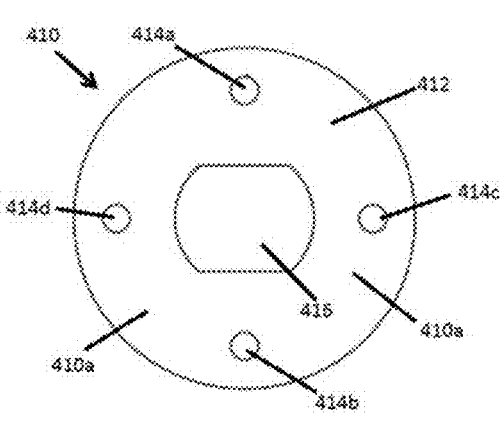

FIGS. 23a and 23b illustrate an exemplary embodiment of the auxiliary disk 410 according to the present invention. Auxiliary disk 410 comprises a circular-shaped disk body 412 and a plurality of holes 414a-d aligned with and overlying cavities 338a-d of the lower housing 330. The plurality of holes 414a-d include: a supply hole 414a overlying the supply cavity 338a of lower housing 330, an exhaust hole 414b overlying the exhaust cavity 338b of the lower housing 330, a first hole 414c overlying the first cavity 338c of the lower housing 330, and a second hole 414d overlying the second cavity 338d of the lower housing 330. In the illustrated embodiment, the four holes 414a-d are equally spaced apart along the periphery of the auxiliary disk 410 by about 90°.

The auxiliary disk 410 further includes a central hole 416 aligned with and overlying the central cavity 138e of the lower housing 330. Accordingly, the second end 372b of the post 372 extends through the central hole 416 of the valve puppet 410, thereby securing the auxiliary disk 410 within the chamber 350 of the valve body 310. The auxiliary disk 410 diminishes the spring force needed to seal the rotary disk 420 against the upper housing 320 of the valve body by increasing the contact surface area between the compression springs 354 and rotary disk 420. Thus, auxiliary disk 410 ensures an air tight seal between cavities 338a-d of the lower housing 330 and rotary disk 420.

Figure 23C:
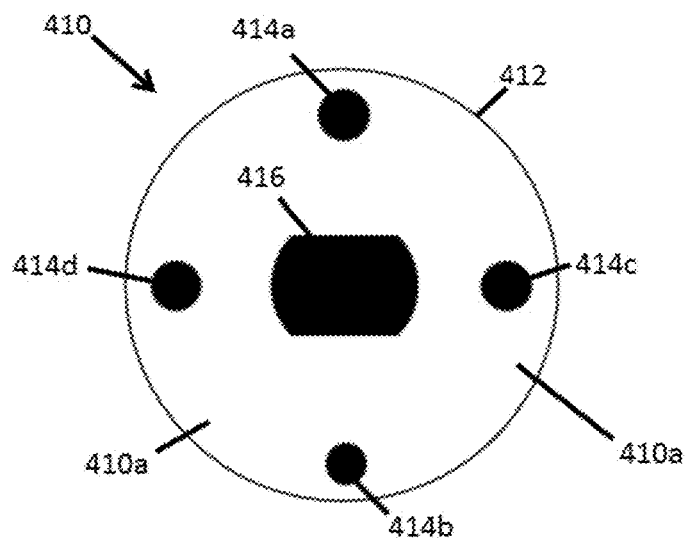

FIG. 23c illustrates auxiliary disk 410 wherein holes 414a-d have different sizes. The supply hole 414a includes a first diameter, and the exhaust hole 414b includes a second diameter, in which the first diameter of the supply hole 414a is larger than the second diameter of the exhaust hole 414b. The first hole 414c and the second hole 414d each include a third diameter, in which the size of the first hole 414c is substantially equal to the size of the second hole 414d. The second diameter of the exhaust hole 414b is smaller than the third diameter of the first and second holes 414c, 414d so that the exhaust hole 414b is smaller than the supply, first, and second holes 414a, 414c, and 414d. The size of each hole 414a-d is selected to accommodate the necessary airflow between the respective ports of the dual-action dynamic valve 300. Accordingly, the holes 414a-d are one of the means for the dual-action dynamic valve 300 to tune the airflow as the rotary disk is rotated to different angular positions.

Figures 23C, 23D:
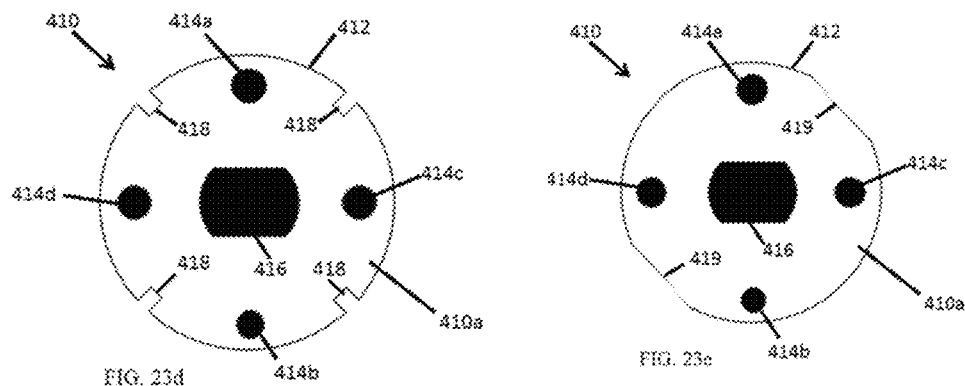

FIGS. 23d and 23e illustrate exemplary embodiments of the auxiliary disk 410 according to the present invention. The auxiliary disk 410 shown in FIG. 23d is similar to the auxiliary disk 410 shown in FIGS. 23a-c. However, the auxiliary disk 410; includes one or more notches 418 disposed along the peripheral edge of the auxiliary disk 410. The auxiliary disk 410" shown in FIG. 23e includes one or more flat edges 419 disposed along the peripheral edge of the auxiliary disk 410'. The notches 418 and flat edges 419 assist in positioning and holding the auxiliary disk 410 in place against the lower housing 330, thereby ensuring that the auxiliary disk.410 remains fixed to the lower housing 330 in a stationary state.

Figures 24A, 24B:
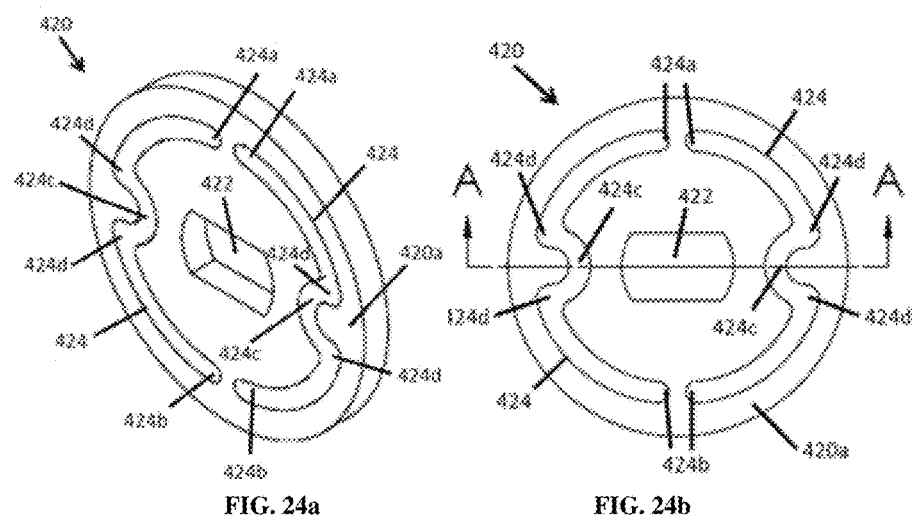
FIGS. 24a-c are perspective, bottom, and side cross-sectional views of a rotary disk according to an embodiment of the present invention.
Figure 24C:
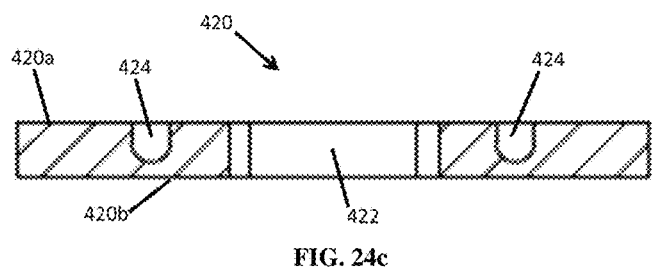

FIGS. 24a-c illustrate an exemplary embodiment of the rotary disk 420 according to the present invention. As shown in FIGS. 24a-c, the rotary disk 420 includes a first surface 420a configured to mate with an upper surface 410a of the auxiliary disk 410 and a second surface 420b pressed against the first surface of the upper housing 320. In the illustrated embodiment, the size of the rotary disk 420 is equivalent to the size of the auxiliary disk 410 so that the outer edge of the rotary disk 420 is flush with the outer edge of the auxiliary disk 410. However, the size of the rotary disk 420 may also be varied in relation to the size of the auxiliary disk 410 according to other embodiments without departing from the scope of the present invention. The rotary disk 420 includes a central aperture 422 that is configured to receive the post 372 to secure the rotary disk 420 within the chamber 350 of the valve body 310. The rotary disk 420 is configured to rotate about the post 472, thereby defining the central aperture 422 as a pivot point. The rotary disk 420 rotates with respect to the auxiliary disk 410 between one or more angular positions, while the auxiliary disk 410 is held in a stationary state against the lower housing 330.

The rotary disk 420 includes two arcuate-shaped grooves 424 spaced around the central aperture 422, wherein the contour of each groove 424 extends along the periphery of the rotary disk 424 between a first end 424a and a second end 424b of the groove 424. As shown in FIG. 24c, each groove 424 is recessed from the first surface 420a of the rotary disk 420 but does not extend entirely to second surface 420b of the rotary disk. Each groove 424 also includes a lip portion 424c formed between a pair of bend portions 424d, in which the lip portion 424c extends toward the central aperture 422 of the rotary disk 420. The lip portion 424c and bend portions 424d are positioned between the first end 424a and the second end 424b of the groove 424. The first surface 420a of the rotary disk 420 defines dead band between the contours of the grooves 424 and the central aperture 422 and an outer edge of the rotary disk 420.

In the illustrated embodiment, the placement of the two grooves 424 along the rotary disk 420 is designed so that the two grooves 424 can overlie each hole 414a-d of the auxiliary disk 410 and each cavity 338a-d of the lower housing 330 depending on the angular position of the rotary disk 420. However, when rotary disk 420 is set to a base position, the lip portion 424c and bend portions 424d of the grooves 424 circumvents both the supply hole 414a and exhaust hole 414b of the auxiliary disk 410 and the supply cavity 338a and the exhaust cavity 338 of the lower housing. The first surface 420a of the rotary disk 420 covers both supply hole 414a and exhaust hole 414b of the auxiliary disk 410 and the supply cavity 338a and the exhaust cavity 338b of the lower housing 330. Thus, when the rotary disk 420 is set to the base position, none of the grooves 424 in the rotary disk 420 overlie the supply hole 414a and exhaust hole 414b of the auxiliary disk 410 and the supply cavity 338a or the exhaust cavity 338b of the lower housing 330. Furthermore, when the rotary disk 420 is set to the base position, the first end 424a of each groove 424 partially overlies the first cavity 338c of the lower housing 330 and the first hole 414c of the auxiliary disk 410, and the second end 424b of each groove 424 partially overlies the second cavity 338d of the lower housing 330 and the second hole 414d of the auxiliary disk 410. Because the grooves 424 partially overlap the first hole 414c and second hole 414d of the auxiliary disk 410 and the first cavity 338c and the second cavity 338d of the lower housing 330 at the base position, the dual-action dynamic valve 300 may equalize the pressure between the first set of springs and the second set of springs when the control arm 340 is set to a horizontal position.

Similar to the rotary disk 200 of the first embodiment according to the present invention, the angular position of the rotary disk 420 shown in FIGS. 24a-c changes as the control arm 340 pivots about the valve body 310 of the dual-action dynamic valve 300. When the control arm 340 is set to a horizontal position, the rotary disk 420 is set to the base position, in which the first surface 420a of the rotary disk 420 overlies the both the supply cavity 338a and the exhaust cavity 338b of the lower housing 330. As the control arm 340 rotates in a counterclockwise direction, the rotary disk 420 rotates to a first angular position, in which the grooves 424 connect the supply cavity 338a with the first cavity 338c and the exhaust cavity 338b with the second cavity 338d. In particular, the first end 424a and one of the bend portions 424d of one of the grooves 424 overlies the first cavity 338c and the supply cavity 338a, respectively, and the second end 424b and one of the bend portions 424d of the other groove 424 overlies the second cavity 338d and the exhaust cavity 338b, respectively. Consequently, air is supplied to the first set of air springs, and air is simultaneously purged from the second set of air springs.

As the control arm rotates in a clockwise direction, the rotary disk 420 rotates to an angular position in which the arrangement of grooves 424 connects the supply cavity 338a with the second cavity 338d and the exhaust cavity 338b with the first cavity 338c. In particular, the first end 424a and one of the bend portions 424d of one the grooves 424 overlies the first cavity 338c and the exhaust cavity 338b, respectively, and the second end 424b and one of the bend portions 424d overlies the second cavity 338d and the supply cavity 338a, respectively. Accordingly, air is supplied to the second set of air springs, and air is simultaneously purged from the first set of air springs. Thus, dual-action dynamic valve 300 is capable of simultaneously supplying air to one set of air springs of the vehicle while exhausting air from of the other set of air springs of the vehicle.

Although each end of groove 424 has equal widths in the embodiment shown in FIGS. 24a-c, the width of end 424a of groove 424 may be different to the width of end 424b of groove 424 in an alternative embodiment. Accordingly, by providing the ends of each groove 424 with different width sizes, rotary disk 420 may control the airflow rate through each port of lower housing 330 as rotary disk 420 is rotated to a greater degree in either the clockwise or counterclockwise direction.

FIGS. 25a-d schematically illustrate rotary disk embodiments according to the present invention. Rotary disk 430 shown in FIGS. 25a-d includes a first surface 430a configured to mate with an upper surface 410a of the auxiliary disk 410 and a second surface (not shown) pressed against the first surface of the upper housing 320. Furthermore, the rotary disk 420 includes a central aperture 432 that is configured to receive the post 372 to secure the rotary disk 430 within the chamber 350 of the valve body 310, in which the rotary disk 430 is configured to rotate about the post 372. However, rather than having only a pair of arcuate-shaped grooves, the rotary disk 430 includes four blind grooves 434 spaced around the central aperture 432 and extended along the periphery of the rotary disk 430. In the illustrated embodiment, the placement of the four blind grooves 434 along the rotary disk 430 is designed so that the four blind grooves 434 can overlap each hole 414a-d of the auxiliary disk 410, including the supply hole 414a, exhaust hole 414b, the first hole 414c, and the second hole 414d, depending on the angular position of the rotary disk 430. However, when the rotary disk 434 is set to a base position, the first surface 430a (i.e. dead band) of the rotary disk 430 covers both the supply hole 414a and exhaust hole 414b of auxiliary disk 410.

The rotary disk 430 also includes a pair of optional connecting grooves or through holes 436, in which each connecting groove or through hole 436 extends between two respective blind grooves or through holes 434 of the rotary disk 430. In the illustrated embodiment, the connecting grooves 436 define an arcuate shape, in which the width of the connecting groove 436 remains substantially the same along the length of the connecting groove 436. However, in other embodiments, the connecting grooves 436 may define a varying contoured shape, e.g., an hourglass or hyperbola shape, in which the width of the connecting groove 436 is wider at its ends than along a central portion of the connecting groove 436. See, e.g., FIG. 25j. In view of the guidance provided in this disclosure, the shape of the connecting groove 436 may be altered accordingly so that the necessary flow rate of air is provided between a pair of blind grooves or through holes 434. Due to the connecting grooves 436 extending between a respective pair of blind grooves 434, the first and second air springs of the pneumatic suspension system are able to communicate with each other through the first and second ports 334c, 334d of the lower housing 330 when the rotary disk 430 is set in the base position, thereby establishing cross-flow between the first and second sets of air springs. In embodiments where the optional connecting grooves or through holes 436 are present, rotary disk 430 is analogous to rotary disk 420 shown in FIGS. 24a-d. In embodiments where the optional connecting grooves or through holes 436 are absent, rotary disk 430 is analogous to rotary disk 200 shown in FIGS. 14a-c.

Referring to FIGS. 25a-d, each blind groove 434 includes a first end 434a overlapping one of the respective first or second holes 414c, 414d of the auxiliary disk 410 and first or second cavities of the lower housing 330 when the rotary disk 430 is set to a base position. Accordingly, in one embodiment, when the rotary disk 430 is to set a base position, the first port (e.g., 334c or 134c) is in communication with the second port (e.g., 334d or 134d) of the lower housing (e.g., 330 or 130) due to the first ends 434a of the blind grooves 434 overlapping the first and second holes 414c, 414d of the auxiliary disk 410 and each connecting groove 436 linking a pair of respective blind grooves 434. Moreover, each blind groove 434 includes a second end 434b adjacent to but separated from one of the respective supply or exhaust holes 414 of the auxiliary disk 410 and the supply or exhaust cavities of the lower housing (e.g., 330 or 130) when the rotary disk 430 is set to a base position. Because the second ends 434b of the blind grooves 434 do not overlap either the supply or exhaust holes 414 of the auxiliary disk 410 in the base position, neither the supply port (e.g., 334a or 134a) nor the exhaust port (e.g., 334b or 134b) is in communication with the blind grooves 434 of the rotary disk 430 in the base position. Furthermore, in the illustrated embodiment, each end 434a and 434b of the blind grooves 434 defines straight lines, which form flat ends for each blind groove 434. The flat ends of the blind grooves 434 provide more exposure over a respective hole 414 of the auxiliary disk 410 compared to grooves having round ends. However, in other embodiments, the ends of one or more blind grooves 434 may be provided with non-flat, e.g., rounded edges.

Figure 25A:
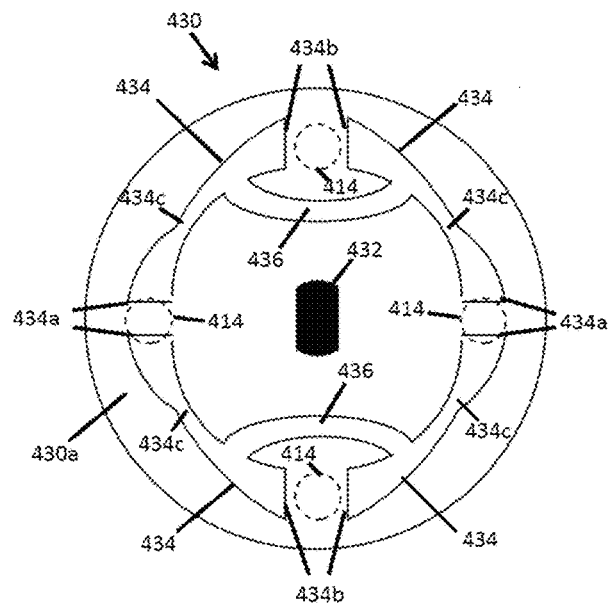
FIGS. 25a-d are schematic bottom views of a rotary disk according to an embodiment of the present invention.

FIGS. 25a-d illustrate the operation of the rotary disk 430 in response to the clockwise and counterclockwise rotation of the control arm 340. The alignment between the blind grooves 434 of the rotary disk 430 and the holes 414 of the auxiliary disk 410 is determined by the angular position of the rotary disk 430. The angular position of the rotary disk 430 changes as the control arm 340 pivots about the valve body 310 of the dual-action dynamic valve 300. As shown in FIG. 25a, when the control arm 340 is set to a horizontal position, the rotary disk 430 is set to a base position, in which the first surface 430a of the rotary disk 430 overlaps both the supply hole 414a and the exhaust hole 414b of the auxiliary disk 410. The first ends 434a of the blind grooves 434 overlap the first hole 414c and the second hole 414d of the auxiliary disk 410, thereby establishing communication between the first port (e.g. 334c or 134c) and the second port (e.g., 334d or 134d) of the lower housing (e.g., 330 or 130). Consequently, when the rotary disk 430 is set at the base position, the first and second springs are in communication with each other, equalizing air pressure between the first and second air springs of the suspension system.

Figure 25B:
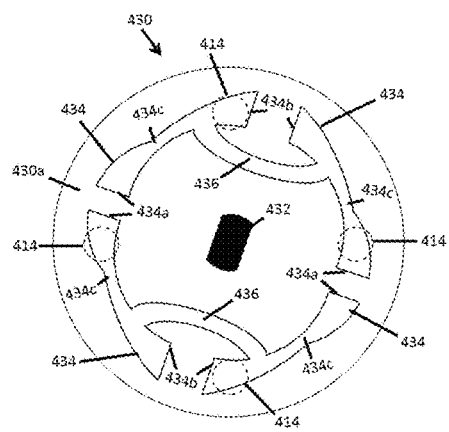
Figure 25C:
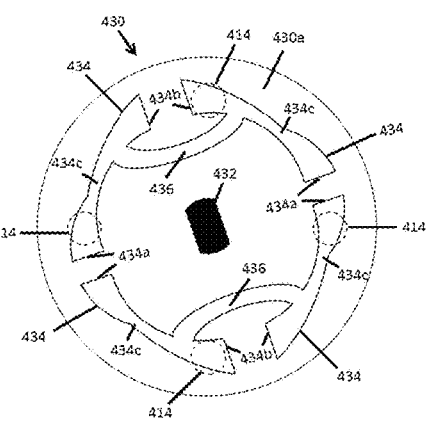

As shown in FIG. 25b, due to clockwise rotation of the control arm 340, the rotary disk 430 rotates to an angular position, in which the arrangement of the blind grooves 434 connects the supply hole 414a with the first hole 414c of the auxiliary disk 410 and connects the exhaust hole 414b with the second hole 414d of the auxiliary disk 410. Consequently, air is supplied to the first set of air springs, and air is simultaneously purged from the second set of air springs. As shown in FIG. 25c, due to counterclockwise rotation of the control arm 340, the rotary disk 430 rotates to an angular position in which the arrangement of blind grooves 434 connects the supply hole 414a with the second hole 414d of the auxiliary disk 410 and connects the exhaust hole 414b with the first hole 414c of the auxiliary disk 410. Accordingly, air is supplied to the second set of air springs, and air is simultaneously purged from the first set of air springs. As a result, the dual-action dynamic valve 300 according to the present invention is capable of simultaneously supplying air to one set of air springs of the vehicle while exhausting air from of the other set of air springs of the vehicle through the use of only one rotary disk.

Figure 25D:
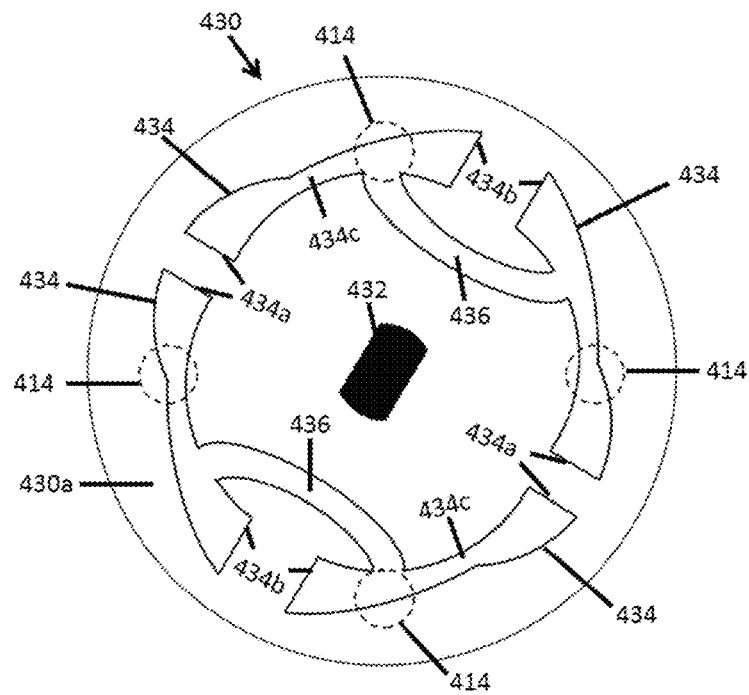
Figure 25E:
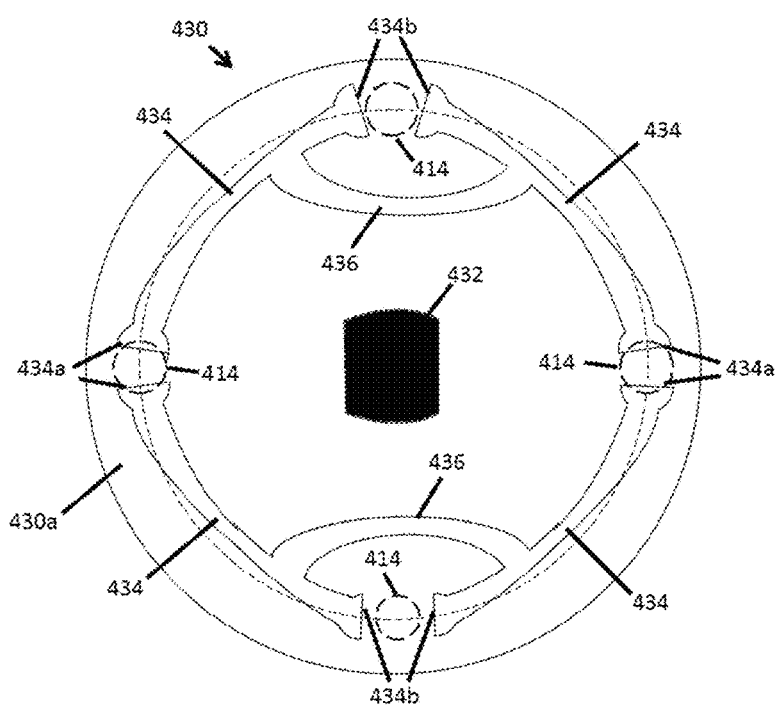
FIGS. 25e-k are schematic bottom views of a rotary disk according to an embodiment of the present invention.

The rotary disk 430 also controls the mass flow rate of air through each port of the lower housing 330 as the rotary disk 430 is rotated to different angular positions. As shown in FIGS. 25a-d, the width of the first end 434a and the second end 434b of each blind groove 434 is different than the width of a center portion 434c of each groove 434c. In the illustrated embodiment, the width of the center portion 434c is less than the width of either the first end 434a or the second end 434b of each blind groove 434d. Accordingly, when the rotary disk 430 is rotated at a lower rotation angle, a greater portion of the respective hole 414 of the auxiliary disk 410 is exposed by the respective blind groove 434 due to the substantial width of the first and second ends 434a and 434b. However, as shown in FIG. 25d, when the rotary disk 200 is rotated at a higher rotation angle, a smaller portion of the respective hole 414 of the auxiliary disk 410 is exposed by the respective blind groove 434 because the blind groove 434 narrows from either its first end 434a or second end 434b to the center portion 434c. Thus, in situations when the rotary disk 430 is slightly rotated by the control arm 340, there is less restriction of air flow between the connected ports, thereby providing a rapid increase in the mass flow rate of air flowing through the air passages in the lower housing 330. On the other hand, as the rotary disk 434 is rotated even more by the control arm 340, there is more restriction of air flow between the connected ports, thereby providing a steady state mass flow rate of air flowing through the air passages in the lower housing 330. The relationship between the degree of disk rotation and the flow rate of air according to the present invention is schematically illustrated in FIGS. 31a and 31b.

Figure 31B:
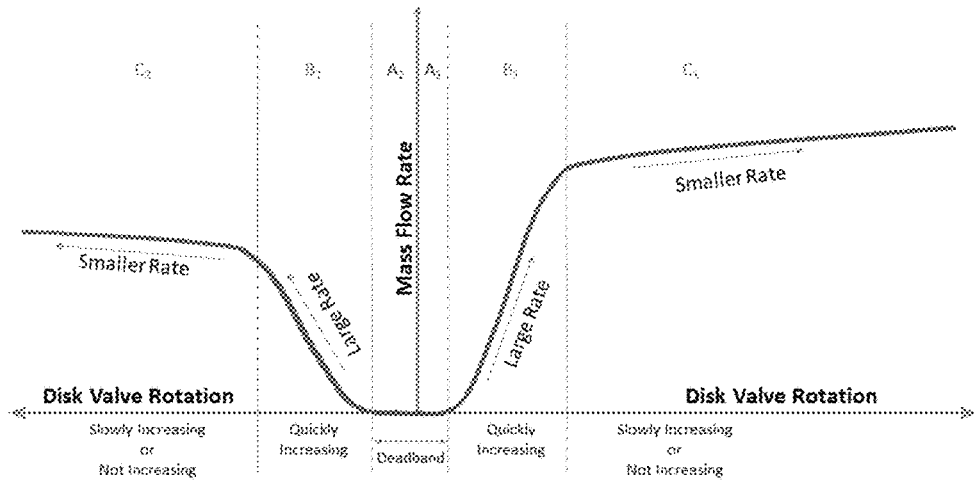

FIG. 31b illustrates the relationship between the degree of disk rotation and the flow rate of air both in the clockwise and counterclockwise movement of the rotary disk. As shown in FIG. 31b, the x-axis reflects the degree of disk rotation, and the y-axis indicates the mass flow rate of air flowing through the dynamic dual-action valve. Accordingly, the change of the mass flow rate may be determined by taking the slope (i.e. derivative) of the line indicating the mass flow rate with respect to the degree of rotation. The base position of the rotary disk according to the present invention corresponds to the intersection between the x-axis and the y-axis. As the rotary disk rotates from the base position in either direction, the change of flow rate may be categorized in three stages: a dead band stage $A_1$, $A_2$, a rapid increasing stage $B_1$, $B_2$, and a slow increasing stage $C_1$, $C_2$.

First, as the rotary disk rotates only a slight amount (e.g. one degree) in either direction, the dead band of the rotary disk still covers the supply and exhaust holes of the auxiliary disk. Accordingly, as shown in FIG. 31b, the flow rate remains substantially zero during the dead band stage $A_1$, $A_2$. Second, as the rotary disk continues to rotate and the blind grooves or holes initially overlap the supply and exhaust holes of the auxiliary disk, the flow rate of the air flowing through the valve body increases quickly. As shown in FIG. 31b, the slope of the mass flow rate reflects an exponential change in flow rate during the rapid increasing stage $B_1$, $B_2$. Third, as the rotary disk further rotates to a larger degree, the mass flow rate flowing through the valve body increases slightly, whereby the change in the air flow rate approaches a steady state. As shown in FIG. 31b, the slope of the mass flow rate reflects a linear change in flow rate during the slow increasing stage $C_1$, $C_2$.

FIG. 31b further illustrates an asymmetrical relationship in the change of flow rate between clockwise movement and counterclockwise movement of the rotary disk according to an embodiment of the present invention. As shown in FIG. 31b, the dead band region A1 and A2 are such that they represent equal or different rotation the arm in respective directions. As an exemplar, the dead band A2 is such that it extends to a greater degree than the dead band region A1. Accordingly, the rotary disk must rotate in one direction further than another direction for one of the connecting grooves or holes to start overlapping one of the supply or exhaust holes of the auxiliary disk. Furthermore, as shown in FIG. 31b, the peak and slopes of the flow rate in one disk rotation direction is not necessarily the same as the peak and slope of the flow rate in another disk rotation direction. Accordingly, the flow rate in one disk rotation direction may change at a faster rate or reach a different peak compared to flow rate at another disk rotation direction. The dual-action dynamic valve may alter the flow rate asymmetrically between clockwise and counterclockwise rotation of the rotary valve by changing the placement of the blind grooves or holes with respect to the supply and exhaust holes of the auxiliary disk, as described further below with the description corresponding to FIGS. 25e-k.

Besides altering the width and/or contoured shape of the blind grooves 434, the rotary disk 430 may control the mass flow rate of air through each port of the lower housing 330 by other means without departing from the spirit and scope of the present invention. For example, in an alternative embodiment, in addition to providing a contoured shape for the blind grooves 434, the depth of each blind groove 434 may vary, e.g., decrease from either the first end 434a or second end 434b to the center portion 434c of the blind groove 434. Each blind groove 434 of the rotary disk 430 may have a constant width between the first and second ends of the blind groove 434, but the depth of each blind groove 434 may vary, e.g., decrease from either the first end 434a or second end 434b to the center portion 434c of the blind groove 434. Alternatively, the rotary disk may include four through holes rather than having four blind grooves 434. The rotary disk having four through holes may be pressed against the first surface 336 of the lower housing 330, and a secondary disk 450 only having a central aperture with no other holes may be stacked upon the rotary disk and pressed against the first surface of the upper housing 320.

Figure 25F:
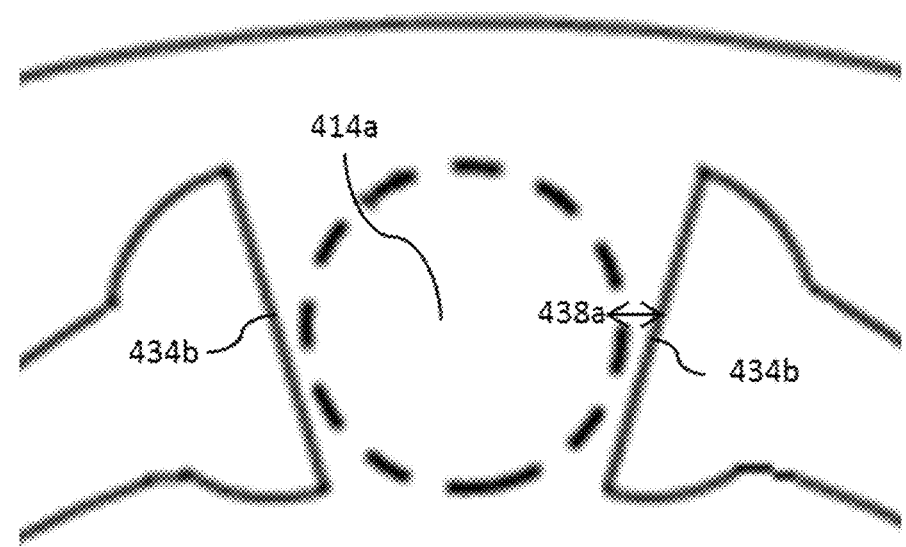
Figure 25G:
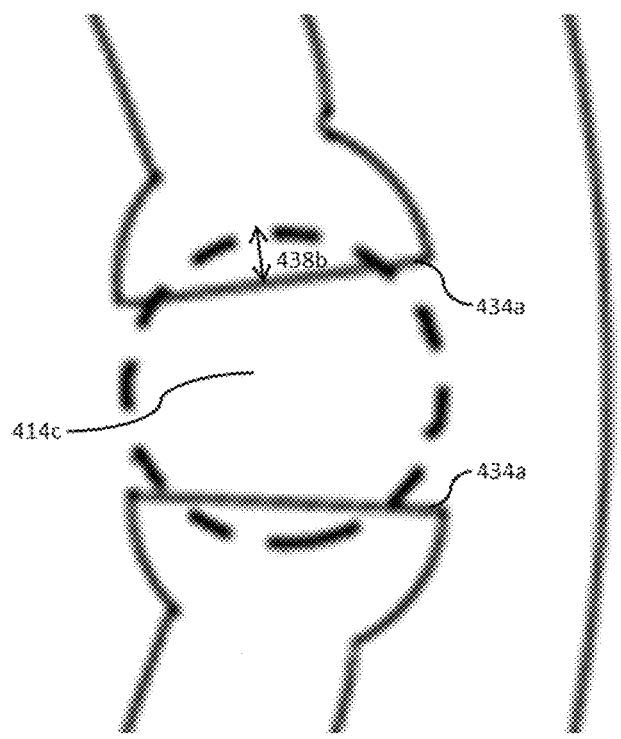
Figure 25H:
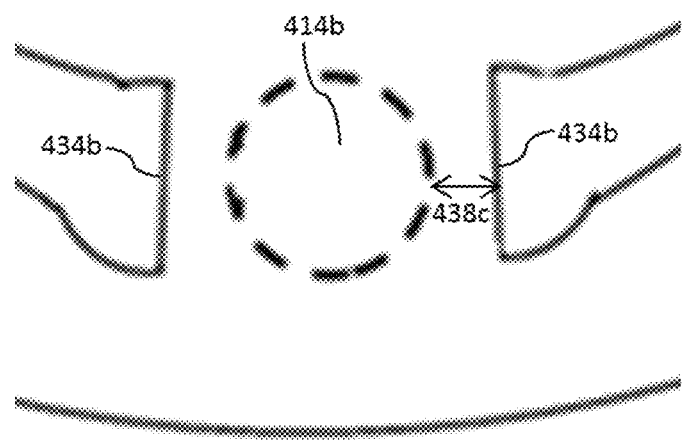

As shown in FIGS. 25e-h, the rotary disk 430 may include different separation distances between the second ends 434b of the blind grooves 434 and a corresponding edge of the underlying supply or exhaust holes 414a, 414b of the auxiliary disk 410 when the rotary disk 430 is set in the base position. Moreover, the overlap distance between the first end 434a of the blind grooves 434 and the corresponding edge of the underlying first or second holes 414c, 414d of the auxiliary disk 410 is not equal to the separation distances between the second ends 434b of the blind grooves 434 and the corresponding edge of the underlying supply or exhaust holes 414a, 414b of the auxiliary disk 410 when the rotary disk 430 is set in the base position. Referring to FIG. 25f, the second ends 434b of the blind grooves 434 are separated from the underlying supply hole 414a by a first width 438a, which is about equal to one degree of dead band. Referring to FIG. 25g, the first ends 434a of the blind grooves 434 overlap the underlying first or second hole 414c, 414d by a second width 438b, which is about equal to two degrees of dead band. Referring to FIG. 25h, the second ends 434b of the blind grooves 434 are separated from the underlying exhaust hole 414c by a third width 438c, which is about equal to three degrees of dead band.

Figure 25I:
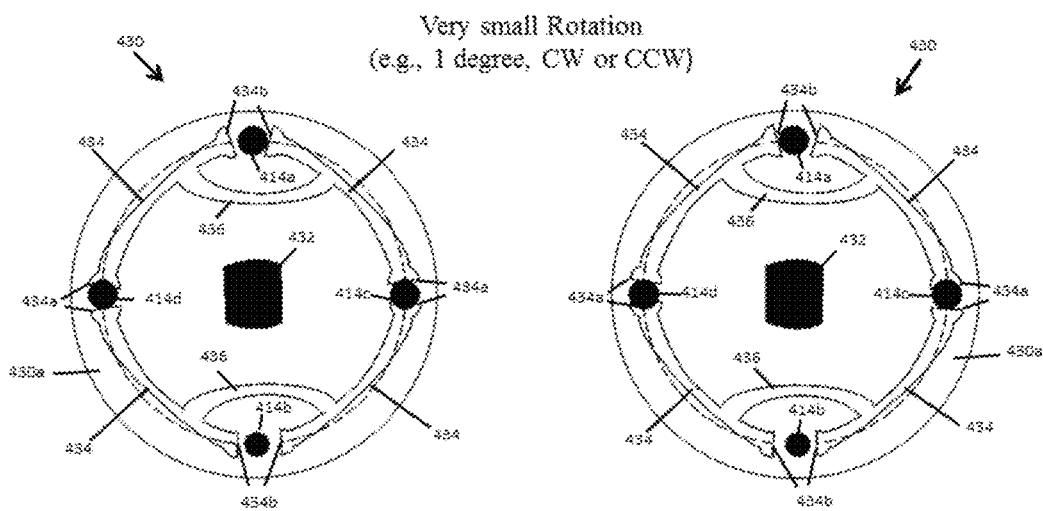
Figure 25J:
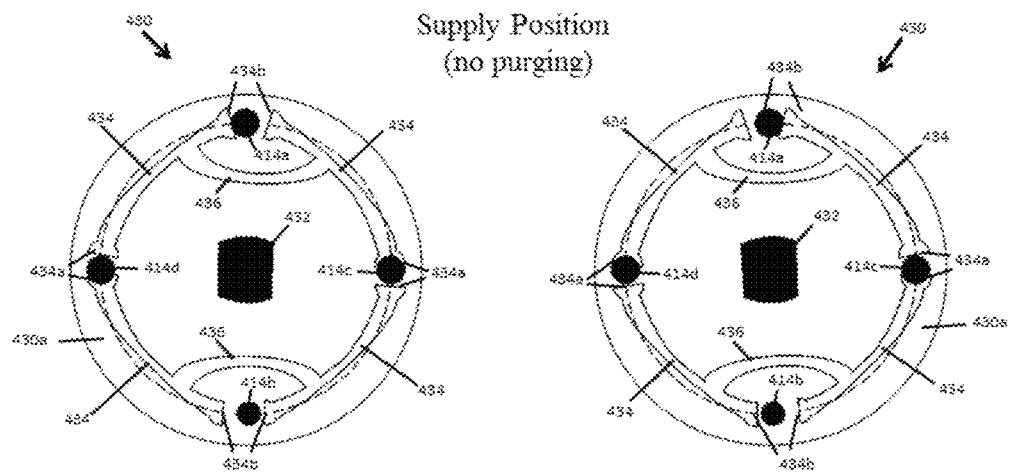
Figure 25K:
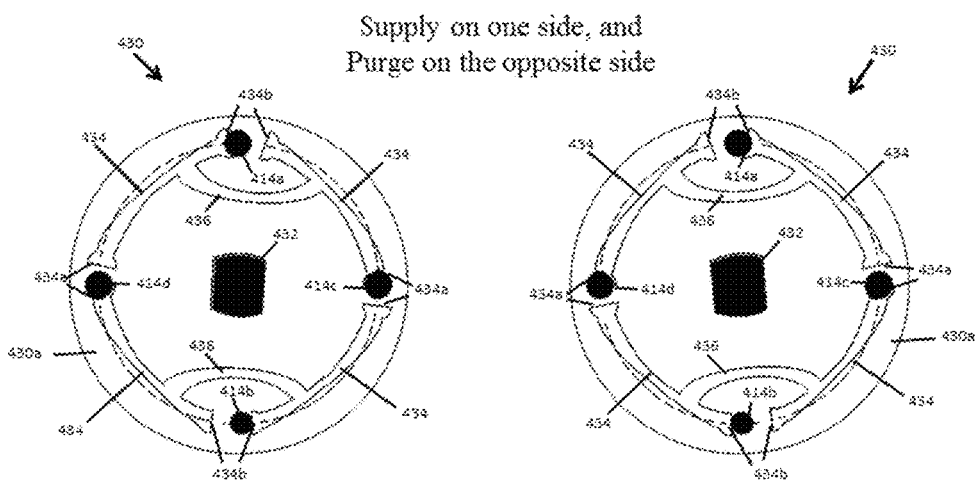

FIGS. 25i-k illustrate the operation of the rotary disk 430 in response to the initial movement of the control arm 340. FIG. 25i illustrates the rotary disk 430 slightly rotated by about one degree, in which the rotary disk 430 still remains in a deadband range that is represented by "A1" and "A2" in the flow diagram (FIG. 31b). Thus, air is neither supplied to nor purged from the first and second sets of air springs. Different dead bands may be provided for the supply dead band and the purge dead band as a result of asymmetry. While the rotary disk 430 remains in the dead band range, the first end 434a of each blind groove 434 still overlaps a respective first or second hole 414c, 414d of the auxiliary disk 410. Accordingly, the first set of air springs continue to be in communication with the second set of air springs through the first and second ports 334c, 334d of the valve body 310.

FIG. 25j illustrates the rotary disk 430 rotated by approximately two degrees, in which the rotary disk 430 is set to a supply position. In the supply position, one of the blind grooves 430 overlaps (e.g. partially overlaps) the supply hole 414a of the auxiliary disk 410, while none of the blind grooves 430 overlaps the exhaust hole 414b of the auxiliary disk 410. Furthermore, one of the blind grooves remains overlapping (e.g. partially overlapping) the first hole 414c of the auxiliary disk 410, and another one of the blind grooves remains overlapping (e.g. partially overlapping) the second hole 414d of the auxiliary disk 410. Accordingly, once the rotary disk 410 is set to the supply position, the dual-action dynamic valve 300 supplies air to one of the first or second sets of air springs while not discharging air from the other one of the first or second sets of air springs. Because the supply hole 414a and exhaust hole 414b are each covered by only one blind groove 430 of the rotary disk 430, the first set of air springs are no longer in communication with the second set of air springs when the rotary disk 430 is set to the supply position.

FIG. 25k illustrates the rotary disk 430 rotated approximately three degrees, in which the rotary disk 430 is set to a dual-action position. In the dual-action position, each blind groove 434 of the rotary disk 430 overlaps (e.g. partially overlaps) a respective hole 414a-d of the auxiliary disk 401. Consequently, the dual action dynamic valve 300 in the dual-action position supplies air to one of the first or second sets of air springs while simultaneously removing air from the other one of the first or second sets of air springs through the use of only one rotary disk. Due to the positioning of the blind grooves 434 of the rotary disk 430 with respect to the holes 414 of the auxiliary disk 410 shown in FIGS. 25e-k, the dual action dynamic valve 300 responds more quickly in supplying air to a respective set of air springs than draining air from a respective set of air springs.

In an alternative embodiment, the overlap distance between the first end 434a of each blind groove 434 and the edge of the underlying first or second hole of the auxiliary disk 410 is substantially equal to the separation distance (or gap) between each second end 434b of each blind groove 434 and corresponding edges of the underlying supply or exhaust hole of the auxiliary disk 410. Accordingly, as the rotary disk 430 is rotated, the second end 434b of one respective blind groove 434 starts to overlap a respective supply or exhaust hole of the auxiliary disk 410, and the second end 434b of another respective blind groove simultaneously starts to overlap the other respectively exhaust or supply hole of the auxiliary disk 410. Consequently, the dual action dynamic valve 300 responds at the same rate in supplying air to a respective air spring while discharging air from a respective air spring of the pneumatic suspension system.

FIG. 26a illustrates an alternative embodiment of the shuttle mechanism according to the present invention. Similar to the embodiment shown in FIGS. 23a-b and 24a-c, the shuttle mechanism includes a rotary disk 440 and a secondary disk 450 (FIG. 26b). However, as shown in FIG. 26a, the rotary disk 440 includes a pair of arcuate-shaped through holes 444, rather than grooves, and the rotary disk 440 is received on the first surface 336 of the lower housing 330. Furthermore, the secondary disk includes a circular-shaped solid disk body includes only a central hole 452 without any other holes or grooves. The post 372 of the valve body 310 extends through the secondary disk 450. The secondary disk 450 is stacked upon an upper surface of the rotary disk 440 and pressed against the first surface 322 of the upper housing 320. The rotary disk 440 includes a circular-shaped disk body having the same size as the disk body of the secondary disk 450, and the rotary disk 440 and the secondary disk 450 are stacked in an aligned manner in the chamber 350 of the valve body 310.

As shown in the FIG. 26a, the rotary disk 440 includes a central aperture 442 configured to receive the post 372 of the valve body 310. The pair of arcuate-shaped through holes 444 of the rotary disk 440 are spaced around central aperture 442, wherein the through-holes 444 extend along the periphery of the rotary disk 440 between a first end 444a and a second end 444b. Similar to the arcuate-shaped grooves 424 of the rotary disk 420 shown in FIGS. 24a-c, each through hole 444 of the rotary disk 440 shown in FIG. 25a includes a lip portion 444c formed between a pair of bend portions 444d, in which the lip portion 444c extend toward the central aperture of the rotary disk 440.

FIG. 27 illustrates an exploded view of the dual-action dynamic valve 300' according to an alternative embodiment of the present invention. Similar to the dual-action dynamic valve 300 shown in FIG. 18, the dual-action dynamic valve 300' shown in FIG. 27 includes a valve body 310 comprising an upper housing 320 mounted to a lower housing 330, wherein a control arm 340 is attached to the upper housing 320. However, rather than having four compression springs 354 received in the cavities 338a-d of the lower housing 330, the dual-action dynamic valve 300' comprises a disk spring 460 positioned between the set of shuttle mechanisms and the first surface 322 of the upper housing 320. Replacing the plurality of compression springs 354 with the single disk spring 460 simplifies the assembling and manufacturing processes of the dual-action dynamic valve while still preserving an air tight connection between the separate air passages.

As shown in FIG. 27, the set of shuttle mechanisms includes an auxiliary disk 410, a rotary disk 430', and a secondary disk 450', in which all three disks are stacked in an aligned manner within the chamber 350 of the valve body 310. The auxiliary disk 410 is similar to the embodiment shown in FIGS. 23a and 23b, in which the auxiliary disk 410 comprises a circular-shaped disk body 412 and a plurality of holes 414a-d aligned with and overlying the cavities 338a-d of the lower housing 330. Furthermore, the auxiliary disk 410 is configured to be held in a stationary state against the first surface 336 of the lower housing 330. The rotary disk 430 is similar to the embodiment shown in FIGS. 25a-d, in which the rotary disk 430 is configured to rotate about the post 372 within the chamber 350 of the valve body 310. However, rather than having four blind grooves 434, the rotary disk 430 comprises four through holes that extend entirely through the upper and lower surfaces of the rotary disk 430.

As shown in FIG. 27, the secondary disk 450' is stacked upon an upper surface of the rotary disk 430', and the disk spring 460 is compressed against an upper surface of the secondary disk 450' and a first surface 322 of the upper housing 320. The secondary disk 450' extends beyond the peripheral edges of the auxiliary disk 410 and rotary disk 430' and engages the interior of the upper housing 320. Accordingly, the secondary disk 450' is fixed in a stationary state within the chamber 350 of the valve body 310 while the rotary disk 430 is rotating.

Referring to FIG. 28a, the secondary disk 450' includes a circular-shaped disk body 451 and a central hole 452 that is enlarged so as to not contact the post 372 of the valve body 310 that passes through central hole 452. In the illustrated embodiment shown in FIG. 28b, the secondary disk 450' includes a pair of flat edges 454 so that the secondary disk 450' may be aligned and secured within the interior of the upper housing 320, thereby ensuring the secondary disk 450' is held in a stationary state within the chamber 350 of the valve body 310. In the illustrated embodiment shown in FIG. 28c, the secondary disk 450' includes a plurality of notches 456 positioned along the edge of the secondary disk 450'. Each notch 456 of the secondary disk 450' is configured to receive a strut (not shown) of the upper housing 320, thereby ensuring that the second disk 450' is held in a stationary state within the chamber 350 of the valve body 310.

FIG. 29 illustrates an embodiment of the disk spring 460 according to an embodiment of the present invention. FIG. 29 is provided for illustrative purposes only and disk springs having various configurations may be used in accordance with the present disclosure. In one embodiment, the disk spring 460 is annular-shaped and deformed into a waved configuration. The disk spring 460 is biased against the upper surface of the secondary disk 450', thereby pressing the auxiliary disk 410, the rotary disk 430', and the secondary disk 450' against the first surface 336 of the lower housing 330. Accordingly, the disk spring 460 maintains all the disks in a compressed, stacked manner between the first surface 336 of the lower housing 330 and the first surface 322 of the upper housing 320. Ultimately, by maintaining all the disks in a compressed, stacked manner, the disk spring 460 ensures air tightness for all the passages defined within the valve body 310.

As used herein, the term "disk spring" refers to an arrangement of one or more disk springs. A disk spring may be used singly or in packs or stacks to achieve a desired load. The disk spring is preset so that it will not relax under load over time. Disk springs may be in the form of washers having cupped and flattened states.

As used herein, the term "cross-flow" refers to a state of communication between the first set of air springs and the second set of air springs, in which the dual-action dynamic valve establishes communication between the first set of air springs and the second set of air springs and the first port and the second port of the dual-action dynamic valve communicate neither with the supply port nor with the exhaust port.

Figure 30A:
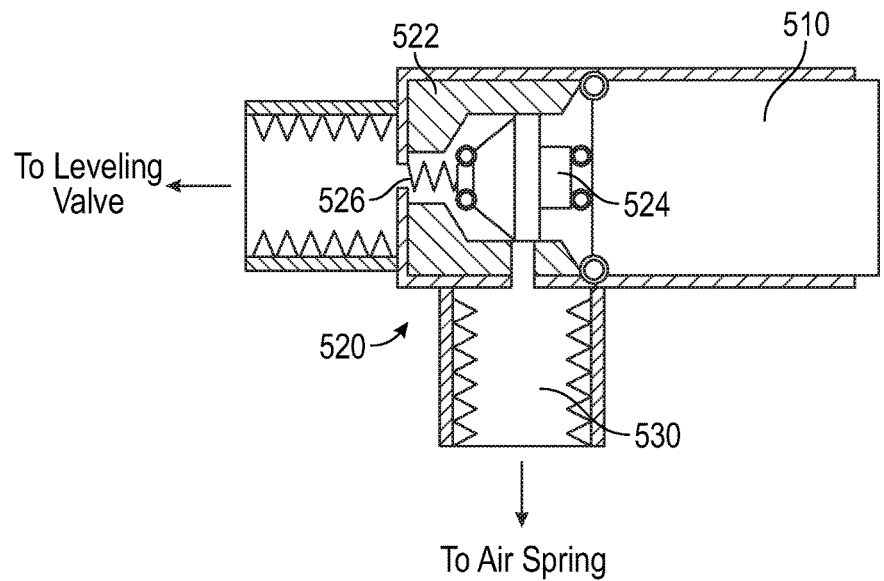
FIGS. 30a and 30b are side cross-sectional views of a dump valve according to an embodiment of the present invention.
Figure 30B:
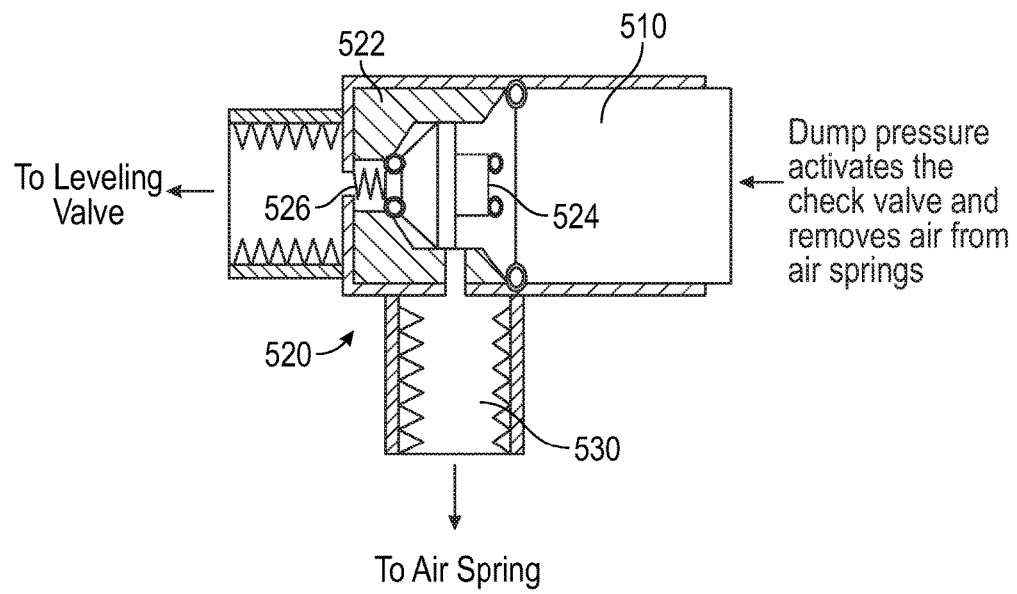

FIGS. 30a and 30b illustrate a dump valve 520 that may be coupled to the dual-action dynamic valve according to another embodiment of the present invention. Referring to FIG. 30a, the dump valve 520 is modular to the valve body of dual-action dynamic valve and is used to remove all the air from each air spring of the suspension system simultaneously. Therefore, when a driver or operator of the vehicle desires to exhaust air from all the air springs of a vehicle, e.g., when the trailer of the vehicle is being connected or disconnected from the tractor, or when a bus kneels down for passenger loading/unloading, the dump valve 520 may be activated to divert all air through the fifth port 510 of the valve body 500. Because the dump valve 520 is modular to the valve body 500, the dump valve 520 can be added at any time when the user or operator needs to have the dump functionality to remove all the air from each air spring of the suspension system. The dump valve 520 is configured to be linked electronically with a switch in the cabin of the vehicle so that the driver or operator of the vehicle can actuate dump valve while seated in the cabin of the vehicle. In operation, the dump valve 520 is configured to exhaust air from one of the first or second sets of air springs, while the exhaust port purges air from the other one of the first or second sets of air springs. The dump valve 520 prevents air received from the supply tank from passing through either of the first or second ports by functioning as a bypass valve with the dual-action dynamic valve, in which the dump valve 520 is pressure responsive.

As shown in FIG. 30a, the dump valve 520 includes a manifold 522 with a plunger 524 received in the manifold 130, in which the plunger 524 is configured to permit air to communicate or not communicate between the fifth port 510 and a respective first or second port 530. Referring to FIG. 30a, when the dump valve 520 is not activated, a sufficiently strong linear spring 526 biases the plunger 524 in a first position blocking air flow between the respective first or second port 530 and the fifth port 510. However, as shown in FIG. 30b, when the dump valve 520 is activated, air pressure is applied to plunger 524 overcoming the force of the spring 526. Accordingly, the plunger 524 slides forward permitting communication between the respective first or second spring 530 and the fifth port 510. As a result, the dump valve 520 exhausts air from one of the respective set of springs through the fifth port, and the exhaust port 134b purges air from one of the other set of springs through the exhaust port 134b, thereby discharging air from each set of air springs of the vehicle.

The following table summarizes four possible combinations of movements of a left air spring, a right air spring, and a vehicle body attached to an axle of a vehicle, in which the left and right air spring are linked pneumatically to a dual-action dynamic valve according to the invention.

| Scenario | Left Air Spring | Right Air Spring | Movement of Vehicle Body |
|---|---|---|---|
| 1 | Up | Down | Roll Right |
| 2 | Down | Up | Roll Left |
| 3 | Up | Up | Elevated Up |
| 4 | Down | Down | Lowered Down |

The dual-action dynamic valve can be universally installed on either side of the vehicle, as appropriate for a given suspension configuration. For the case in which the valve is installed on the left side of the vehicle, the air is managed among the air springs on the two sides of the vehicle in the following manner. In scenario 1, the left air spring expands upward, while the right air spring contracts downward. Consequently, the body of the vehicle starts to roll right. In response, the control arm of the dual-action dynamic valve rotates in a first direction from a horizontal position so that rotary disk is rotated from the base position to a first angular position. When the rotary disk is set in the first angular position, the dual action dynamic valve removes air from the left air spring and simultaneously supplies air to the right air spring, thereby reducing the possibility of the vehicle body from rolling over. In scenario 2, the left air spring contracts downward, while the right air spring expands upward. Consequently, the vehicle body starts to roll left. In response, the control arm of dual-action dynamic valve rotates in a second direction, which is opposite to the first direction, from a horizontal position so that the rotary disk rotates from the base position to a second angular position. When the rotary disk is set in the second angular position, the dual-action dynamic valve supplies air to the left air spring and simultaneously removes air from the right air spring, thereby reducing the possibility of the vehicle body from rolling over.

Along with reducing the possibility of the vehicle rolling, the dual-action dynamic valve according the present invention promotes a level ride height when both the left and right air springs are moving in the same direction. In scenario 3, both the left air spring and the right air spring expand in an upward direction, whereby the vehicle body is elevated in an upward direction from the axle. In response, the control arm of the dual-action dynamic valve rotates in the first direction to return to the horizontal position. When the control arm is rotating in the first direction toward the horizontal position, the dual-action dynamic valve initially removes air from the left air spring and supplies air to the right air spring, but as the control arm is set in the horizontal position, the dual-action dynamic valve neither supplies air nor removes air from the air springs, as the rotary disk is set in the base position. Furthermore, because the left and right air springs are in communication with each other when the rotary disk is set to the base position and the horizontal arm is set to the horizontal position, the air pressure between the left and right air springs become equalized, thereby promoting a level ride height for the vehicle body. In scenario 4, both the left air spring and the right air spring contract downward, whereby the vehicle body is lowered down toward the axle. In response, the control arm of the dual-action dynamic valve rotates in the second direction to return to the horizontal position. When the control arm is rotating in the second direction toward the horizontal position, the dual-action dynamic valve initially supplies air to the left air spring and removes air from the right air spring, but as the control arm is set in the horizontal position, the dual-action dynamic valve neither supplies air nor removes air from the air springs, as the rotary disk is set in the base position. Furthermore, because the left and right air springs are in communication with each other when the rotary disk is set to the base position and the horizontal arm is set to the horizontal position, the air pressure between the left and right air springs become equalized, thereby promoting a level ride height for the vehicle body.

The dual-action dynamic valve according to each embodiment described above is configured to supply air to either one of the first set of air springs or the second set of air springs while simultaneously exhaust air from the other one of the first set of air springs or the second set of air springs. Furthermore, the dual-action dynamic valve according to each embodiment described above is configured to supply or remove air from the first or second sets of air springs through the use of only one control arm attached to the valve body, in which the shuttle mechanism includes only one disk that is configured to rotate between one or more angular positions.

Various embodiments of the invention comprise:

1. A vehicle suspension dual-action dynamic valve comprising: an upper housing mounted on a lower housing to form a valve body, wherein the valve body defines a chamber extending between the upper housing and the lower housing; the lower housing comprising a plurality of ports communicating with the chamber, wherein the plurality of ports include a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing; a control arm having a first end attached to an upper surface of the upper housing, wherein the control arm is configured to rotate about the valve body in response to extension or compression of the vehicle suspension system; a shuttle mechanism positioned in the chamber of the valve body and connected to the control arm by a supporting element, wherein the shuttle mechanism is configured to rotate about the supporting element within the chamber of the valve body; and wherein the shuttle mechanism is configured to establish communication between one of the supply port or the exhaust port with one of the first spring port or the second spring port and to simultaneously establish communication between the other one of the supply port or the exhaust port with the other one of the first spring port or the second spring port.

2. The vehicle suspension dual-action dynamic valve of item 1, wherein rotation of the control arm induces the shuttle mechanism to rotate between a plurality of angular positions to alter communication between the supply port, the exhaust port, the first spring port, and the second spring port.

3. The vehicle suspension dual-action dynamic valve of items 1 or 2, wherein the plurality of angular positions includes (i) a first angular position, in which the supply port communicates with the first spring port and the exhaust port communicates with the second spring port, and (ii) a second angular position, in which the supply port communicates with the second spring port and the exhaust port communicates with the first spring port.

4. The vehicle suspension dual-action dynamic valve of any of items 1-3, wherein the lower housing includes a pair of cross-holes and the plurality of angular positions includes a base position, wherein the first port and the second port communicate neither with the supply port nor the exhaust port in the base position, and the first port communicates with the second port through the pair of cross-holes in the base position to equalize the air pressure between the first set of air springs and the second set of air springs.

5. The vehicle suspension dual-action dynamic valve of any of items 1-4, wherein the lower housing further includes a first surface mating with a lower surface of the upper housing in which the first surface defines a plurality of cavities including: a supply cavity directly communicating with the supply port; an exhaust cavity directly communicating with the exhaust port; a first spring cavity directly communicating with the first spring port; and a second spring cavity directly communicating with the second spring port.

6. The vehicle suspension dual-action dynamic valve of any of items 1-5, wherein the shuttle mechanism includes a rotary disk having a central aperture that receives the supporting element and oblong-shaped slots spaced around the central aperture with dead band defined therebetween and along the periphery of the rotary disk, wherein each oblong-shaped slot is configured to overlie a respective cavity of the lower housing when the rotary disk is rotated to the first angular position or the second angular position.

7. The vehicle suspension dual-action dynamic valve according to any of items 1-6, wherein each oblong-shaped slot includes a first end positioned adjacent to or overlying a respective supply cavity or exhaust cavity of the lower housing and a second end overlying a respective first spring cavity or second spring cavity of the lower housing, in which the width of the first end of each slot is not equal to the width of the second end of each slot.

8. The vehicle suspension dual-action dynamic valve according to any of items 1-7, wherein the shuttle mechanism comprises an auxiliary disk and a rotary disk, the auxiliary disk having a central hole that receives the support element and the rotary disk having a central aperture that receives the support element, wherein the auxiliary disk is pressed against the first surface of the lower housing in a stationary state and the rotary disk is aligned with the auxiliary disk and stacked upon an upper surface of the auxiliary disk, and the rotary disk is configured to rotate with respect to the auxiliary disk between the first and second angular positions.

9. The vehicle suspension dual-action dynamic valve according to any of items 1-8, wherein the shuttle mechanism further includes a secondary disk stacked upon an upper surface of the rotary disk and a disk spring compressed against a first surface of the upper housing and an upper surface of the secondary disk to maintain the auxiliary disk, the rotary disk, and the secondary disk in a stacked manner within the chamber of the valve body.

10. The vehicle suspension dual-action dynamic valve of any of items 1-9, wherein the first spring port of the lower housing is aligned with the second spring port of the lower housing.

11. The vehicle suspension dual-action dynamic valve of any of items 1-10, wherein the shuttle mechanism includes a rotary disc and the supporting element comprises a post, wherein the rotary disk includes a central aperture that receives the post and the post includes a first end extending through the upper housing secured to the control arm and a second end received in the lower housing.

12. The vehicle suspension dual-action dynamic valve of any of items 1-11, wherein the shuttle mechanism includes a rotary disk having a central aperture that receives the supporting element and four oblong-shaped slots spaced around the central aperture with dead band defined there between and along the periphery of the rotary disk, wherein each oblong-shaped slot of the rotary disk is configured to communicate directly with a respective port of the lower housing when the rotary disk is rotated to the first angular position or the second angular position.

13. The vehicle suspension dual-action dynamic valve of any of items 1-12, wherein the shuttle mechanism includes a rotary disk having a central aperture that receives the supporting element and two arcuate-shaped grooves spaced around the central aperture with dead band defined there between and along the periphery of the rotary disk, wherein each arcuate-shaped groove of the rotary disk is configured to communicate directly with two respective ports of the lower housing when the rotary disk is rotated to the first angular position or the second angular position.

14. The vehicle suspension dual-action dynamic valve of any items 1-13, wherein the shuttle mechanism comprises a rotary disk having a central aperture that receives the supporting element and four blind grooves or through holes spaced around the central aperture and a pair of connecting grooves or connecting through holes, wherein each connecting groove or connecting through hole extends between a pair of blind grooves or through holes, and each blind groove or through hole of the rotary disk is configured to communicate directly with a respective port of the lower housing when the rotary disk is rotated to the first angular position or the second angular position.

15. The vehicle suspension dual-action dynamic valve of any of items 1-14, further including a dump port and a dump valve, wherein the dump valve is configured to bypass communication from one of the first spring port or second spring port to the dump port.

16. The vehicle suspension dual-action dynamic valve according to any of items 1-15, wherein the dump valve further comprises a manifold connecting the dump port with the supply port and one of the first spring port or the second spring port of the lower housing and a plunger received in the manifold.

17. The vehicle suspension dual-action dynamic valve according to any of items 1-16, wherein dump valve further comprises a spring biasing the plunger into a first position within the manifold of the dump valve, whereby the plunger in the first position prevents the dump port from communicating with the first or second spring port.

18. The vehicle suspension dual-action dynamic valve according to any of items 1-17, wherein the plunger is configured to slide to a second position within the manifold of the dump valve, whereby the plunger in the second position permits the dump port to communicate with the first or second spring port.

19. The vehicle suspension dual-action dynamic valve of any of items 1-18, whereby rotation of the control arm induces the shuttle mechanism to rotate between a plurality of angular positions.

20. The vehicle suspension dual-action dynamic valve of any of items 1-19, wherein the plurality of angular positions includes (i) a first angular position, in which the supply port communicates with the first spring port and the exhaust port communicates with the second spring port, and (ii) a second angular position, in which the supply port communicates with the second spring port and the exhaust port communicates with the first spring port.

21. The vehicle suspension dual-action dynamic valve of items 1-19, wherein the auxiliary disk includes a plurality of holes, and each hole of the auxiliary disk overlies a respective cavity of the lower housing, and wherein the rotary disk includes a plurality of blind grooves, and each blind groove of the rotary disk is configured to overlie a respective hole of the auxiliary disk when the rotary disk is set in either the first or second angular position.

22. The vehicle suspension dual-action dynamic valve of any of items 1-21, wherein the plurality of angular positions includes (i) a base position, in which the first port and the second port communicate neither with the supply port nor the exhaust port, and the first port communicates with the second port, (ii) a supply position, in which the supply port communicates with one of the first port or second port, and the purge port communicates neither with the first port nor the second port, and (iii) a dual-action position, in which the supply port communicates with one of the first port or second port, and the purge port communicates with the other one of the first port or the second port.

23. A pneumatic suspension system for a vehicle comprising: a supply tank; a first air spring positioned on a first side of the vehicle; a second air spring positioned on a second side of the vehicle; a dual-action dynamic valve positioned between the first air spring and the second air spring, wherein the dual-action dynamic valve is connected to the supply tank, the first air spring, and the second air spring by a series of air hoses, wherein the dual-action dynamic valve is configured to supply air to either one of the first air spring or the second air spring and to simultaneously exhaust air from the other one of the first air spring or the second air spring.

24. The pneumatic suspension system of item 23, wherein the dual-action dynamic valve further includes: an upper housing mounted on a lower housing to form a valve body, wherein the valve body defines a chamber extending between the upper housing and the lower housing; the lower housing comprises a plurality of ports communicating with the chamber including a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing; wherein the supply port communicates with the supply tank, the exhaust port communicates with ambient air, the first spring port communicates with the first spring, and the second spring port communicates with the second air spring; a control arm having a first end attached to an upper surface of the upper housing, wherein the control arm is configured to rotate about the valve body in response to an extension or compression of the pneumatic suspension system; and a shuttle mechanism received in the chamber of the valve body and connected to the control arm by a supporting element, wherein the shuttle mechanism is configured to rotate about the supporting element within the chamber of the valve body to establish communication between the respective ports.

25. The pneumatic suspension system of any of items 23 or 24, wherein rotation of the control arm induces the shuttle mechanism to rotate between a plurality of angular positions to alter communication between the supply port, the exhaust port, the first spring port, and the second spring port.

26. The pneumatic suspension system of any of items 23-25, wherein the plurality of angular positions include (i) a first angular position, in which the supply port communicates with the first spring port and the exhaust port communicates with the second spring port, and (ii) a second angular position, in which the supply port communicates with the second spring port and the exhaust port communicates with the first spring port.

27. The pneumatic suspension system of any of items 23-26, wherein the lower housing further includes a first surface mating with a lower surface of the upper housing, in which the first surface defines a plurality of cavities including: a supply cavity directly communicating with the supply port; an exhaust cavity directly communicating with the exhaust port; a first spring cavity directly communicating with the first spring port; and a second spring cavity directly communicating with the second spring port.

28. The pneumatic suspension system of any of items 23-27, wherein the shuttle mechanism comprises a rotary disk defining a central aperture that receives the supporting element and oblong-shaped slots spaced around the central aperture with dead band defined there between and along the periphery of the rotary disk, wherein each oblong-shaped slot is configured to overlie a respective cavity of the lower housing when the rotary disk is rotated to the first angular position or the second angular position.

29. The pneumatic suspension system of any of items 23-28, wherein each oblong-shaped slot comprises a first end positioned adjacent to or overlying a respective supply cavity or exhaust cavity of the lower housing and a second end overlying a respective first spring cavity or second spring cavity of the lower housing, in which the width of the first end of each slot is not equal to the width of the second end of each slot.

30. The pneumatic suspension system of any of items 23-29, wherein the shuttle mechanism comprises a auxiliary disk and a rotary disk, the auxiliary disk defining a central hole that receives the support element and the rotary disk defines a central aperture that receives the support element, wherein the auxiliary disk is pressed against the first surface of the lower housing in a stationary state and the rotary disk is aligned with the auxiliary disk and stacked upon an upper surface of the auxiliary disk, and the rotary disk is configured to rotate with respect to the auxiliary disk between the first and second angular positions.

31. The pneumatic suspension system of any items 23-30, wherein the shuttle mechanism further includes a secondary disk stacked upon an upper surface of the rotary disk and a disk spring compressed against a first surface of the upper housing and an upper surface of the secondary disk to maintain the auxiliary disk, the rotary disk, and the secondary disk in a stacked manner within the chamber of the valve body.

32. The pneumatic suspension system of any of items 23-31, wherein the plurality of angular positions includes (i) a base position, in which the first port and the second port communicate neither with the supply port nor the exhaust port, and the first port communicates with the second port, (ii) a supply position, in which the supply port communicates with one of the first port or second port, and the purge port communicates neither with the first port nor the second port, and (iii) a dual-action position, in which the supply port communicates with one of the first port or second port, and the purge port communicates with the other one of the first port or the second p.

33. The pneumatic suspension system of any of items 23-32, wherein the shuttle mechanism comprises a rotary disc and the supporting element comprises a post, whereby the rotary disk includes a central aperture that receives the post and the post includes a first end extending through the upper housing secured to the control arm and a second end received in the lower housing.

34. The pneumatic suspension system of any of items 23-33, wherein the shuttle mechanism comprises a rotary disk having a central aperture that receives the supporting element and a plurality of oblong-shaped slots spaced around the central aperture with dead band defined there between and along the periphery of the rotary disk, whereby each oblong-shaped slot of the rotary disk is configured to communicate directly with a respective port of the lower housing when the rotary disk is rotated to the first angular position or the second angular position.

35. The pneumatic suspension system of any of items 23-34, wherein the shuttle mechanism comprises a rotary disk having a central aperture that receives the supporting element and two arcuate-shaped grooves spaced around the central aperture with dead band defined there between and along the periphery of the rotary disk, whereby each arcuate-shaped groove of the rotary disk is configured to communicate directly with two respective ports of the lower housing when the rotary disk is rotated to the first angular position or the second angular position.

36. The pneumatic suspension system of any items 23-35, wherein the shuttle mechanism comprises a rotary disk having a central aperture that receives the supporting element and four blind grooves or through holes spaced around the central aperture and a pair of connecting grooves or connecting through holes, wherein each connecting groove or connecting through hole extends between a pair of blind grooves or through holes, and each blind groove or through hole of the rotary disk is configured to communicate directly with a respective port of the lower housing when the rotary disk is rotated to the first angular position or the second angular position.

37. The pneumatic suspension system of any of items 23-36, further comprising a fifth port and a dump valve, wherein the dump valve is configured to bypass communication from one of the first spring port or second spring port to the dump port.

38. The pneumatic suspension system of any of items 23-37, wherein the lower housing includes a pair of cross-holes and the plurality of angular positions includes a base position, whereby the first port and the second port communicate neither with the supply port nor the exhaust port in the base position, and the first port communicates with the second port through the pair of cross-holes in the base position to equalize the air pressure between the first set of air springs and the second set of air springs.

39. A method for adjusting air pressure of a pneumatic suspension system of a vehicle comprising a supply tank, a first set of air springs on a first side of the vehicle, a second set of air springs on a second side of the vehicle, and a dual-action dynamic valve positioned between the first set of air springs and the second set of air springs, wherein the dual-action dynamic valve is connected to the supply tank, the first set of air springs, and the second set of air springs by a series of air hoses, the method comprising: supplying air from the supply tank to the dual-action dynamic valve in response to an extension or compression by the first set of air springs or the second set of air springs; supplying air from the dual-action dynamic valve to one of the first set of air springs or the second set of springs that is being compressed; removing air by the dual-action dynamic valve from the other one of the first set of air springs or the second set of air springs that is being extended; and wherein the steps of supplying air from the dual-action dynamic valve to one of the first set of air springs or the second set of springs that is being compressed and removing air by the dual-action dynamic valve from the other one of the first set of air springs or the second set of air springs that is being extended occurs simultaneously.

40. The method of item 39, wherein the dual-action dynamic valve further includes: an upper housing mounted on a lower housing to form a valve body, wherein the valve body defines a chamber extending between the upper housing and the lower housing; the lower housing comprises a plurality of ports communicating with the chamber, including a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing; whereby the supply port communicates directly with the supply tank, the exhaust port communicates directly with ambient air, the first spring port communicates directly with the first set of springs, and the second spring port communicates directly with the second set of air springs; a control arm having a first end attached to an upper surface of the upper housing, wherein the control arm is configured to rotate about the valve body in response to an extension or compression of the pneumatic suspension system; a shuttle mechanism received in the chamber of the valve body and connected to the control arm by a supporting element, wherein the shuttle mechanism is configured to rotate about the supporting element within the chamber of the valve body to establish communication between the respective ports; and wherein rotation of the control arm induces the shuttle mechanism to rotate between a plurality of angular positions, including (i) a first angular position, in which the supply port communicates with the first spring port and the exhaust port communicates with the second spring port, and (ii) a second angular position, in which the supply port communicates with the second spring port and the exhaust port communicates with the first spring port.

41. The method of any of items 39-41, further comprising rotating the shuttle mechanism to the first angular position to simultaneously supply air from the supply tank to the first set of air springs and exhaust air from the second set of air springs to the ambient air.

42. The method of any of items 39-41, further comprising rotating the shuttle mechanism to the second angular position to simultaneously supply air from the supply tank to the second set of air springs and exhaust air from the first set of air springs to the ambient air.

43. The method of any of items 39-42, further comprising rotating the shuttle mechanism to a base position, wherein the first port and the second port communicate neither to the supply port nor the exhaust port of the dual-action dynamic valve, and the first port communicates with the second port through a pair of cross-holes in the lower housing to equalize the air pressure between the first set of air springs and the second set of air springs.

44. A method of improving stability of a vehicle during rapidly changing driving conditions by: controlling air flow to first and second sides of the vehicle by supplying air to at least one air spring on one of either the first side of the vehicle or the second side of the vehicle, while simultaneously exhausting air from at least one air spring on the other one of the first side of vehicle or the second side of the vehicle to lift a vehicle side in need of lifting and to lower a vehicle side in need of lowering in response to changing driving conditions; wherein said air flow is controlled by a dual-action dynamic valve connected to the at least one air spring on the first side of the vehicle and the at least one air spring on the second side of the vehicle.

45. The method of item 44, wherein the dual-action dynamic valve further includes: an upper housing mounted on a lower housing to form a valve body, wherein the valve body defines a chamber extending between the upper housing and the lower housing; the lower housing comprising a plurality of ports communicating with the chamber, wherein the plurality of ports include a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing; a control arm having a first end attached to an upper surface of the upper housing, wherein the control arm is configured to rotate about the valve body in response to extension or compression of the suspension system; a shuttle mechanism positioned in the chamber of the valve body and connected to the control arm by a supporting element, wherein the shuttle mechanism is configured to rotate about the supporting element within the chamber of the valve body; and wherein the shuttle mechanism is configured to establish communication between one of the supply port or the exhaust port with one of the first spring port or the second spring port and to simultaneously establish communication between the other one of the supply port or the exhaust port with the other one of the first spring port or the second spring port.

46. The method of any of items 43-45, whereby rotation of the control arm induces the shuttle mechanism to rotate between a plurality of angular positions to alter communication between the supply port, the exhaust port, the first spring port, and the second spring port.

47. The method of any of items 43-46, wherein the plurality of angular positions includes (i) a first angular position, in which the supply port communicates with the first spring port and the exhaust port communicates with the second spring port, and (ii) a second angular position, in which the supply port communicates with the second spring port and the exhaust port communicates with the first spring port.

48. The method of any of items 43-47, wherein the lower housing includes a pair of cross-holes and the plurality of angular positions includes a base position, whereby the first port and the second port communicate neither with the supply port nor the exhaust port in the base position, and the first port communicates with the second port through the pair of cross-holes in the base position to equalize the air pressure between the first set of air springs and the second set of air springs.

49. A method of enabling a driver to more easily control a vehicle including steps of: installing in said vehicle an air suspension system configured to control air flow to first and second sides of the vehicle by supplying air flow to at least one air spring on the first side of the vehicle and simultaneously releasing air from at least one air spring on the second side of the vehicle to lift the vehicle side in need of lifting and to lower the vehicle side in need of lowering in response to changing driving conditions; wherein said air flow is controlled by a dual-action dynamic valve connected to the at least one air spring on the first side of the vehicle and the at least one air spring on the second side of the vehicle.

50. The method of item 49, wherein the dual-action dynamic valve further includes: an upper housing mounted on a lower housing to form a valve body, wherein the valve body defines a chamber extending between the upper housing and the lower housing; the lower housing comprising a plurality of ports communicating with the chamber, wherein the plurality of ports include a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing; a control arm having a first end attached to an upper surface of the upper housing, wherein the control arm is configured to rotate about the valve body in response to extension or compression of the suspension system; a shuttle mechanism positioned in the chamber of the valve body and connected to the control arm by a supporting element, wherein the shuttle mechanism is configured to rotate about the supporting element within the chamber of the valve body; and wherein the shuttle mechanism is configured to establish communication between one of the supply port or the exhaust port with one of the first spring port or the second spring port and to simultaneously establish communication between the other one of the supply port or the exhaust port with the other one of the first spring port or the second spring port.

51. The method of any of items 49 or 50, wherein rotation of the control arm induces the shuttle mechanism to rotate between a plurality of angular positions to alter communication between the supply port, the exhaust port, the first spring port, and the second spring port.

52. The method of any of items 49-51, wherein the plurality of angular positions includes (i) a first angular position, in which the supply port communicates with the first spring port and the exhaust port communicates with the second spring port, and (ii) a second angular position, in which the supply port communicates with the second spring port and the exhaust port communicates with the first spring port.

53. A rotary disk for a vehicle dual-action dynamic valve, the rotary disk having: a disk body having a first surface and a second surface, wherein the second surface of the disk body faces opposite to the first surface of the disk body; a central aperture extending entirely through disk body from the first surface to the second surface; a plurality of arcuate-shaped grooves or through holes spaced around the central aperture, wherein each groove is recessed from the first surface of the disk body; the plurality of grooves or through holes include a first blind groove or through hole, a second blind groove or through hole, a third blind groove or through hole, and a fourth blind groove or through hole; wherein each blind groove or through hole forms an arcuate shape and is disposed along the periphery of the rotary disk.

54. The rotary disk of item 53, wherein each groove or through hole includes a contour extending between a first end of the groove or through hole and a second end of the groove or through hole, the contour of each groove or through hole extends along a periphery of the first surface of the disk body.

55. The rotary disk of item 53 or 54, wherein each groove or through hole includes a lip portion formed between a pair of bend portions, whereby the lip portion and the pair of bend portions are positioned between the first end and the second end.

56. The rotary disk of any of items 53-55, wherein the lip port extends toward the central aperture of the disk body.

57. The rotary disk of any items 53-56, wherein each groove or through hole includes a central portion formed between the first end and the second end of the groove or through hole, and the width and/or depth of the first end and the width of the second end are different than the width and/or depth of the central portion of the groove or through hole.

58. The rotary disk of any of items 53-57, wherein the first surface of the disk body having a plurality of arcuate-shaped grooves is configured to mate with an upper surface of an auxiliary disk, the auxiliary disk including a plurality of holes and the disk body of the rotary disk is configured to rotate against the upper surface of the auxiliary disk.

59. The rotary disk of any of items 53-58, wherein the plurality of arcuate-shaped grooves are configured to overlie each hole of the auxiliary disk when the disk body is set at a first angular position or a second angular position.

60. The rotary disk of any of items 53-59, wherein the first surface of the disk body having a plurality of arcuate-shaped grooves is configured to mate with an upper surface of an auxiliary disk, the auxiliary disk including a plurality of holes and the disk body of the rotary disk is configured to rotate against the upper surface of the auxiliary disk.

61. The rotary disk of any of items 53-60, wherein the lip portion and the pair of bend portions of each groove circumvent a respective hole of the auxiliary disk when the disk body is set at a base position.

62. The rotary disk of any of items 54-61, wherein the first end and the second end of each groove partially overlies a respective hole of the auxiliary disk when the disk body is set at a base position.

63. The rotary disk of any of items 54-62, wherein the central aperture is configured to receive a post and the disk body is configured to rotate about the post.

64. The rotary disk of item 54, wherein the first surface of the disk body having a plurality of arcuate-shaped through holes is configured to stack against an upper surface of a secondary disk, wherein the secondary disk is a circular-shaped solid disk body having only one center hole and no other hole or groove.

65. The rotary disk of item 53, wherein the plurality of grooves or through holes comprises four blind grooves or through holes spaced around the central aperture and a pair of connecting grooves or connecting through holes, wherein each connecting groove or connecting through hole extends between a pair of blind grooves or through holes.

66. The rotary disk of item 53, wherein each blind groove or through hole includes a first end, a second end, and a central portion disposed between the first end and the second end, and a width of the central portion is less than either a width of the first end or a width of the second end.

67. The rotary disk of item 53, wherein the plurality of grooves or through holes include a first connecting groove or through hole extending from the first blind groove or through hole to the second blind groove or through hole and a second connecting groove or through hole extending from the third blind groove or through hole to the fourth blind groove or through hole.

68. The shuttle mechanism of item 67, wherein each connecting groove forms an hourglass shape.

69. The rotary disk of item 53, wherein the first blind groove or through hole, second blind groove or through hole, the third blind groove or through hole, and the fourth blind groove or through hole are asymmetrically spaced apart along the periphery of the rotary disk.

70. A shuttle mechanism for a vehicle suspension dual-action dynamic valve, the shuttle mechanism comprising: a rotary disk, wherein the rotary disk comprises: a first surface and a second surface, wherein the second surface of the disk body faces opposite to the first surface of the disk body; a central aperture extending entirely through rotary disk from the first surface to the second surface; a plurality of grooves or through holes spaced around the central aperture, and each groove is recessed from the first surface of the disk body; an auxiliary disk, wherein the auxiliary disk comprises: an upper surface and a lower surface; a central aperture extending entirely through auxiliary disk from the lower surface to the upper surface; a plurality of holes spaced around the central aperture, and the plurality of holes includes a supply hole, an exhaust hole, a first spring hole, and a second spring hole equally spaced apart at about 90° along the periphery of the auxiliary disk, and the supply hole is aligned with the exhaust hole, and the first spring hole is aligned with the second spring hole; and wherein the first surface of rotary disk is configured to mate with the upper surface of the auxiliary disk so that the central aperture of the rotary disk is aligned with the central aperture of the auxiliary disk, and the rotary disk is configured to rotate with respect to the auxiliary disk between a plurality of angular positions including a base position, a first angular position, and a second angular position.

71. The shuttle mechanism of item 70, wherein the plurality of grooves or through holes includes a first pair of blind grooves or through holes and a second pair of blind grooves or through holes, and each blind groove or through hole forms an arcuate shape and is disposed along the periphery of the rotary disk so that each blind groove or through hole overlies a respective hole of the auxiliary disk when the rotary disk is rotated to the first or second angular positions.

72. The shuttle mechanism of item 71, wherein the plurality of grooves or through holes includes a first connecting groove extending between the first pair of blind grooves or through holes and a second connecting groove extending between the second pair of blind grooves or through holes.

73. The shuttle mechanism of item 71, wherein the first pair of blind grooves or through holes include a first end adjacent to the supply hole of the auxiliary disk when the rotary disk is rotated to the base position, and the second pair of blind grooves or through holes include a first end adjacent to the exhaust hole of the auxiliary disk when the rotary disk is rotated to the base position.

74. The shuttle mechanism of item 73, wherein the first end of the first pair blind grooves are separated from the supply hole of the auxiliary disk by a first gap when the rotary disk is rotated to the base position, and the first end of the second pair of blind grooves are separated from the exhaust hole of the auxiliary disk by a second gap when the rotary disk is rotated to the base position, and the length of the first gap is shorter than the length of the second gap.

The present disclosure includes the ornamental design for a dual action rotary valve, its lower housing, its top housing, one or more rotary disks, and any other embodiment of the present disclosure, as shown and described.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated. Aspects of the invention described in the context of particular embodiments may be combined or eliminated in other embodiments. Features and steps of particular embodiments of the invention may be combined in other configurations without deviating from the invention.

Unless defined otherwise, all terms of art, notations and other technical terms or terminology used herein have the same meaning as is commonly understood by one of ordinary skill in the art to which this disclosure belongs. All patents, applications, and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A vehicle suspension dual-action dynamic valve comprising:
   an upper housing mounted on a lower housing to form a valve body, wherein the valve body defines a chamber extending between the upper housing and the lower housing;
   the lower housing comprising a plurality of ports communicating with the chamber, wherein the plurality of ports include a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing;
   a control arm having a first end attached to an upper surface of the upper housing, wherein the control arm is configured to rotate about the valve body in response to extension or compression of the vehicle suspension;
   a single shuttle mechanism positioned in the chamber of the valve body and connected to the control arm by a supporting element, wherein the single shuttle mechanism is configured to rotate about the supporting element within the chamber of the valve body; and
   wherein the single shuttle mechanism is configured to establish communication between one of the supply port or the exhaust port with one of the first spring port or the second spring port and to simultaneously establish communication between the other one of the supply port or the exhaust port with the other one of the first spring port or the second spring port.

2. The vehicle suspension dual-action dynamic valve of claim 1, wherein rotation of the control arm induces the single shuttle mechanism to rotate between a plurality of angular positions to alter communication between the supply port, the exhaust port, the first spring port, and the second spring port.

3. The vehicle suspension dual-action dynamic valve of claim 2, wherein the plurality of angular positions includes (i) a first angular position, in which the supply port communicates with the first spring port and the exhaust port communicates with the second spring port, and (ii) a second angular position, in which the supply port communicates with the second spring port and the exhaust port communicates with the first spring port.

4. The vehicle suspension dual-action dynamic valve of claim 2, wherein the lower housing includes a pair of cross-holes and the plurality of angular positions includes a base position, wherein the first port and the second port communicate neither with the supply port nor the exhaust port in the base position, and the first port communicates with the second port through the pair of cross-holes in the base position to equalize the air pressure between the first set of air springs and the second set of air springs.

5. The vehicle suspension dual-action dynamic valve of claim 2, wherein the plurality of angular positions includes (i) a base position, in which the first port and the second port communicate neither with the supply port nor the exhaust port, and the first port communicates with the second port, (ii) a supply position, in which the supply port communicates with one of the first port or second port, and the purge port communicates neither with the first port nor the second port, and (iii) a dual-action position, in which the supply port communicates with one of the first port or second port, and the purge port communicates with the other one of the first port or the second port.

6. The vehicle suspension dual-action dynamic valve of claim 3, wherein the lower housing further includes a first surface mating with a lower surface of the upper housing in which the first surface defines a plurality of cavities including: a supply cavity directly communicating with the supply port; an exhaust cavity directly communicating with the exhaust port; a first spring cavity directly communicating with the first spring port; and a second spring cavity directly communicating with the second spring port.

7. The vehicle suspension dual-action dynamic valve of claim 6, wherein the single shuttle mechanism comprises a rotary disk having a central aperture that receives the supporting element and oblong-shaped slots spaced around the central aperture with dead band defined there between and along the periphery of the rotary disk, wherein each oblong-shaped slot is configured to overlie a respective cavity of the lower housing when the rotary disk is rotated to the first angular position or the second angular positon.

8. The vehicle suspension dual-action dynamic valve according to claim 6, wherein the single shuttle mechanism comprises an auxiliary disk and a rotary disk, the auxiliary disk having a central hole that receives the support element and the rotary disk having a central aperture that receives the support element, wherein the auxiliary disk is pressed against the first surface of the lower housing in a stationary state and the rotary disk is aligned with the auxiliary disk and stacked upon an upper surface of the auxiliary disk, and the rotary disk is configured to rotate with respect to the auxiliary disk between the first and second angular positions.

9. The vehicle suspension dual-action dynamic valve according to claim 8, wherein the single shuttle mechanism further includes a secondary disk stacked upon an upper surface of the rotary disk and a disk spring compressed against a first surface of the upper housing and an upper surface of the secondary disk to maintain the auxiliary disk, the rotary disk, and the secondary disk in a stacked manner within the chamber of the valve body.

10. The vehicle suspension dual-action dynamic valve of claim 9, wherein the auxiliary disk includes a plurality of holes, and each hole of the auxiliary disk overlies a respective cavity of the lower housing, and wherein the rotary disk includes a plurality of blind grooves, and each blind groove of the rotary disk is configured to overlie a respective hole of the auxiliary disk when the rotary disk is set in either the first or second angular position.

11. The vehicle suspension dual-action dynamic valve of claim 3, wherein the single shuttle mechanism comprises a rotary disk having a central aperture that receives the supporting element and one of the following:
(i) a plurality of oblong-shaped slots spaced around the central aperture with dead band defined there between and along the periphery of the rotary disk, wherein each oblong-shaped slot of the rotary disk is configured to communicate directly with a respective port of the lower housing when the rotary disk is rotated to the first angular position or the second angular positon;
(ii) two arcuate-shaped grooves spaced around the central aperture with dead band defined there between and along the periphery of the rotary disk, wherein each arcuate-shaped groove of the rotary disk is configured to communicate directly with two respective ports of the lower housing when the rotary disk is rotated to the first angular position or the second angular positon; and
(iii) four blind grooves or through holes spaced around the central aperture and a pair of connecting grooves or connecting through holes, wherein each connecting groove or connecting through hole extends between a pair of blind grooves or through holes, and each blind groove or through hole of the rotary disk is configured to communicate directly with a respective port of the lower housing when the rotary disk is rotated to the first angular position or the second angular positon.

12. The vehicle suspension dual-action dynamic valve of claim 1, further comprising a dump port and a dump valve, wherein the dump valve is configured to bypass communication from one of the first spring port or second spring port to the dump port.

13. A method for adjusting air pressure of a pneumatic suspension system of a vehicle comprising a supply tank, a first set of air springs on a first side of the vehicle, a second set of air springs on a second side of the vehicle, and a dual-action dynamic valve positioned between the first set of air springs and the second set of air springs, wherein the dual-action dynamic valve is connected to the supply tank, the first set of air springs, and the second set of air springs by a series of air hoses, the method comprising:
supplying air from the supply tank to the dual-action dynamic valve in response to an extension or compression by the first set of air springs or the second set of air springs;
supplying air from the dual-action dynamic valve to one of the first set of air springs or the second set of springs that is being compressed;
removing air by the dual-action dynamic valve from the other one of the first set of air springs or the second set of air springs that is being extended; and
wherein the steps of supplying air from the dual-action dynamic valve to one of the first set of air springs or the second set of springs that is being compressed and removing air by the dual-action dynamic valve from the other one of the first set of air springs or the second set of air springs that is being extended occurs simultaneously.

14. The method of claim 13, wherein the dual-action dynamic valve further comprises:
an upper housing mounted on a lower housing to form a valve body, wherein the valve body defines a chamber extending between the upper housing and the lower housing;
the lower housing comprises a plurality of ports communicating with the chamber, including a supply port positioned on a first side of the lower housing, an exhaust port positioned on a second side of the lower housing opposite to the first side of the lower housing, a first spring port positioned on a third side of the lower housing, and a second spring port positioned on a fourth side of the lower housing opposite to the third side of the lower housing;
wherein the supply port communicates directly with the supply tank, the exhaust port communicates directly with ambient air, the first spring port communicates directly with the first set of springs, and the second spring port communicates directly with the second set of air springs;
a control arm having a first end attached to an upper surface of the upper housing, wherein the control arm is configured to rotate about the valve body in response to an extension or compression of the pneumatic suspension system;
a shuttle mechanism received in the chamber of the valve body and connected to the control arm by a supporting element, wherein the shuttle mechanism is configured to rotate about the supporting element within the chamber of the valve body to establish communication between the respective ports; and
wherein rotation of the control arm induces the shuttle mechanism to rotate between a plurality of angular positions, including (i) a first angular position, in which the supply port communicates with the first spring port and the exhaust port communicates with the second spring port, and (ii) a second angular position, in which the supply port communicates with the second spring port and the exhaust port communicates with the first spring port.

15. The method of claim 14, further comprising one of the following steps: (i) rotating the shuttle mechanism to the first angular position to simultaneously supply air from the supply tank to the first set of air springs and exhaust air from the second set of air springs to the ambient air; (ii) rotating the shuttle mechanism to the second angular position to simultaneously supply air from the supply tank to the second set of air springs and exhaust air from the first set of air springs to the ambient air; and (iii) rotating the shuttle mechanism to a base position, wherein the first port and the second port communicate neither to the supply port nor the exhaust port of the dual-action dynamic valve, and the first port communicates with the second port through a pair of cross-holes in the lower housing to equalize the air pressure between the first set of air springs and the second set of air springs.

16. A rotary disk for a vehicle suspension dual-action dynamic valve, the rotary disk comprising:
a disk body having a first surface and a second surface, wherein the second surface of the disk body faces opposite to the first surface of the disk body;
a central aperture extending entirely through disk body from the first surface to the second surface;
a plurality of grooves or through holes spaced around the central aperture, and each groove is recessed from the first surface of the disk body; and the plurality of grooves or through holes include a first blind groove or through hole, a second blind groove or through hole, a third blind groove or through hole, and a fourth blind groove or through hole;

wherein each blind groove or through hole forms an arcuate shape and is disposed along the periphery of the rotary disk, wherein the plurality of grooves or through holes include a first connecting groove or through hole extending from the first blind groove or through hole to the second blind groove or through hole and a second connecting groove or through hole extending from the third blind groove or through hole to the fourth blind groove or through hole or wherein the first blind groove or through hole, second blind groove or through hole, the third blind groove or through hole, and the fourth blind groove or through hole are asymmetrically spaced apart along the periphery of the rotary disk.

17. The rotary disk of claim 16, wherein each blind groove or through hole includes a first end, a second end, and a central portion disposed between the first end and the second end, and a width of the central portion is less than either a width of the first end or a width of the second end.

18. The rotary disk of claim 16, wherein the plurality of grooves or through holes include a first connecting groove or through hole extending from the first blind groove or through hole to the second blind groove or through hole and a second connecting groove or through hole extending from the third blind groove or through hole to the fourth blind groove or through hole and wherein each connecting groove forms an hourglass shape.

19. A shuttle mechanism for a vehicle suspension dual-action dynamic valve, the shuttle mechanism comprising:
  a rotary disk comprising a disk body having a first surface and a second surface, wherein the second surface of the disk body faces opposite to the first surface of the disk body;
  a central aperture extending entirely through disk body from the first surface to the second surface;
  a plurality of grooves or through holes spaced around the central aperture, and each groove is recessed from the first surface of the disk body; and
  the plurality of grooves or through holes include a first blind groove or through hole, a second blind groove or through hole, a third blind groove or through hole, and a fourth blind groove or through hole;
  wherein each blind groove or through hole forms an arcuate shape and is disposed along the periphery of the rotary disk; and
  an auxiliary disk, wherein the auxiliary disk comprises:
    an upper surface and a lower surface;
    a central aperture extending entirely through auxiliary disk from the lower surface to the upper surface;
    a plurality of holes spaced around the central aperture, and the plurality of holes includes a supply hole, an exhaust hole, a first spring hole, and a second spring hole equally spaced apart at about 90° along the periphery of the auxiliary disk, and the supply hole is aligned with the exhaust hole, and the first spring hole is aligned with the second spring hole; and
    wherein the first surface of rotary disk is configured to mate with the upper surface of the auxiliary disk so that the central aperture of the rotary disk is aligned with the central aperture of the auxiliary disk, and the rotary disk is configured to rotate with respect to the auxiliary disk between a plurality of angular positions including a base position, a first angular position, and a second angular position.

20. The shuttle mechanism of claim 19, wherein each blind groove or through hole includes a first end, a second end, and a central portion disposed between the first end and the second end, and a width of the central portion is less than either a width of the first end or a width of the second end.

21. The shuttle mechanism of claim 19, wherein the plurality of grooves or through holes include a first connecting groove or through hole extending from the first blind groove or through hole to the second blind groove or through hole and a second connecting groove or through hole extending from the third blind groove or through hole to the fourth blind groove or through hole.

22. The shuttle mechanism of claim 21, wherein each connecting groove forms an hourglass shape.

23. The shuttle mechanism of claim 19, wherein the first blind groove or through hole, second blind groove or through hole, the third blind groove or through hole, and the fourth blind groove or through hole are asymmetrically spaced apart along the periphery of the rotary disk.

* * * * *